United States Patent
Li et al.

(10) Patent No.: US 11,088,903 B2
(45) Date of Patent: Aug. 10, 2021

(54) HYBRID CLOUD NETWORK CONFIGURATION MANAGEMENT

(71) Applicant: Tencent Technology (Shenzhen) Company Limited, Guandong (CN)

(72) Inventors: Haiwen Li, Shenzhen (CN); Boping Yu, Shenzhen (CN); Ke Dong, Shenzhen (CN); Zhen Wang, Shenzhen (CN); Xing Chen, Shenzhen (CN); Xiaoqing Wu, Shenzhen (CN); Songjian Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 194 days.

(21) Appl. No.: 16/279,606

(22) Filed: Feb. 19, 2019

(65) Prior Publication Data
US 2019/0207812 A1  Jul. 4, 2019

Related U.S. Application Data

(63) Continuation of application No. PCT/CN2017/112906, filed on Nov. 24, 2017.

(30) Foreign Application Priority Data

Nov. 24, 2016 (CN) .......................... 201611063080.0
Dec. 2, 2016 (CN) .......................... 201611099636.1
(Continued)

(51) Int. Cl.
*H04L 12/24* (2006.01)
*H04L 29/08* (2006.01)
(Continued)

(52) U.S. Cl.
CPC ........ *H04L 41/0806* (2013.01); *G06F 9/4881* (2013.01); *G06F 9/546* (2013.01);
(Continued)

(58) Field of Classification Search
CPC .. H04L 41/0806; H04L 41/085; H04L 41/044
See application file for complete search history.

(56) References Cited

U.S. PATENT DOCUMENTS 9,154,327 B1 * 10/2015 Marino ............... H04L 41/0813
10,148,493 B1 * 12/2018 Ennis, Jr. ................ G06F 9/541
(Continued)

FOREIGN PATENT DOCUMENTS

CN          1627683 A      6/2005
CN        101242324 A      8/2008
(Continued)

OTHER PUBLICATIONS

CAS Protocol, Aug. 10, 2016, Apereo Foundation, https://apereo.github.io/cas/4.2.x/protocol/CAS-Protocol.html, all pages. (Year: 2016).*
(Continued)

*Primary Examiner* — Thomas J Dailey
*Assistant Examiner* — Lam H Duong
(74) *Attorney, Agent, or Firm* — Brinks Gilson & Lione

(57) ABSTRACT

A configuration system may acquire updated configuration information corresponding to an underlying cloud platform affiliated with a hybrid cloud platform, the hybrid cloud platform being in communication with the underlying cloud platform. The updated configuration information may include network planning information and subnet planning information of the hybrid cloud platform. The configuration system may update previous configuration information corresponding to the underlying cloud platform with incremental data included in the updated configuration information.

(Continued)

The configuration system may provision, based on the network planning information, a network for the underlying cloud platform. The configuration system may provision, based on the subnet planning information, a subnet for the underlying cloud platform. The configuration system may respond to an access request that is forwarded by an authentication service end from an authentication client and send generated response information to the authentication service end after the network and the subnet are provisioned.

20 Claims, 25 Drawing Sheets

(30) Foreign Application Priority Data

Dec. 2, 2016 (CN) .......................... 201611102280.2
Dec. 7, 2016 (CN) .......................... 201611116992.X

(51) Int. Cl.
*H04L 29/06* (2006.01)
*G06F 9/48* (2006.01)
*G06F 9/54* (2006.01)
*H04L 29/12* (2006.01)

(52) U.S. Cl.
CPC ............ *H04L 41/12* (2013.01); *H04L 41/145* (2013.01); *H04L 63/0807* (2013.01); *H04L 63/102* (2013.01); *H04L 63/105* (2013.01); *H04L 67/10* (2013.01); *H04L 67/1095* (2013.01); *H04L 67/34* (2013.01); *H04L 61/2007* (2013.01); *H04L 61/2061* (2013.01); *H04L 61/6068* (2013.01)

(56) References Cited

U.S. PATENT DOCUMENTS

| | | | |
|---|---|---|---|
| 2010/0071035 A1* | 3/2010 | Budko | .................... H04L 63/08 726/4 |
| 2014/0047085 A1* | 2/2014 | Peters | .................... H04L 65/80 709/221 |
| 2014/0281708 A1* | 9/2014 | Adam | ................. G06F 11/1479 714/18 |
| 2014/0337500 A1* | 11/2014 | Lee | ......................... H04L 67/10 709/223 |
| 2016/0119325 A1 | 4/2016 | Doshi | |
| 2018/0062920 A1* | 3/2018 | Srinivasan | ............ G06F 9/5027 |

FOREIGN PATENT DOCUMENTS

| | | |
|---|---|---|
| CN | 102427481 A | 4/2012 |
| CN | 103650426 A | 3/2014 |
| CN | 103685282 A | 3/2014 |
| CN | 105681075 A | 6/2016 |

OTHER PUBLICATIONS

Jiang, Wei-yu et al., "A Multi-identities Authentication and Authorization Schema in Cloud Computing", Information Network Security, vol. 8, Aug. 31, 2012, 4 pages.
Office Action dated Apr. 14, 2020 for Chinese Application No. 201611063080.0 with concise English Translation, 14 pages.

* cited by examiner

```
{
  "Region":
    {
      "Id":"xxx1",
      "Url":http://openstack-server.com/,
      "Type":"Openstack"
    }
}
```

FIG. 14

```
{
  "Network":
    {
      "Vlan Id":"1",
      "RegionId":" xxx1"
    }
}
```

FIG. 15

<<Interface>>
ISubNetManager

+ManagerName:string
---
+Create(Region region,Network net)
+Get(Region region)
+Update(Region region,Network net)
+Delete(string name)

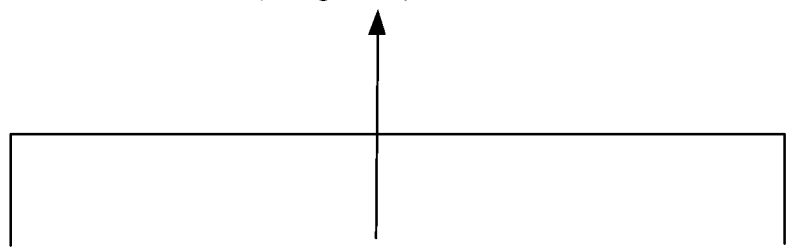

AwsSubNetManager    OpenStackSubNetManager    VMWareSubNetManager

FIG. 16

```
{
  "SubNet":
    {
      "SubnetId"::"sub1",
      "Vlan Id":"1",
      "RegionId":" xxx1",
      "Cidr":"192.168.0.1/22"
    }
}
```

FIG. 17

HYBRID CLOUD NETWORK CONFIGURATION MANAGEMENT

CROSS REFERENCE TO RELATED APPLICATIONS

This application is a continuation of International Application PCT/CN2017/112906, filed Nov. 24, 2017, which claims priority to Chinese Patent Application No. 201611099636.1 filed with the Chinese Patent Office on Dec. 2, 2016 and entitled "CONFIGURATION MANAGEMENT METHOD, APPARATUS, AND SYSTEM", to Chinese Patent Application No. 201611102280.2 filed with the Chinese Patent Office on Dec. 2, 2016 and entitled "INFORMATION CONFIGURATION METHOD, APPARATUS, AND SYSTEM", to Chinese Patent Application No. 201611063080.0 filed with the Chinese Patent Office on Nov. 24, 2016 and entitled "METHOD, APPARATUS, AND SYSTEM FOR CENTRALIZED MANAGEMENT FOR HYBRID CLOUD", and to Chinese Patent Application No. 201611116992.X filed with the Chinese Patent Office on Dec. 7, 2016 and entitled "CLOUD END MIRRORING OPERATION METHOD AND APPARATUS", all of which are incorporated herein by reference in their entirety.

TECHNICAL FIELD

The present disclosure relates to the field of hybrid cloud technologies, and more specifically, to management of public and private cloud technologies.

BACKGROUND

Cloud computing is a mode of increase, use, and delivery of related services based on the Internet, and generally involves providing dynamic, easily expanded, and often virtualized resources through the Internet. With the development of cloud computing technologies, various cloud platforms of different technology types emerge. For example, based on technology types supported by the cloud platforms, the cloud platforms may be classified as an Openstack cloud platform, a Qcloud cloud platform, an AWS cloud platform, or the like. As for service types of enterprises, the cloud platforms may be classified as a private cloud platform and a public cloud platform. When a service type of an enterprise is an external service, for the sake of cost reduction, the enterprise hopes to apply a public cloud platform; when the service type is an internal service, for the sake of security, the enterprise hopes to apply a private cloud platform.

A hybrid cloud platform may integrate cloud platforms of different types, that is, the hybrid cloud platform can provide an external service and an internal service. Moreover, the hybrid cloud platform may be constructed over multiple cloud platforms of different technology types. These cloud platforms may be referred to as underlying cloud platforms. Conventional approaches to configuration management of hybrid cloud platforms and underlying cloud platforms suffer from a variety of drawbacks, limitations, disadvantages, and inefficiencies.

SUMMARY

Aspects of the present disclosure include a configuration system. In some examples, the configuration system may acquire configuration information of each underlying cloud platform affiliated to a hybrid cloud platform, the hybrid cloud platform being constructed over at least one underlying cloud platform. The configuration information may network planning information and subnet planning information of the hybrid cloud platform. The configuration system may store incremental data corresponding to each underlying cloud platform that is not stored in a local database in the corresponding underlying cloud platform based on the configuration information of each underlying cloud platform. The configuration system may determine, based on network planning information of each underlying cloud platform, whether to create a network for the corresponding underlying cloud platform, and determine, based on subnet planning information of each underlying cloud platform, whether to create a subnet for the corresponding underlying cloud platform. The configuration system may respond to an access request that is forwarded by an authentication service end from an authentication client and send generated response information to the authentication service end after the network and the subnet are created. Additional and alternative aspects and advantages are described in the detailed description disclosed herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIG. 14 is a schematic diagram of a parameter Region according to an embodiment of the present disclosure;

FIG. 15 is a schematic diagram of a parameter Network according to an embodiment of the present disclosure;

FIG. 16 is a schematic diagram of an interface ISubNet-Manager according to an embodiment of the present disclosure;

FIG. 17 is a schematic diagram of a parameter SubNet according to an embodiment of the present disclosure;

DESCRIPTION OF EMBODIMENTS

Figure 1:
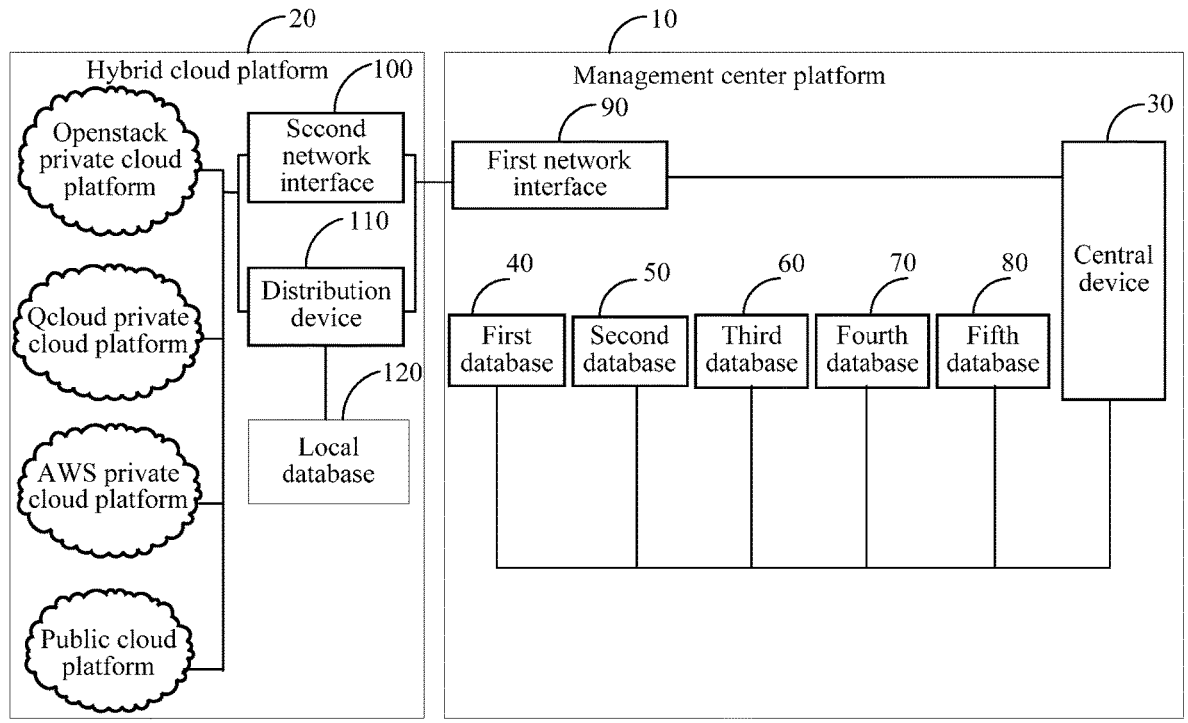
FIG. 1 is an architectural diagram of a system according to an embodiment of the present disclosure.

The following describes various embodiments with reference to the accompanying drawings. While various embodiments are described herein, it will be apparent to those of ordinary skill in the art that many more embodiments and implementations are possible. Accordingly, the embodiments described herein are examples, not the only possible embodiments and implementations.

A hybrid cloud platform may integrate cloud platforms of different types, that is, the hybrid cloud platform can provide an external service and an internal service. Moreover, the hybrid cloud platform may be constructed over multiple cloud platforms of different technology types. These cloud platforms may be referred to as underlying cloud platforms. Centralized management of configuration information for the underlying cloud platforms may enable efficient expansion of the underlying cloud platforms. However, the configuration information may become out dated or incompatible as the underlying cloud platforms are updated and/or change. In addition, manual configuration of network and subnet configurations of the underlying cloud platforms may result in errors, bottlenecks, service interruptions, and inefficient operation of the hybrid cloud platform and/or the underlying cloud platforms. Additional technical problems of existing market solutions are described herein.

By way of introductory example of the systems and method described herein, a configuration system may acquire configuration information of each underlying cloud platform affiliated to a hybrid cloud platform, the hybrid cloud platform being constructed over at least one underlying cloud platform. The configuration information may network planning information and subnet planning information of the hybrid cloud platform. The configuration system may store incremental data corresponding to each underlying cloud platform that is not stored in a local database in the corresponding underlying cloud platform based on the configuration information of each underlying cloud platform. The configuration system may determine, based on network planning information of each underlying cloud platform, whether to create a network for the corresponding underlying cloud platform, and determine, based on subnet planning information of each underlying cloud platform, whether to create a subnet for the corresponding underlying cloud platform. The configuration system may respond to an access request that is forwarded by an authentication service end from an authentication client and send generated response information to the authentication service end after the network and the subnet are created.

In some aspects of the present disclosure, configuration system may compare the configuration information of each underlying cloud platform with configuration information of each underlying cloud platform that is stored in the local database, to obtain the incremental data corresponding to each underlying cloud platform that is not stored in the local database. The configuration system may send the incremental data corresponding to each underlying cloud platform that is not stored in the local database to the corresponding underlying cloud platform.

In some aspects of the present disclosure, the configuration system may synchronize the network planning information and the subnet planning information of the hybrid cloud platform, where the network planning information is used to indicate network planning of the hybrid cloud platform, the subnet planning information is used to indicate subnet planning of the hybrid cloud platform, and the hybrid cloud platform is constructed over the at least one underlying cloud platform. The configuration system may further acquire network information corresponding to the underlying cloud platform from the network planning information, and acquire subnet information corresponding to the underlying cloud platform from the subnet planning information.

In some aspects of the present disclosure, the configuration system may determine, based on the network information corresponding to the underlying cloud platform, whether a network is created for the underlying cloud platform, to obtain a first determining result. The configuration system may further create, when the first determining result indicates that no network is created for the underlying cloud platform, a network for the underlying cloud platform based on the network information corresponding to the underlying cloud platform.

In some aspects of the present disclosure, the configuration system may determine, based on the subnet information corresponding to the underlying cloud platform, whether a network is created for the underlying cloud platform and whether a subnet is created for the underlying cloud platform, to obtain a second determining result. The configuration system may further create, when the second determining result indicates that a network is created for the underlying cloud platform but no subnet is created for the underlying cloud platform, a subnet for the underlying cloud platform based on the subnet information corresponding to the underlying cloud platform.

In some aspects of the present disclosure, the configuration system may further include an authentication client and an authentication service. The authentication client may receive an access request that is initiated by a user by using an application program, detect whether the access request is verified, and send the access request to the authentication service end if the access request is not verified. The authentication service may receive the access request, detect whether the access request carries token information, send a user identity authentication invitation to the application program if the access request carries no token information, receive authentication information acquired by the application program, verify the authentication information, generate token information after verification succeeds, and send the token information to the authentication client. The authentication client may receive the token information, and send the access request and the token information to the authentication service end. The authentication service end may decrypt and verify the token information, and send a user identifier of the user sending the access request to the authentication client if verification succeeds. The authentication client may receive the authenticated user identifier, send the access request to a service system of a corresponding hybrid cloud, receive response information of the access request from the service system, and send the response information to the application program.

In some aspects of the present disclosure, the authentication client may detect an access request, and sends the access request to an authentication service end if the access request is not verified. The authentication service end may detect whether the access request carries token information, receive authentication information acquired by an application program if the access request carries no token information, verify the authentication information, generate token information after verification succeeds, and send the token information to the authentication client. Then the authentication client may send the access request and the corresponding token information to the authentication service end. The authentication service end may decrypt and verify the token information and send a user identifier to the authentication client after verification succeeds. The authentication client may send the access request to a service system of a hybrid cloud, receive response information of the access request from the service system, and send the response information to the application program. In this way, centralized authentication management is implemented for a hybrid cloud user, multiple service systems interwork through login once, and lots of time is saved for the user, as the user does not need to perform login authentication and secure logout operations multiple times.

In some aspects of the present disclosure, the configuration system may acquire configuration information of each affiliated underlying cloud platform. The configuration system may compare the configuration information of each underlying cloud platform with configuration information of each underlying cloud platform that is stored in a local database, to obtain incremental data corresponding to each underlying cloud platform that is not stored in the local database. The configuration system may send the incremental data corresponding to each underlying cloud platform that is not stored in the local database to the corresponding underlying cloud platform.

In some aspects of the present disclosure a hybrid cloud platform may be constructed over at least one underlying cloud platform, and the hybrid cloud platform may the foregoing configuration system; The management center platform may include a central device and a database, and the database being configured to store respective configuration information of underlying cloud platforms affiliated to the hybrid cloud platform. The central device may perform centralized management on the respective configuration information of the underlying cloud platforms affiliated to the hybrid cloud platform.

In some aspects of the present disclosure the configuration system may synchronize network planning information and subnet planning information of a hybrid cloud platform, where the network planning information is used to indicate network planning of the hybrid cloud platform, the subnet planning information is used to indicate subnet planning of the hybrid cloud platform, and the hybrid cloud platform is constructed over at least one underlying cloud platform. The configuration system acquire network information corresponding to the underlying cloud platform from the network planning information, and acquire subnet information corresponding to the underlying cloud platform from the subnet planning information. The configuration system may provision, based on the network information corresponding to the underlying cloud platform, whether a network is created for the underlying cloud platform, to obtain a first determining result. The configuration system may create, when the first determining result indicates that no network is created for the underlying cloud platform, a network for the underlying cloud platform based on the network information corresponding to the underlying cloud platform. The configuration system may provision, based on the subnet information corresponding to the underlying cloud platform, whether a network is created for the underlying cloud platform and whether a subnet is created for the underlying cloud platform, to obtain a second determining result. The configuration system may create, when the second determining result indicates that a network is created for the underlying cloud platform but no subnet is created for the underlying cloud platform, a subnet for the underlying cloud platform based on the subnet information corresponding to the underlying cloud platform.

In some aspects of the present disclosure further provides a hybrid cloud platform is constructed over at least one underlying cloud platform, and the hybrid cloud platform includes the foregoing configuration system. The management center platform may include a central device and a database, and the database is configured to store network planning information and subnet planning information of the hybrid cloud platform. The central device may perform centralized management on the network planning information and the subnet planning information of the hybrid cloud platform.

An aspect of the present disclosure provides a cloud end mirroring operation system. The cloud end mirroring operation system may receive a cloud end mirroring operation request. The cloud end mirroring operation system may store a request identifier corresponding to the cloud end mirroring operation request and a request parameter carried in the cloud end mirroring operation request. The cloud end mirroring operation system may add the request identifier corresponding to the cloud end mirroring operation request to a request receiving queue. The cloud end mirroring operation system may execute a first scheduled task of periodically fetching a request identifier from the request receiving queue and execute a second scheduled task of periodically fetching a request identifier from an abnormal request queue; and perform a cloud end mirroring operation based on a request parameter associated with the fetched request identifier. The cloud end mirroring operation system may add the fetched request identifier to the abnormal request queue when the cloud end mirroring operation fails.

In the cloud end mirroring operation method and apparatus, a request receiving queue and an abnormal request queue are added. The request receiving queue is used to record a received cloud end mirroring operation request, and the abnormal request queue is used to record a cloud end mirroring operation request whose cloud end mirroring operation fails. Through a first scheduled task and a second scheduled task that are executed, a newly received cloud end mirroring operation request can be processed in time, and a failed cloud end mirroring operation can be retried in time, which does not affect processing on the received cloud end mirroring operation request and can increase a mirroring operation success rate. Moreover, through the queues and the scheduled tasks, a cloud end mirroring operation request quantity can be controlled, a cloud end is prevented from being overloaded by a sudden increase in the request quantity, and a cloud end mirroring operation is highly usable.

One technical advantage provided by the systems and method described herein may be that when configuration information of each affiliated underlying cloud platform is acquired, the configuration information of each underlying cloud platform is compared with configuration information of each underlying cloud platform that is stored in a local database, to obtain incremental data corresponding to each underlying cloud platform that is not stored in the local database, and the incremental data corresponding to each underlying cloud platform that is not stored in the local database is sent to the corresponding underlying cloud platform. In this way, centralized management is implemented on configuration information of underlying cloud platforms affiliated to any hybrid cloud platform, thereby facilitating expansion of a hybrid cloud platform.

Alternatively or in addition, another technical advantage may be that after network planning information and subnet planning information of a hybrid cloud platform are synchronized, network information corresponding to an underlying cloud platform may be acquired from the network planning information, and when it is determined based on the network information that no network is created for the underlying cloud platform, a network is created for the underlying cloud platform. Moreover, subnet information corresponding to the underlying cloud platform may be further acquired from the subnet planning information, and when it is determined based on the subnet information that a network is created for the underlying cloud platform but no subnet is created for the underlying cloud platform, a subnet is created for the underlying cloud platform. In this way, after the network planning information and the subnet planning information of the hybrid cloud platform are planned, an underlying cloud platform for which no network is created and no subnet is created can be accurately determined, and a network and a subnet can be automatically created for the underlying cloud platform, thereby automatically and accurately creating a network and a subnet for an underlying cloud platform. Additional or alternative aspects and technical advantages are described herein.

FIG. 1 is an architectural diagram of a system implementing a configuration management method according to an embodiment of the present disclosure. Referring to FIG. 1, the system may include: a management center platform 10 and a hybrid cloud platform 20. The management center platform 10 includes: a central device 30, a first database 40, a second database 50, a third database 60, a fourth database 70, a fifth database 80, and a first network interface 90.

The hybrid cloud platform 20 is constructed over multiple underlying cloud platforms. As shown in FIG. 1, the hybrid cloud platform is constructed over an Openstack private cloud platform, a Qcloud private cloud platform, an AWS private cloud platform, and a public cloud platform. The hybrid cloud platform 20 includes: a second network interface 100, a distribution device 110, and a local database 120.

The central device 30 is configured to perform centralized management on configuration information of underlying cloud platforms corresponding to hybrid cloud platforms, for example, service domains, virtual local area networks (VLANs), logical networks, subnets, and Internet protocol (IP) resources corresponding to the underlying cloud platforms. The configuration information is respectively stored in corresponding databases. For example, the first database 40 is configured to store the service domains corresponding to the underlying cloud platforms; the second database 50 is configured to store the VLANs corresponding to the underlying cloud platforms; the third database 60 is configured to store the logical networks corresponding to the underlying cloud platforms; the fourth database 70 is configured to store the subnets corresponding to the underlying cloud platforms; and the fifth database 80 is configured to store the IP resources corresponding to the underlying cloud platforms.

A VLAN corresponds to a local area network of a physical network, and resources in a same physical network are isolated by using multiple VLANs.

A network type corresponding to the physical network includes virtual, logical, and switching. In this embodiment of the present disclosure, the logical network corresponds to the logical type, and is used to isolate the physical network. An isolation manner of the network is implemented by using the VLANs, and a corresponding isolation level is equivalent to a layer 2 data link layer in a seven-layer network protocol.

A subnet is used to isolate the physical network, and an isolation level corresponds to a network layer in the seven-layer network protocol.

A service domain is used to indicate a service identifier, to distinguish different services.

An IP resource pool is an IP address management pool, and stores all IP resources, that is, stores all IP addresses.

Various resources related to a basic cloud are managed by using a unified system entrance, to perform centralized management on IP-resource-related data in the basic cloud.

Figure 2:
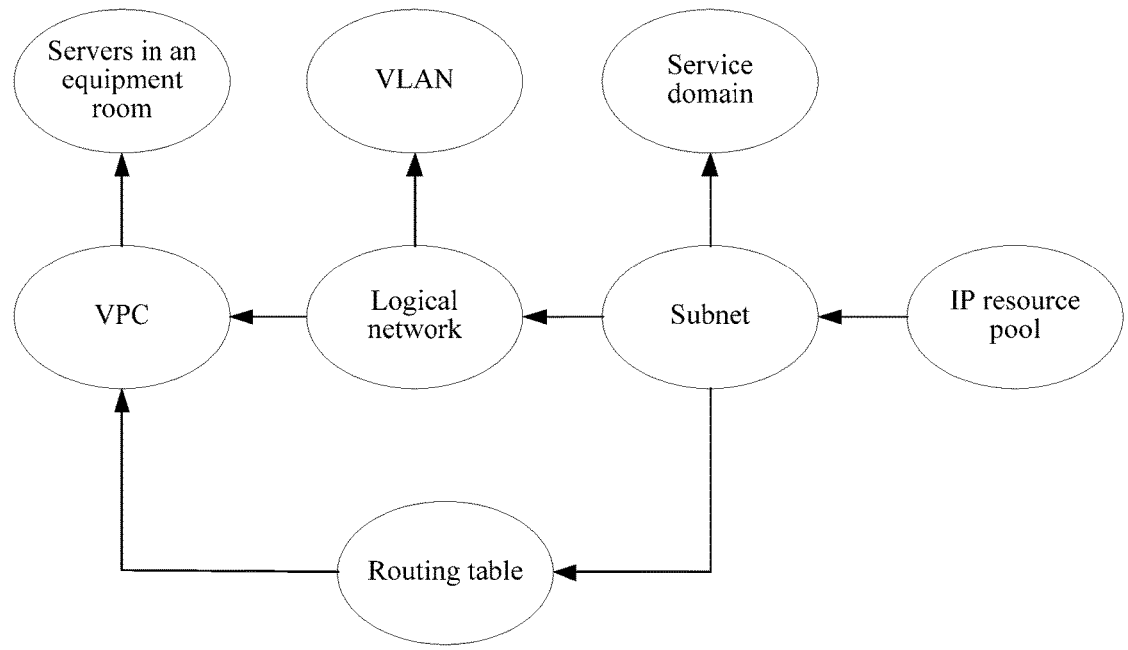
FIG. 2 is a schematic diagram of a resource correspondence according to an embodiment of the present disclosure.

For relationships between the resources and correspondences between the resources and physical devices, for example, multiple servers in an equipment room, refer to FIG. 2. The subnet may be associated with an IP address in the IP resource pool, and a mapping relationship may exist between the subnet and the service domain. Therefore, using the subnet as an intermediary, a mapping relationship between the IP resource and the service domain can be obtained, and use of the IP resource can be analyzed from the perspective of service application.

The subnet is an independent network segment of the logical network, and the logical network isolates the physical network by using the VLANs. For any logical network and any subnet of any logical network, a virtual private cloud (VPC) may be divided from a corresponding underlying cloud platform, that is, each VPC corresponds to an isolated and independent logical network and subnet. Therefore, it is ensured at a physical network level that IP resources in logical networks are independent, and IP resources in different logical networks may be the same, so that IP resource reusability is improved. Moreover, during access of devices affiliated to different VPCs, a routing rule (recorded in a route table shown in FIG. 2) needs to be allocated in advance, and mutual access in the different VPCs is implemented by using the routing rule. The multiple servers disposed in the equipment room are divided based on VPC division, so that a VPC corresponds to a corresponding server, thereby implementing a correspondence between physical devices and the resources (which may be considered as logical resources).

The first network interface 90 is a RESTful application program programming (API) interface provided by the management center platform. The RESTful API means that GET, POST, PUT, and DELETE provided by the first network interface 90 are implemented in a HyperText Transfer Protocol (HTTP) request manner. The resources can be managed and maintained through the first network interface 90.

The second network interface 100 is an access interface provided by the hybrid cloud platform to outside. Different from the management center platform 10, which is an independent system and focuses on centralized resource management, the second network interface 100 is mainly platform-oriented, and the interface is a unique service interface provided by the hybrid cloud platform to outside. During access through the second network interface 100, a resource difference between underlying cloud platforms may be ignored, and configuration information in the management center platform 10 is automatically allocated to corresponding underlying cloud platforms by using the distribution device 110 of the hybrid cloud platform.

The distribution device 110 is configured to implement consistency between configuration information of the underlying cloud platforms in the hybrid cloud platform and the configuration information that is managed in the management center platform 10. Therefore, the distribution device 110 may 1) Introduce the management center platform for centralized management on the configuration information of the underlying cloud platforms in the hybrid cloud platform. 2) Send incremental data in the configuration information to a corresponding underlying cloud platform. The incremental data is information that is not stored in the local database 120. The local database 120 is configured to store the configuration information of the underlying cloud platforms.

Figure 3:
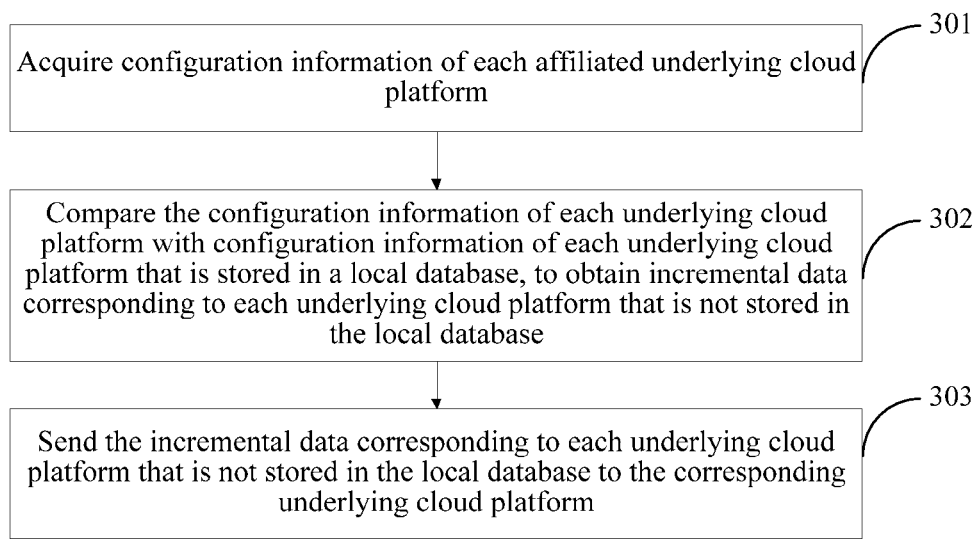
FIG. 3 is a flowchart of an configuration management method according to an embodiment of the present disclosure.

An configuration management method provided in an embodiment of the present disclosure is mainly implemented by using the distribution device in the system architecture shown in FIG. 1. The following describes the configuration management method provided in this embodiment of the present disclosure from the perspective of the distribution device. As shown in FIG. 3, FIG. 3 is a flowchart of an configuration management method according to an embodiment of the present disclosure. The method may include the following steps:

301: Acquire configuration information of each affiliated underlying cloud platform.

The affiliated underlying cloud platform refers to at least one underlying cloud platform affiliated to a hybrid cloud platform. The configuration information includes: network planning information and subnet planning information of the hybrid cloud platform.

In some embodiments of the present disclosure, the acquiring configuration information of each affiliated underlying cloud platform includes: acquiring all configuration information stored in a management center platform, and selecting the configuration information of each affiliated underlying cloud platform from all the acquired configuration information. The affiliated underlying cloud platform is an underlying cloud platform corresponding to a hybrid cloud platform on which a distribution device to which this embodiment of the present disclosure is applied is located.

Figure 4:
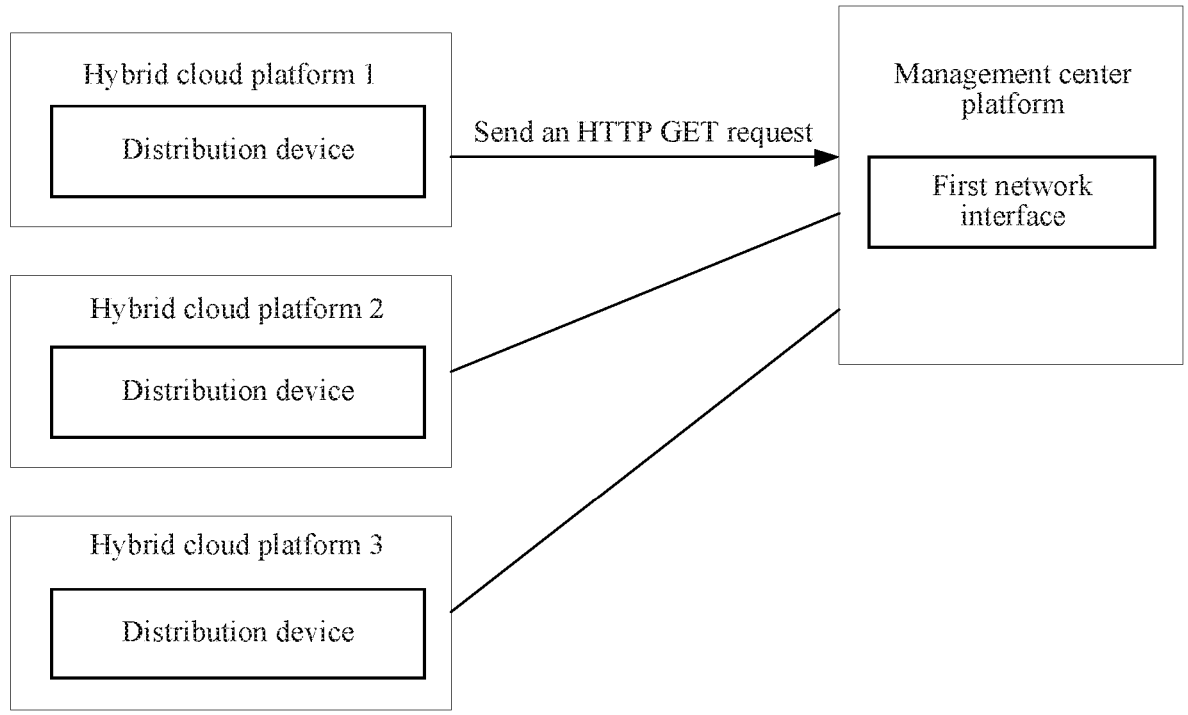
FIG. 4 is a schematic diagram of a correspondence between a management center platform and multiple hybrid cloud platforms according to an embodiment of the present disclosure.

As shown in FIG. 4, a management center platform stores configuration information of each underlying cloud platform affiliated to a hybrid cloud platform 1, a hybrid cloud platform 2, and a hybrid cloud platform 3. When a distribution device in the hybrid cloud platform 1 sends an HTTP GET request to the management center platform 10 through a second network interface 100, it indicates that the distribution device in the hybrid cloud platform 1 acquires all configuration information stored in the management center platform 10. Therefore, after acquiring all the configuration information, the distribution device in the hybrid cloud platform 1 selects configuration information of an underlying cloud platform corresponding to the hybrid cloud platform 1 from all the configuration information. In some embodiments of the present disclosure, a mapping relationship exists between the configuration information in the management center platform 10 and underlying cloud platforms. For example, a mapping may exist between an identifier of an underlying cloud platform and corresponding configuration information. In this way, when all the configuration information is acquired, selection may be performed based on the identifier of the underlying cloud platform.

In some embodiments of the present disclosure, the management center platform may actively push all the configuration information to the hybrid cloud platforms. After the configuration information in the management center platform is updated, the configuration information may be pushed to the hybrid cloud platforms in time. However, in such a manner, after a quantity of managed hybrid cloud platforms changes, the management center platform needs to modify a message for pushing all network information. For example, a new hybrid cloud platform is added, and the management center platform needs to add an address of the new hybrid cloud platform to a pushed message, so that the new hybrid cloud platform may acquire all the configuration information managed by the management center platform.

In some embodiments of the present disclosure, the distribution device may periodically acquire all the configuration information from the management center platform. That is, the distribution device actively acquires all the configuration information from the management center platform at a specific interval. In this way, the management center platform does not need to make a modification for the change in the quantity of managed hybrid cloud platforms, but such a manner lowers timeliness of information acquisition.

Moreover, as the management center platform performs centralized management on all the configuration information, after a new hybrid cloud platform is added, configuration information of each existing hybrid cloud platform can be acquired by using the management center platform. In this way, when configuration information of the newly added hybrid cloud platform is planned, a probability of repetition between the configuration information of the newly added hybrid cloud platform and the configuration information of each existing hybrid cloud platform can be reduced, thereby facilitating expansion of a hybrid cloud platform.

302: Compare the configuration information of each underlying cloud platform with configuration information of each underlying cloud platform that is stored in a local database, to obtain incremental data corresponding to each underlying cloud platform that is not stored in the local database.

The configuration information stored in the local database is configuration information previously acquired by the distribution device from the management center platform, and may be inconsistent with configuration information currently stored in the management center platform. Therefore, after the configuration information of the underlying cloud platform is acquired, the incremental data corresponding to each underlying cloud platform that is not stored in the local database needs to be obtained from the configuration information, to send the incremental data corresponding to each underlying cloud platform that is not stored in the local database to the corresponding underlying cloud platform, and implement consistency between the configuration information in the underlying cloud platform and the configuration information in the management center platform. Such an incremental data sending manner reduces an amount of sent data, and therefore can improve sending efficiency.

303: Send the incremental data corresponding to each underlying cloud platform that is not stored in the local database to the corresponding underlying cloud platform, so that the underlying cloud platform expands a network resource and/or a subnet resource of the underlying cloud platform by using the incremental data, and a hybrid cloud platform is expanded.

Figure 5:
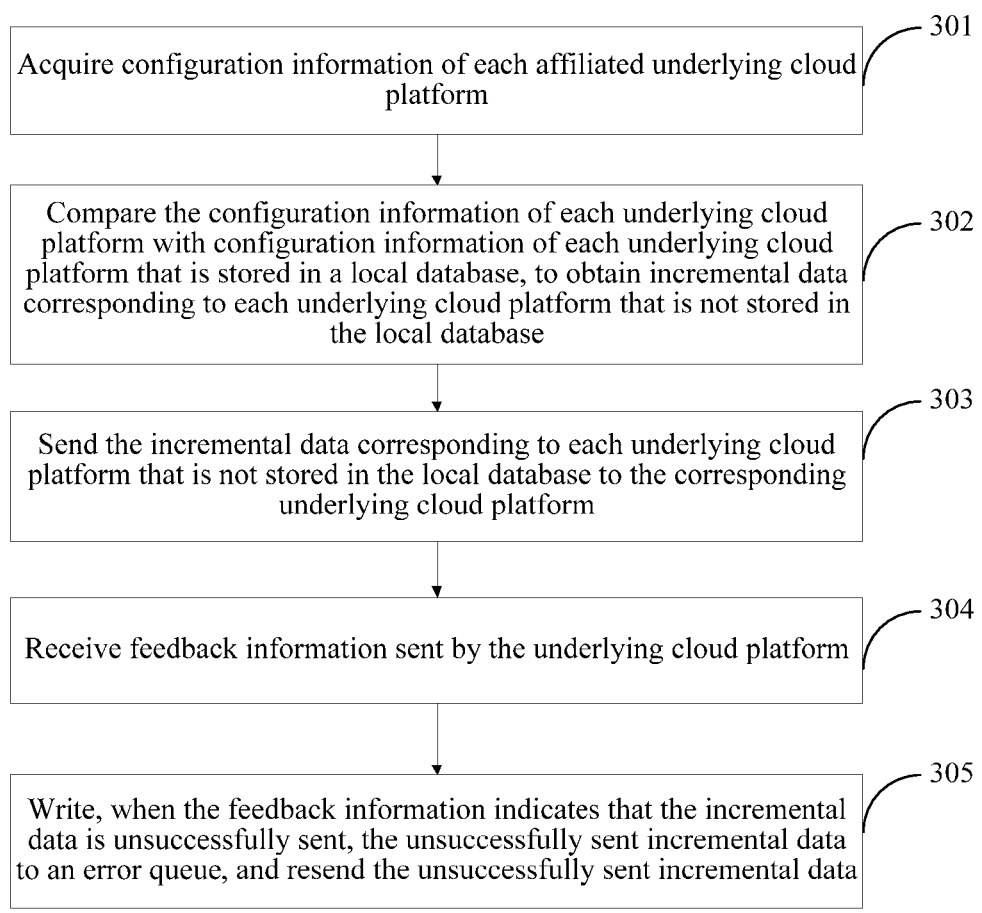
FIG. 5 is another flowchart of an configuration management method according to an embodiment of the present disclosure.

After the incremental data that is not stored in the local database is sent, the configuration management method provided in this embodiment of the present disclosure further includes the following steps, as shown in FIG. 5:

304: Receive feedback information sent by the underlying cloud platform.

305: Write, when the feedback information indicates that the incremental data is unsuccessfully sent, the unsuccessfully sent incremental data to an error queue, and resend the unsuccessfully sent incremental data.

It should be noted herein that after the unsuccessfully sent incremental data is resent, feedback information sent by the underlying cloud platform is still received. If the received feedback information indicates that the incremental data is successfully sent, the successfully resent incremental data is deleted from the error queue. If the received feedback information indicates that the incremental data is unsuccessfully sent, the incremental data is acquired from the error queue and resent when a next error processing period is reached. The error processing period is used to instruct to resend each piece of unsuccessfully sent incremental data in the error queue at a specific interval. In the error processing period process, step 301 to step 303 can still be performed.

Moreover, when the unsuccessfully sent incremental data is resent, it may be further determined whether the unsuccessfully sent incremental data is successfully sent within a preset time. Notification information is sent if it is determined that the unsuccessfully sent incremental data is not successfully sent within the preset time. In some embodiments of the present disclosure, the notification information may be an alert in an email, so that a manager manually processes the unsuccessfully sent incremental data. The preset time is a time preset for sending the incremental data, and may be determined depending on actual application. For example, the preset time may be obtained through balancing between sending efficiency and sending times. This is not limited in this embodiment of the present disclosure.

Through the foregoing technical solution, configuration information of each affiliated underlying cloud platform is acquired, the configuration information of each underlying cloud platform is compared with configuration information of each underlying cloud platform that is stored in a local database, to obtain incremental data corresponding to each underlying cloud platform that is not stored in the local database, and the incremental data corresponding to each underlying cloud platform that is not stored in the local database is sent to the corresponding underlying cloud platform. In this way, centralized management is implemented on configuration information of underlying cloud platforms affiliated to any hybrid cloud platform, thereby facilitating expansion of a hybrid cloud platform.

Figure 6:
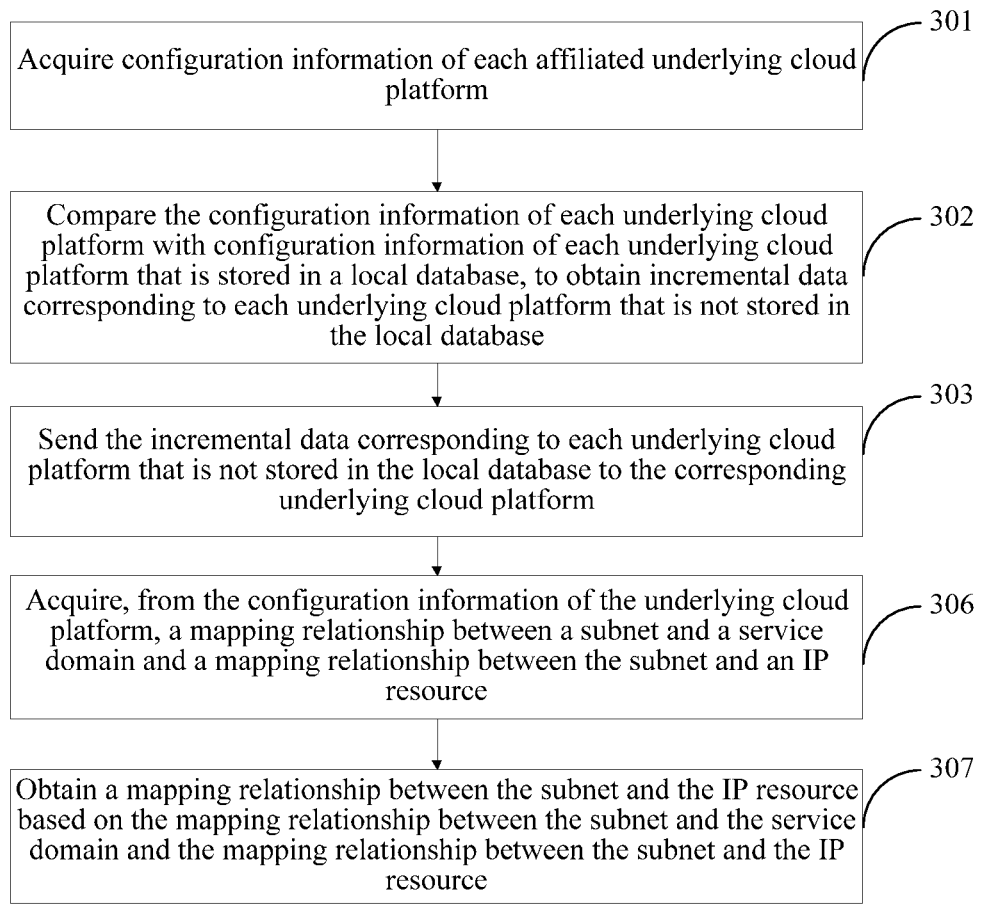
FIG. 6 is still another flowchart of an configuration management method according to an embodiment of the present disclosure.

As shown in FIG. 6, FIG. 6 is another flowchart of an configuration management method according to an embodiment of the present disclosure. Based on FIG. 3, the method may further include the following steps:

306: Acquire, from the configuration information of the underlying cloud platform, a mapping relationship between a subnet and a service domain and a mapping relationship between the subnet and an IP resource.

307: Obtain a mapping relationship between the subnet and the IP resource based on the mapping relationship between the subnet and the service domain and the mapping relationship between the subnet and the IP resource, so that use of the IP resource can be analyzed in a service dimension.

Next, an configuration management apparatus provided in an embodiment of the present disclosure is described. The configuration management apparatus described below may be considered as a function unit architecture that needs to be disposed for the distribution device for implementing the configuration management method provided in the foregoing embodiment of the present disclosure.

Figure 7:
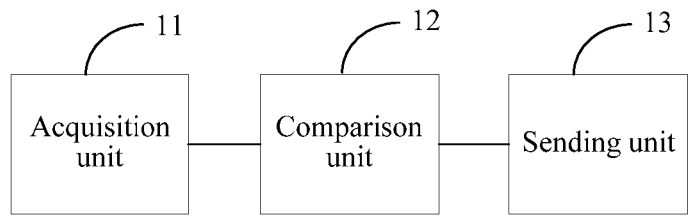
FIG. 7 is a schematic structural diagram of an configuration management apparatus according to an embodiment of the present disclosure.

FIG. 7 is a schematic structural diagram of an configuration management apparatus according to an embodiment of the present disclosure. The apparatus may include: an acquisition unit 11, a comparison unit 12, and a sending unit 13.

The acquisition unit 11 is configured to acquire configuration information of each affiliated underlying cloud platform. In some embodiments of the present disclosure, the acquiring configuration information of each affiliated underlying cloud platform includes: acquiring all configuration information stored in a management center platform, and selecting the configuration information of each affiliated underlying cloud platform from all the acquired configuration information. The affiliated underlying cloud platform is an underlying cloud platform corresponding to a hybrid cloud platform on which a distribution device to which this embodiment of the present disclosure is applied is located, as shown in FIG. 4.

The comparison unit 12 is configured to compare the configuration information of each underlying cloud platform with configuration information of each underlying cloud platform that is stored in a local database, to obtain incremental data corresponding to each underlying cloud platform that is not stored in the local database.

The configuration information stored in the local database is configuration information previously acquired by the distribution device from the management center platform, and may be inconsistent with configuration information currently stored in the management center platform. Therefore, after the configuration information of the underlying cloud platform is acquired, the incremental data corresponding to each underlying cloud platform that is not stored in the local database needs to obtained from the configuration information, to send the incremental data corresponding to each underlying cloud platform that is not stored in the local database the corresponding underlying cloud platform, and implement consistency between the configuration information in the underlying cloud platform and the configuration information in the management center platform. Such an incremental data sending manner reduces an amount of sent data, and can improve sending efficiency.

The sending unit 13 is configured to send the incremental data corresponding to each underlying cloud platform that is not stored in the local database to the corresponding underlying cloud platform, so that the underlying cloud platform expands a network resource and/or a subnet resource of the underlying cloud platform by using the incremental data, and a hybrid cloud platform is expanded.

Figure 8:
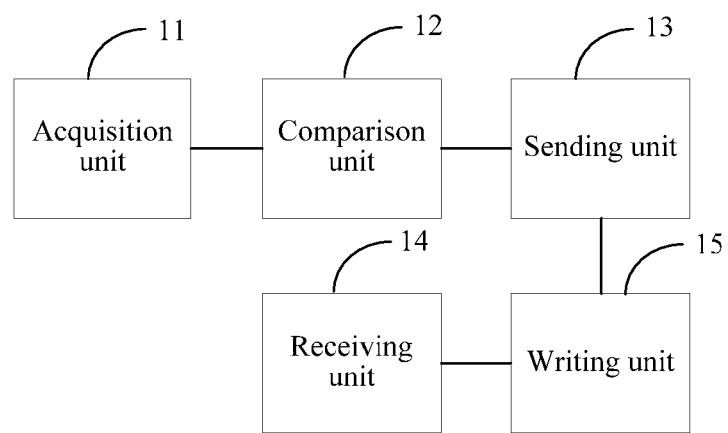
FIG. 8 is another schematic structural diagram of an configuration management apparatus according to an embodiment of the present disclosure.

After the incremental data that is not stored in the local database is sent, the configuration management apparatus provided in this embodiment of the present disclosure may further perform processing about sending. As shown in FIG. 8, FIG. 8 is another schematic structural diagram of an configuration management apparatus according to an embodiment of the present disclosure. The apparatus may further include: a receiving unit 14 and a writing unit 15.

The receiving unit 14 is configured to receive feedback information sent by the underlying cloud platform.

The writing unit 15 is configured to write, when the feedback information indicates that the incremental data is unsuccessfully sent, the unsuccessfully sent incremental data to an error queue, and trigger the sending unit 13 to resend the unsuccessfully sent incremental data.

It should be noted herein that after the unsuccessfully sent incremental data is resent, feedback information sent by the underlying cloud platform is still received. If the received feedback information indicates that the incremental data is successfully sent, the successfully resent incremental data is deleted from the error queue. If the received feedback information indicates that the incremental data is unsuccessfully sent, the incremental data is acquired from the error queue and resent when a next error processing period is reached. The error processing period is used to instruct to resend each piece of unsuccessfully sent incremental data in the error queue at a specific interval. In the error processing period process, the configuration information can still be acquired for comparison.

Moreover, the configuration management apparatus provided in this embodiment of the present disclosure may further include: a determining unit, configured to determine whether the unsuccessfully sent incremental data is successfully sent within a preset time, and trigger the sending unit 13 to send notification information if determining that the unsuccessfully sent incremental data is not successfully sent within the preset time.

In some embodiments of the present disclosure, the notification information may be an alert in an email, so that a manager manually processes the unsuccessfully sent incremental data. The preset time is a time preset for sending the incremental data, and may be determined depending on actual application. For example, the preset time may be obtained through balancing between sending efficiency and sending times. This is not limited in this embodiment of the present disclosure.

Through the foregoing technical solution, configuration information of each affiliated underlying cloud platform is acquired, the configuration information of each underlying cloud platform is compared with configuration information of each underlying cloud platform that is stored in a local database, to obtain incremental data corresponding to each underlying cloud platform that is not stored in the local database, and the incremental data corresponding to each underlying cloud platform that is not stored in the local database is sent to the corresponding underlying cloud platform. In this way, centralized management is implemented on configuration information of underlying cloud platforms affiliated to any hybrid cloud platform, thereby facilitating expansion of a hybrid cloud platform.

Figure 9:
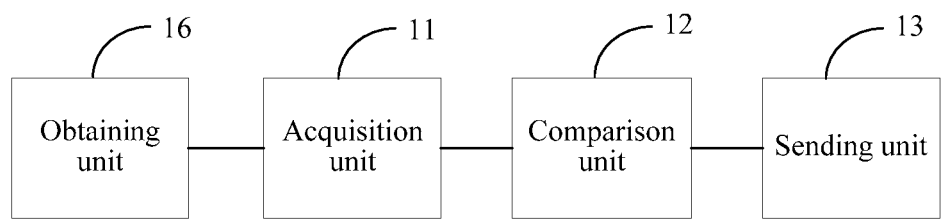
FIG. 9 is still another schematic structural diagram of an configuration management apparatus according to an embodiment of the present disclosure.

As shown in FIG. 9, FIG. 9 is still another schematic structural diagram of an configuration management apparatus according to an embodiment of the present disclosure. The apparatus may further include an obtaining unit 16.

The acquisition unit 11 is further configured to acquire, from the configuration information of the underlying cloud platform, a mapping relationship between a subnet and a service domain and a mapping relationship between the subnet and an IP resource. Correspondingly, the obtaining unit 16 is configured to obtain a mapping relationship between the subnet and the IP resource based on the mapping relationship between the subnet and the service domain and the mapping relationship between the subnet and the IP resource, so that use of the IP resource can be analyzed in a service dimension.

In addition, an embodiment of the present disclosure further provides an configuration management system, including: a management center platform and a hybrid cloud platform. The hybrid cloud platform is constructed over at least one underlying cloud platform. Optional structures of the hybrid cloud platform and the management center platform are shown in FIG. 1, and the distribution device may implement the configuration management method provided in the foregoing embodiment of the present disclosure by using the configuration management apparatus shown in any one of FIG. 7 to FIG. 9.

In some embodiments of the present disclosure, the central device is further configured for subnet division, that is, to divide a logical network into at least one independent network segment, allocate a corresponding service domain and a corresponding IP resource to a divided subnet, to obtain a mapping relationship between the subnet and the service domain and a mapping relationship between the subnet and the IP resource, and obtain a mapping relationship between the subnet and the IP resource based on the mapping relationship between the subnet and the service domain and the mapping relationship between the subnet and the IP resource. In this way, use of the IP resource can be analyzed in the service dimension.

In some embodiments of the present disclosure, the central device is further configured to divide at least one VPC from an underlying cloud platform, and allocate a respective corresponding resource to each VPC. For example, each VPC is allocated a respective corresponding logical network resource and subnet resource, so that each VPC corresponds to an isolated and independent logical network and subnet, it is ensured at a physical network level that IP resources in networks do not interfere with each other, and one IP address can be reused in different VPCs.

Figure 10:
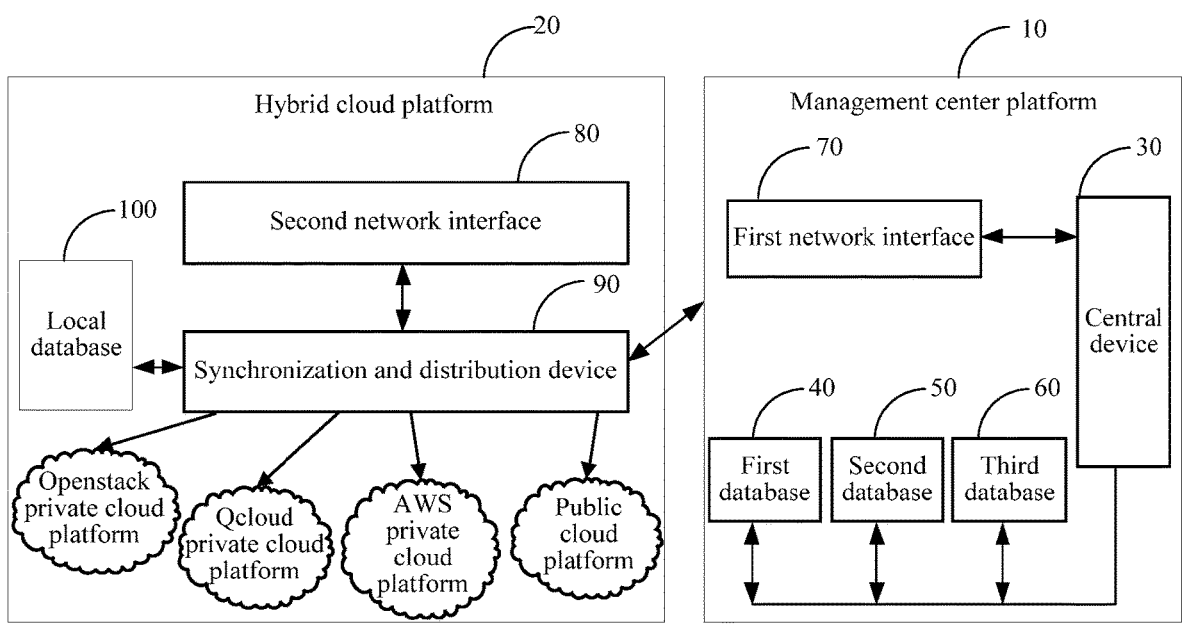
FIG. 10 is an architectural diagram of a system according to an embodiment of the present disclosure.

FIG. 10 is an architectural diagram of a system implementing an information configuration method according to an embodiment of the present disclosure. Referring to FIG. 10, the system may include: a management center platform 10 and a hybrid cloud platform 20. The management center platform 10 includes: a central device 30, a first database 40, a second database 50, a third database 60, and a first network interface 70.

The hybrid cloud platform 20 is constructed over multiple underlying cloud platforms. As shown in FIG. 10, the hybrid cloud platform is constructed over an Openstack private cloud platform, a Qcloud private cloud platform, an AWS private cloud platform, and a public cloud platform. The hybrid cloud platform 20 includes: a second network interface 80, a synchronization and distribution device 90, and a local database 100.

The central device 30 is configured to manage planning information of each hybrid cloud platform, for example, manage configuration information of a network device accessing the cloud, network planning information of each hybrid cloud platform, and subnet planning information of each hybrid cloud platform. Specifically, the configuration information of the network device accessing the cloud includes: configuration information of a network device such as a switch and a router accessing the cloud. The network planning information of each hybrid cloud platform includes: a network corresponding to multiple underlying cloud platforms constructing the hybrid cloud platform (that is, a mapping relationship between a network and each underlying cloud platform) and network identification information of the corresponding network. The network identification information may be VlanID (a virtual network identifier). The subnet planning information of each hybrid cloud platform includes: a subnet corresponding to the multiple underlying cloud platforms constructing the hybrid cloud platform (that is, a mapping relationship between a subnet and each underlying cloud platform) and subnet identification information of the corresponding subnet. The subnet identification information may be classless inter-domain routing (CIDR) information. The subnet is an independent network segment in a network, and therefore, the subnet planning information of each hybrid cloud platform further includes network identification information of the network.

The first database 40 is configured to store the configuration information of the network device accessing the cloud. The second database 50 is configured to store the network planning information of each hybrid cloud platform. The third database 60 is configured to store the subnet planning information of each hybrid cloud platform.

The first network interface 70 is an external interface provided by the management center platform 10, for example, may be an API. Another platform or device may acquire information from the first database 40, the second database 50, and the third database 60 through the first network interface 70. A user may plan a hybrid cloud platform by using a client, for example, plan underlying cloud platforms over which the hybrid cloud platform is to be constructed, a network device accessing the cloud, information to be configured for the network device, a network corresponding to each underlying cloud platform, network identification information of the network, a subnet corresponding to each underlying cloud platform, and identification information of the subnet. The information is considered as planning information of the hybrid cloud platform, which is sent by client to the first network interface 70, and then sent by the first network interface 70 to the central device 30, to add information to, delete information from, and modify information in the first database 40, the second database 50, and the third database 60. Certainly, the information in the first database 40, the second database 50, and the third database 60 may also be sent through the first network interface 70 to the client for display.

The synchronization and distribution device 90 is configured to synchronize the network planning information and the subnet planning information in the management center platform 10 to the local database 100 of the hybrid cloud platform 20, and configured to process a network and a subnet that correspond to an underlying cloud platform based on the synchronized network planning information and subnet planning information in the local database 100.

The second network interface 80 is an external interface provided by the hybrid cloud platform 20. The client may access the synchronization and distribution device 90 through the second network interface, to acquire the network planning information and the subnet planning information of the hybrid cloud platform, for example, network information and subnet information that correspond to the underlying cloud platform.

Figure 11:
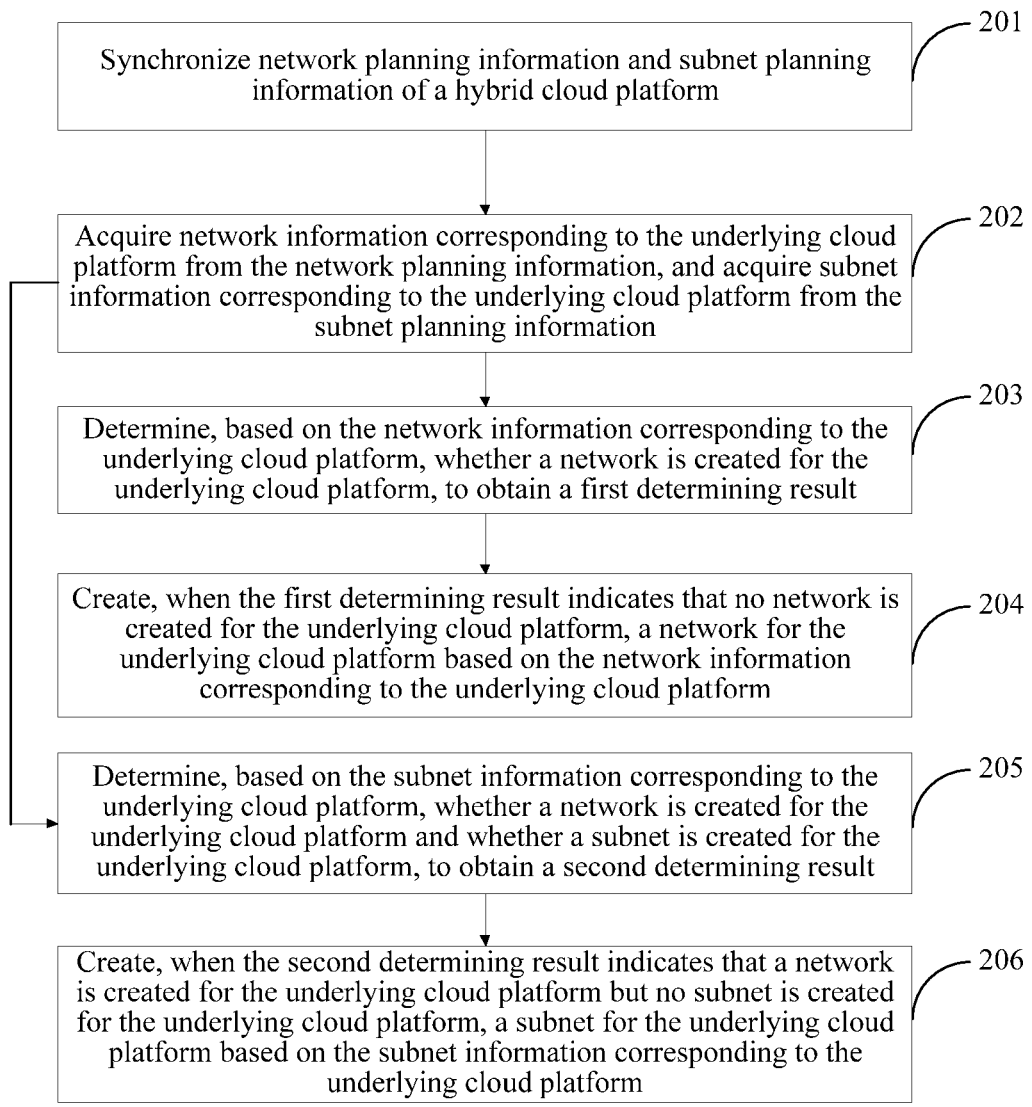
FIG. 11 is a flowchart of an information configuration method according to an embodiment of the present disclosure.

An information configuration method provided in an embodiment of the present disclosure is mainly implemented by using the synchronization and distribution device in the system architecture shown in FIG. 10. The following describes the information configuration method provided in this embodiment of the present disclosure from the perspective of the synchronization and distribution device processing an underlying cloud platform in a hybrid cloud platform. As shown in FIG. 11, FIG. 11 is a flowchart of an information configuration method according to an embodiment of the present disclosure. The method may include the following steps:

201: Synchronize network planning information and subnet planning information of a hybrid cloud platform.

Configuration information of the hybrid cloud platform may include the network planning information and the subnet planning information of the hybrid cloud platform, the network planning information is used to indicate network planning of the hybrid cloud platform, the subnet planning information is used to indicate subnet planning of the hybrid cloud platform, and the hybrid cloud platform is constructed over the at least one underlying cloud platform.

The network planning information and the subnet planning information of the hybrid cloud platform are synchronized so that network information in the hybrid cloud platform is consistent with network information of the hybrid cloud platform that is stored in a management center platform, subnet information in the hybrid cloud platform is consistent with subnet information of the hybrid cloud platform that is managed by the management center platform, and a network and a subnet that correspond to each underlying cloud platform constructing the hybrid cloud platform are consistent with a network and a subnet that are planned by the management center platform for the underlying cloud platform.

Figure 12:
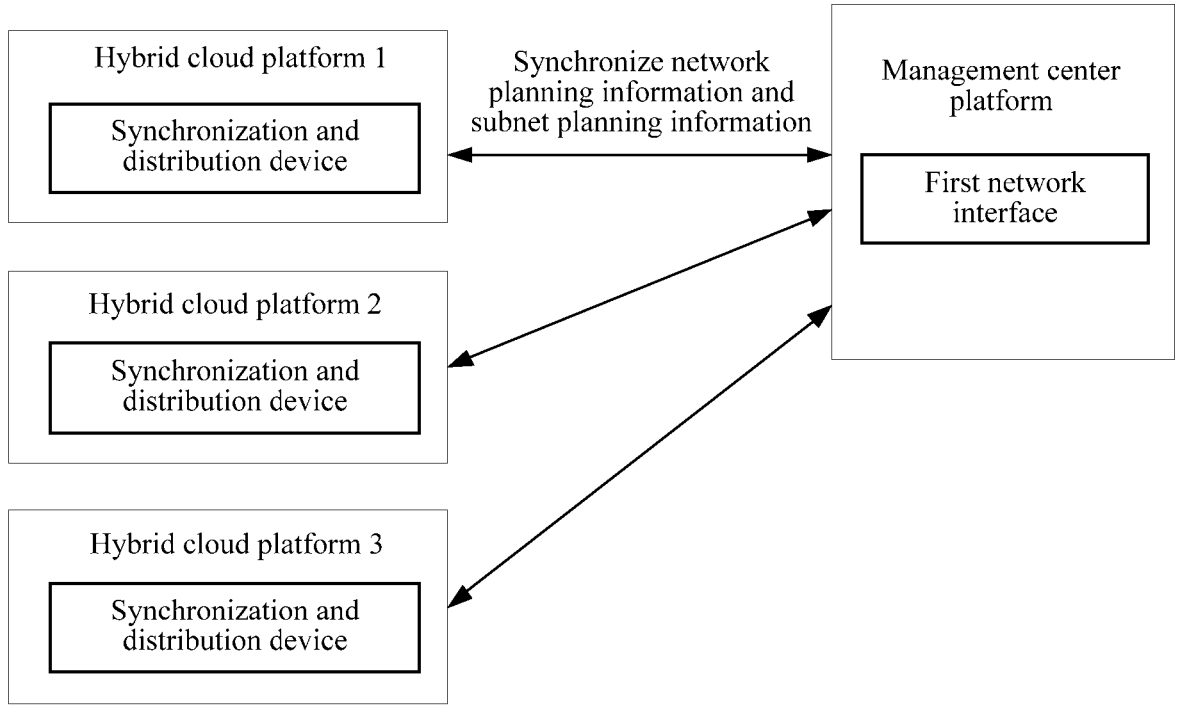
FIG. 12 is a schematic diagram of a correspondence between a management center platform and multiple hybrid cloud platforms according to an embodiment of the present disclosure.

In this embodiment of the present disclosure, the management center platform stores planned network planning information and subnet planning information of hybrid cloud platforms. As shown in FIG. 12, a management center platform stores respective planned network planning information and subnet planning information of a hybrid cloud platform 1, a hybrid cloud platform 2, and a hybrid cloud platform 3. When a synchronization and distribution device in the hybrid cloud platform 1 performs the information configuration method provided in this embodiment of the present disclosure, step 101 is performed so that network information in the hybrid cloud platform 1 is consistent with network information of the hybrid cloud platform 1 that is managed by the management center platform, and subnet information in the hybrid cloud platform 1 is consistent with subnet information of the hybrid cloud platform 1 that is managed by the management center platform.

With the management center platform, centralized management can be performed on the planned network planning information and subnet planning information of the hybrid cloud platforms. If a new hybrid cloud platform is added, a user may acquire network planning information and subnet planning information of each existing hybrid cloud platform by using the management center platform. In this way, when network information and subnet information of the newly added hybrid cloud platform are planned, a probability of repetition between the network information and the subnet information of the newly added hybrid cloud platform and network information and subnet information of each existing hybrid cloud platform can be reduced, thereby facilitating expansion of a hybrid cloud platform.

202: Acquire network information corresponding to the underlying cloud platform from the network planning information, and acquire subnet information corresponding to the underlying cloud platform from the subnet planning information.

203: Determine, based on the network information corresponding to the underlying cloud platform, whether a network is created for the underlying cloud platform, to obtain a first determining result.

In some embodiments of the present disclosure, a feasible manner for determining, based on the network information corresponding to the underlying cloud platform, whether a network is created for the underlying cloud platform, to obtain a first determining result include: converting network identification information in the network information corresponding to the underlying cloud platform into target network identification information that can be identified by the underlying cloud platform; determining whether the target network identification information is stored in description information of the underlying cloud platform; and obtaining, when the target network identification information is not stored in the description information of the underlying cloud platform, the first determining result indicating that no network is created for the underlying cloud platform.

The description information of the underlying cloud platform records various information related to the underlying cloud platform, for example, stores at least a technology type corresponding to the platform, identification information of the platform, network identification information corresponding to the platform, and subnet identification information corresponding to the platform. If a network is created for the underlying cloud platform, the network identification information corresponding to the platform is identification information of the created network. If no network is created for the underlying cloud platform, the network identification information corresponding to the platform is empty. Therefore, whether a network is created for the underlying cloud platform may be determined by determining whether the target network identification information is stored in the description information of the underlying cloud platform.

It should be noted that because the management center platform performs centralized management on network information and subnet information of all the hybrid cloud platforms, the management center platform presets a format of information stored in the management center platform, and the underlying cloud platform cannot identify the format set by the management center platform, the network identification information in the network information corresponding to the underlying cloud platform needs to be converted into the target network identification information that can be identified by the underlying cloud platform.

204: Create, when the first determining result indicates that no network is created for the underlying cloud platform, a network for the underlying cloud platform based on the network information corresponding to the underlying cloud platform.

In some embodiments of the present disclosure, a feasible manner for creating a network for the underlying cloud platform includes: determining a technology type corresponding to the underlying cloud platform based on the network information corresponding to the underlying cloud platform; obtaining a network invocation instance corresponding to the underlying cloud platform based on the technology type corresponding to the underlying cloud platform; acquiring a network creation method corresponding to the network invocation instance corresponding to the underlying cloud platform; and running the network creation method to create a network for the underlying cloud platform.

Figure 13:
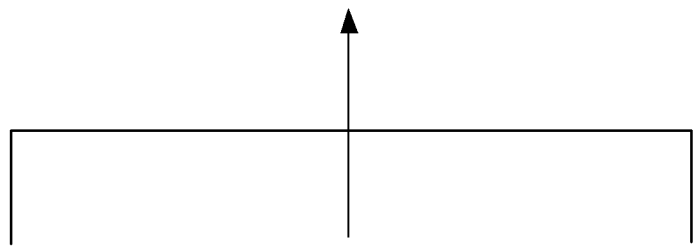
FIG. 13 is a schematic diagram of an interface INetManager according to an embodiment of the present disclosure.

Specifically, the determining whether a network is created and a network creation process are described in this embodiment of the present disclosure with reference to FIG. 13 to FIG. 15. A synchronization and distribution device constructs an interface INetManager for a network, and standardizes Create, Delete, Update, and Get methods for the network, and after constructing the interface INetManager, standardizes network management types for underlying cloud platforms of different technology types. As shown in FIG. 13, AwsNetManager is provided for an Amazon cloud, OpenStackNetManager is provided for an OpenStack basic cloud, and VMWareNetManager is provided for a VMWare basic cloud.

A parameter Region in FIG. 13 identifies a description type of an underlying cloud platform, and records description information of the underlying cloud platform. As shown in FIG. 14, the parameter Region includes a number (considered as an optional form of identification information of the underlying cloud platform), an access address, a technology type, and the like of the underlying cloud platform. A parameter Network in FIG. 13 identifies a description type of a network, and records network information corresponding to an underlying cloud platform. As shown in FIG. 15, the parameter Network includes a number and network identification information of the underlying cloud platform. Therefore, the number of the underlying cloud platform can be acquired from the network information recorded in the parameter Network, and a corresponding parameter Region can be found based on the number of the underlying cloud platform. It is determined whether target network identification information is stored in description information recorded in the parameter Region. If the target network identification information is not stored, it indicates that no network is created for the underlying cloud platform. In this case, a technology type corresponding to the underlying cloud platform may be acquired from the parameter Region.

After the technology type corresponding to the underlying cloud platform is acquired, a network invocation instance corresponding to the underlying cloud platform may be obtained from a network-related configuration file. For example, if the technology type corresponding to the underlying cloud platform is Type="Openstack", a network invocation instance App.Impl.OpenStack.OpenStackNetworkManager corresponding to OpenStackNetManager is acquired from the configuration file. Then a network creation method OpenStackNetworkManager.create is found based on App.Impl.OpenStack.OpenStackNetworkManager, and a network can be created for the underlying cloud platform by running OpenStackNetworkManager.create. Therefore, when the synchronization and distribution device runs a method INetManager.Create through the interface INetManager to create a network for the underlying cloud platform, the synchronization and distribution device actually invokes OpenStackNetworkManager.create through the network creation process to create a network for the underlying cloud platform.

205: Determine, based on the subnet information corresponding to the underlying cloud platform, whether a network is created for the underlying cloud platform and whether a subnet is created for the underlying cloud platform, to obtain a second determining result.

A feasible manner for determining, based on the subnet information corresponding to the underlying cloud platform, whether a network is created for the underlying cloud platform and whether a subnet is created for the underlying cloud platform include as follows: Network identification information and subnet identification information in the subnet information corresponding to the underlying cloud platform are respectively converted into target network identification information and target subnet identification information that can be identified by the underlying cloud platform. When it is determined that the target network identification information that can be identified is stored in description information of the underlying cloud platform but the target subnet identification information that can be identified is not stored in the description information of the underlying cloud platform, it indicates that no subnet is created for the underlying cloud platform.

It should be noted that because the management center platform presets a format of subnet identification information stored in the management center platform, and the underlying cloud platform cannot identify the format set by the management center platform, the subnet identification information in the subnet information corresponding to the underlying cloud platform needs to be converted into the target subnet identification information that can be identified by the underlying cloud platform.

206: Create, when the second determining result indicates that a network is created for the underlying cloud platform but no subnet is created for the underlying cloud platform, a subnet for the underlying cloud platform based on the subnet information corresponding to the underlying cloud platform.

In some embodiments of the present disclosure, a feasible manner for creating a subnet for the underlying cloud platform includes: determining a technology type corresponding to the underlying cloud platform based on the subnet information corresponding to the underlying cloud platform; obtaining a subnet invocation instance corresponding to the underlying cloud platform based on the technology type corresponding to the underlying cloud platform; acquiring a subnet creation method corresponding to the subnet invocation instance corresponding to the underlying cloud platform; and running the subnet creation method to create a subnet for the underlying cloud platform.

Specifically, the determining whether a subnet is created and a subnet creation process are described in this embodiment of the present disclosure with reference to FIG. 16 and FIG. 17. The synchronization and distribution device constructs an interface ISubNetManager for a subnet, and standardizes Create, Delete, Update, and Get methods for the subnet, and after constructing the interface ISubNetManager, standardizes subnet management types for underlying cloud platforms of different technology types. As shown in FIG. 16, AwsSubNetManager is provided for an Amazon cloud, OpenStackSubNetManager is provided for an OpenStack basic cloud, and VMWareSubNetManager is provided for a VMWare basic cloud.

A parameter SubNet in FIG. 16 identifies a description type of a subnet, and records subnet information corresponding to an underlying cloud platform. As shown in FIG. 17, the parameter SubNet includes a number, subnet identification information, and subnet identification information of the underlying cloud platform. Therefore, the number of the underlying cloud platform can be acquired from the subnet information recorded in the parameter SubNet, and a corresponding parameter Region can be found based on the number of the underlying cloud platform. It is determined whether target network identification information and target subnet identification information are stored in description information recorded in the parameter Region. If the target network identification information is stored but the target subnet identification information is not stored, it indicates that no subnet is created for the underlying cloud platform. In this case, a technology type corresponding to the underlying cloud platform is acquired from the parameter Region.

After the technology type corresponding to the underlying cloud platform is acquired, a subnet invocation instance corresponding to the underlying cloud platform may be acquired from a subnet-related configuration file. For example, if the technology type corresponding to the underlying cloud platform is Type="Openstack", a subnet invocation instance App.Impl.OpenStack.OpenStackSubNetworkManager corresponding to OpenStackSubNetManager is acquired from the subnet-related configuration file. Then a subnet creation method OpenStackSubNetworkManager.create is found based on App.Impl.OpenStack.OpenStackSubNetworkManager, and a subnet can be created for the underlying cloud platform by running OpenStackSubNetworkManager.create. Therefore, when the synchronization and distribution device runs a method ISubNetManager.Create through the interface ISubNetManager to create a subnet for the underlying cloud platform, the synchronization and distribution device actually invokes OpenStackSubNetworkManager.create through the subnet creation process to create a subnet for the underlying cloud platform.

Figure 18:
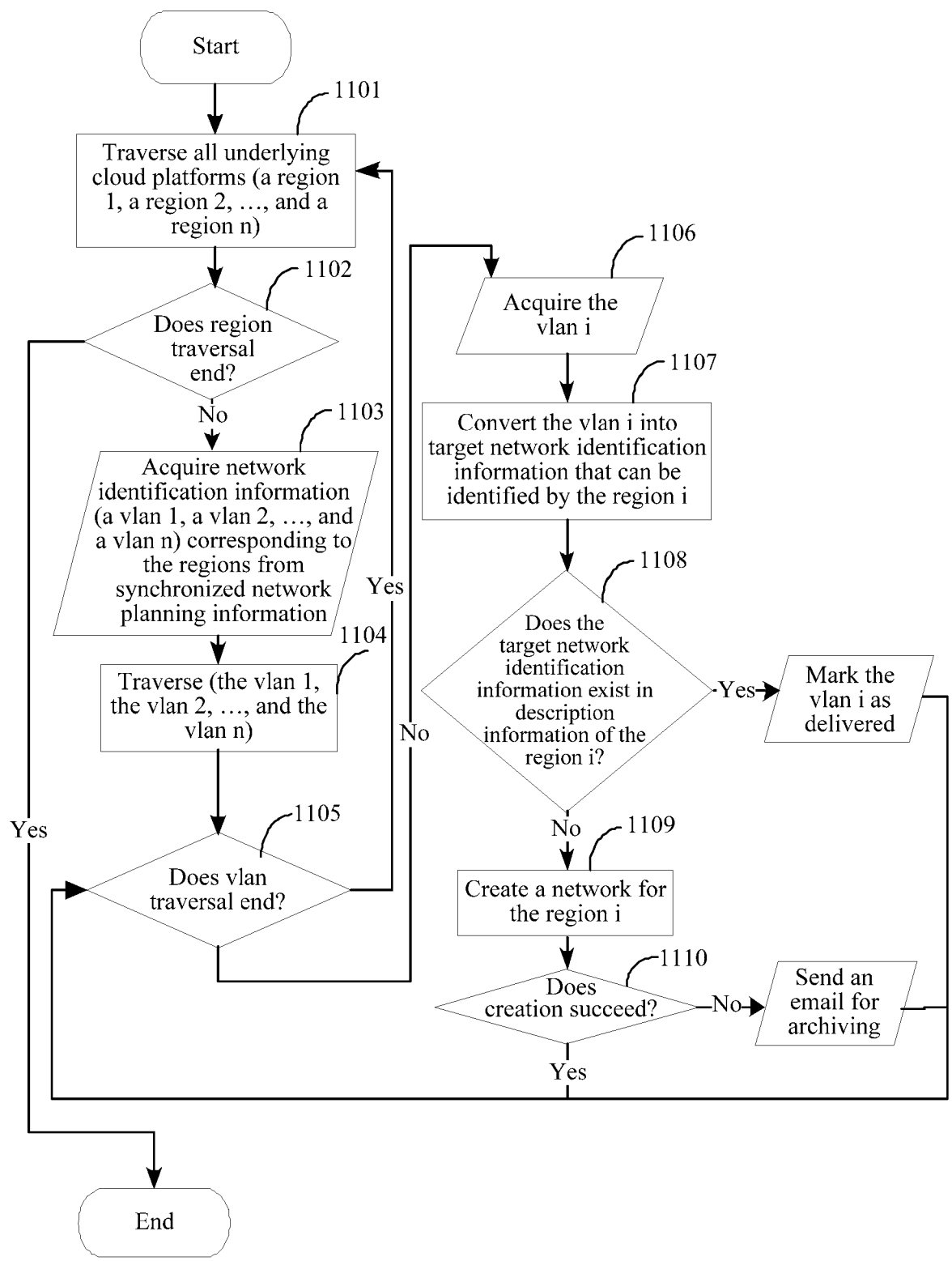
FIG. 18 is a schematic diagram of creating a network according to an embodiment of the present disclosure.
Figure 19:
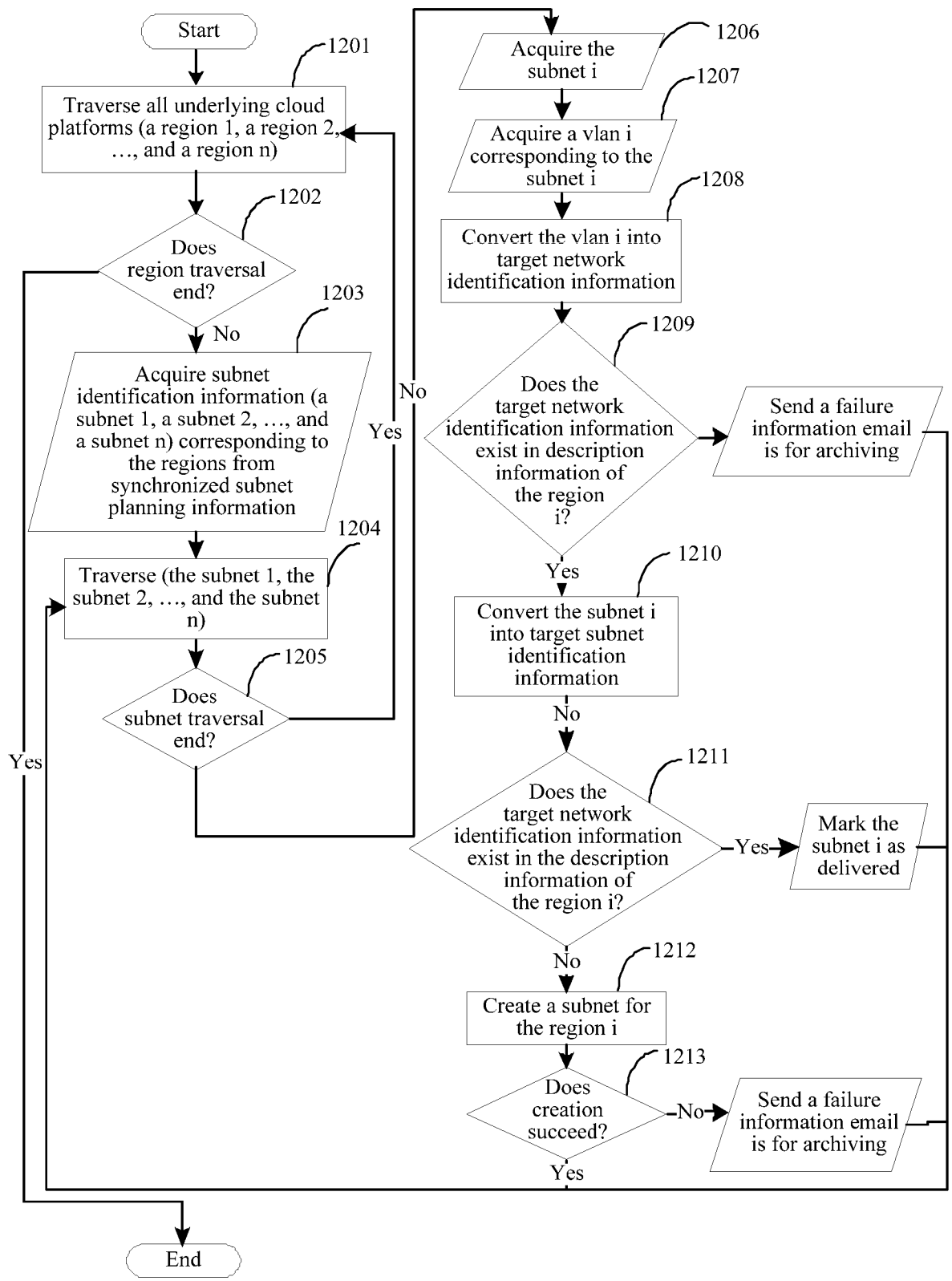
FIG. 19 is a schematic diagram of creating a subnet according to an embodiment of the present disclosure.

Processes of creating a network and a subnet for an underlying cloud platform are described below by using an example in which a hybrid cloud platform is constructed over n underlying cloud platforms (a region 1, . . . , and a region n). FIG. 18 shows a process of creating a network for an underlying cloud platform, which may include the following steps:

1101: Traverse all underlying cloud platforms (a region 1, a region 2, . . . , and a region n), where a region i is an $i^{th}$ underlying cloud platform.

1102: Determine whether region traversal ends. If yes, the procedure ends. If no, step 1103 is performed.

1103: Acquire network identification information (a vlan 1, a vlan 2, . . . , and a vlan n) corresponding to the regions from synchronized network planning information, where a vlan i is an $i^{th}$ piece of network identification information.

1104: Traverse (the vlan 1, the vlan 2, . . . , and the vlan n).

1105: Determine whether vlan traversal ends. If yes, the procedure ends. If no, step 1106 is performed.

1106: Acquire the vlan i.

1107: Convert the vlan i into target network identification information that can be identified by the region i.

1108: Determine whether the target network identification information exists in description information of the region i. If yes, the vlan i is marked as delivered, that is, a network is created for the region i. If no, step 1109 is performed.

1109: Create a network for the region i.

1110: Determine whether creation succeeds, and if yes, go back to step 1105. If no, a creation failure email is sent for archiving. The creation failure email carries the failed vlan i, to indicate that the network is not successfully created for the region i.

FIG. 18 shows a process of creating a subnet for an underlying cloud platform, which may include the following steps:

1201: Traverse all underlying cloud platforms (a region 1, a region 2, . . . , and a region n), where a region i is an $i^{th}$ underlying cloud platform.

1202: Determine whether region traversal ends. If yes, the procedure ends. If no, step 1203 is performed.

1203: Acquire subnet identification information (a subnet 1, a subnet 2, . . . , and a subnet n) corresponding to the regions from synchronized subnet planning information, where a subnet i is an $i^{th}$ piece of subnet identification information.

1204: Traverse (the subnet 1, the subnet 2, . . . , and the subnet n).

1205: Determine whether subnet traversal ends. If yes, the procedure ends. If no, step 1206 is performed.

1206: Acquire the subnet i.

1207: Acquire a vlan i corresponding to the subnet i.

1208: Convert the vlan i into target network identification information that can be identified by the region i.

1209: Determine whether the target network identification information exists in description information of the region i. If yes, step 1210 is performed. If no, a creation failure email is sent for archiving. The creation failure email carries the failed vlan i, to indicate that a network is not successfully created for the region i.

1210: Convert the subnet i into target subnet identification information that can be identified by the region i.

1211: Determine whether the target network identification information exists in the description information of the region i. If yes, the subnet i is marked as delivered, that is, a subnet is created for the region i. If no, step 1212 is performed.

1212: Create a subnet for the region i.

1213: Determine whether creation succeeds, and if yes, go back to step 1205. If no, a creation failure email is sent for archiving. The creation failure email carries the failed subnet i, to indicate that the subnet is not successfully created for the region i.

Based on the foregoing technical solution, in the information configuration method provided in this embodiment of the present disclosure, after network planning information and subnet planning information of a hybrid cloud platform are synchronized, network information corresponding to an underlying cloud platform may be acquired from the network planning information, and when it is determined based on the network information that no network is created for the underlying cloud platform, a network is created for the underlying cloud platform. Moreover, subnet information corresponding to the underlying cloud platform may be further acquired from the subnet planning information, and when it is determined based on the subnet information that a network is created for the underlying cloud platform but no subnet is created for the underlying cloud platform, a subnet is created for the underlying cloud platform. In this way, after the network planning information and the subnet planning information of the hybrid cloud platform are planned, an underlying cloud platform for which no network is created and no subnet is created can be accurately determined, and a network and a subnet can be automatically created for the underlying cloud platform, thereby automatically and accurately creating a network and a subnet for an underlying cloud platform.

Figure 20:
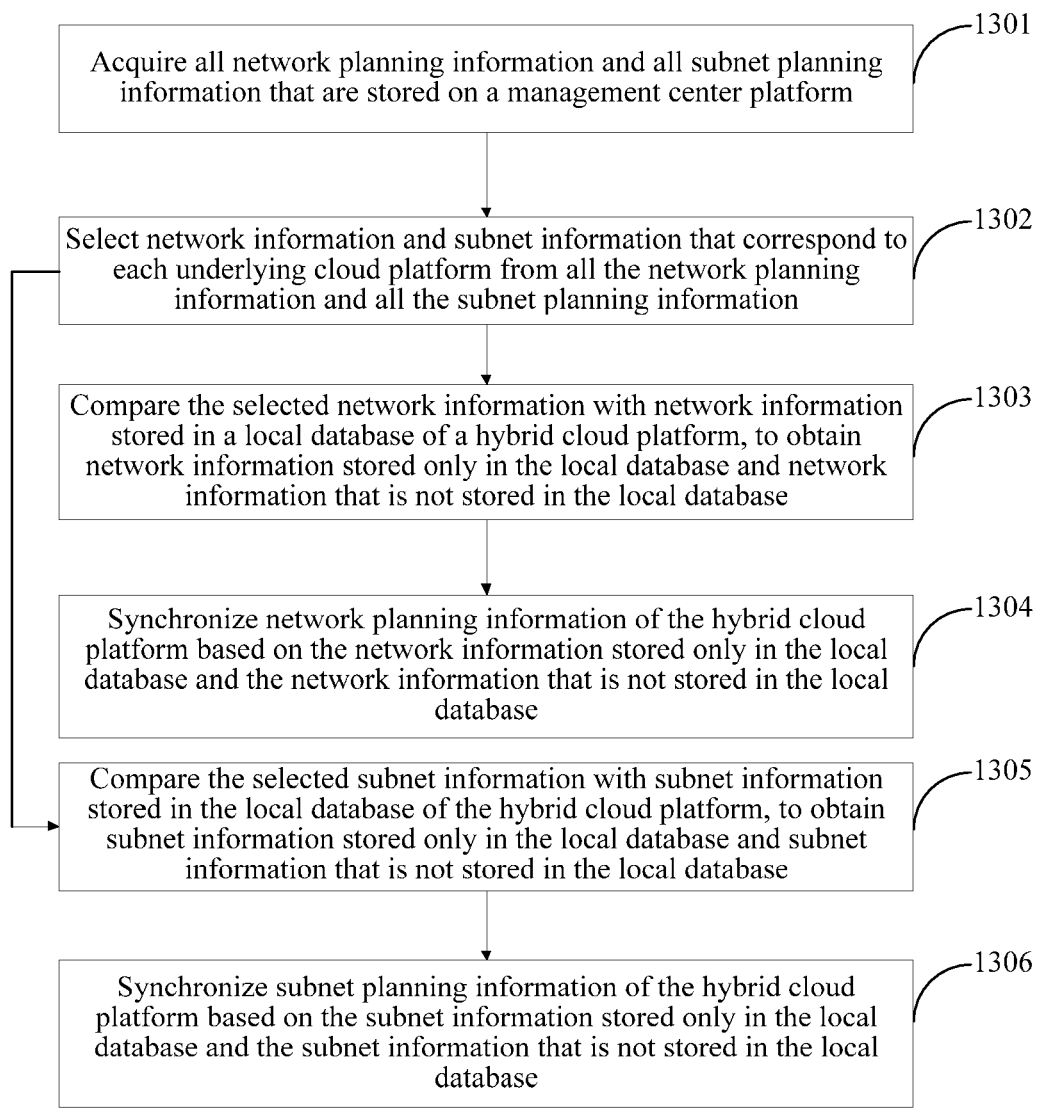
FIG. 20 is a schematic diagram of synchronizing information according to an embodiment of the present disclosure.

In this embodiment of the present disclosure, a feasible manner for synchronizing network planning information and subnet planning information of a hybrid cloud platform is shown in FIG. 20, and may include the following steps:

1301: Acquire all network planning information and all subnet planning information that are stored on a management center platform.

In some embodiments of the present disclosure, a manner for acquiring all network planning information and all subnet planning information may include as follows: The management center platform may actively push all the network planning information and all the subnet planning information to hybrid cloud platforms. After the network planning information and the subnet planning information in the management center platform are updated, the management center platform may immediately push the network planning information and the subnet planning information to the hybrid cloud platforms. However, in such a manner, after a quantity of managed hybrid cloud platforms changes, the management center platform needs to modify a message for pushing all the network planning information and all the subnet planning information. For example, a new hybrid cloud platform is added, and the management center platform needs to add an address of the new hybrid cloud platform to a pushed message, so that the new hybrid cloud platform may acquire all the network planning information and all the subnet planning information that are managed by the management center platform.

In some embodiments of the present disclosure, a manner for acquiring all network planning information and all subnet planning information may include: periodically acquiring all the network planning information and all the subnet planning information from the management center platform. In this way, the management center platform does not need to make a modification for the change in the quantity of managed hybrid cloud platforms, but such a manner lowers timeliness of information acquisition.

1302: Select network information and subnet information that correspond to each underlying cloud platform from all the network planning information and all the subnet planning information. Specifically, the network information and the subnet information that correspond to each underlying cloud platform are selected based on a mapping relationship between the underlying cloud platform and a network and a mapping relationship between the underlying cloud platform and a subnet.

1303: Compare the selected network information with network information stored in a local database of a hybrid cloud platform, to obtain network information stored only in the local database and network information that is not stored in the local database.

1304: Synchronize network planning information of the hybrid cloud platform based on the network information stored only in the local database and the network information that is not stored in the local database. In some embodiments of the present disclosure, the network information stored only in the local database is deleted, and a network corresponding to the network information stored only in the local database may be further deleted; and the network information that is not stored is added to the local database, to synchronize the network planning information of the hybrid cloud platform, so that the network information in the hybrid cloud platform is consistent with the network information of the hybrid cloud platform that is managed by the management center platform.

1305: Compare the selected subnet information with subnet information stored in the local database of the hybrid cloud platform, to obtain subnet information stored only in the local database and subnet information that is not stored in the local database.

1306: Synchronize subnet planning information of the hybrid cloud platform based on the subnet information stored only in the local database and the subnet information that is not stored in the local database. In some embodiments of the present disclosure, the subnet information stored only in the local database is deleted, and a subnet corresponding to the subnet information stored only in the local database is deleted; and the subnet information that is not stored is added to the local database, to synchronize the subnet planning information of the hybrid cloud platform, so that the subnet information in the hybrid cloud platform is consistent with the subnet information of the hybrid cloud platform that is managed by the management center platform.

Through the foregoing technical solution, subnet information and network information that are stored only in a local database are deleted, and subnet information and network information that are not stored in the local database are added to the local database, so that network information and subnet information in the local database are consistent with network information and subnet information of a corresponding hybrid cloud platform that are managed by a management center platform. Moreover, when the subnet information and the network information that are stored only in the local database are deleted, a network corresponding to the network information that is stored only in the local database and a subnet corresponding to the subnet information that is stored only in the local database are deleted, so that a network architecture of each underlying cloud platform constructing the hybrid cloud platform is consistent with a network architecture planned on the management center platform for the underlying cloud platform, thereby improving network construction accuracy.

Next, an information configuration apparatus provided in an embodiment of the present disclosure is described. The information configuration apparatus described below may be considered as a function unit architecture that needs to be disposed for the synchronization and distribution device for implementing the information configuration method provided in the foregoing embodiment of the present disclosure.

Figure 21:
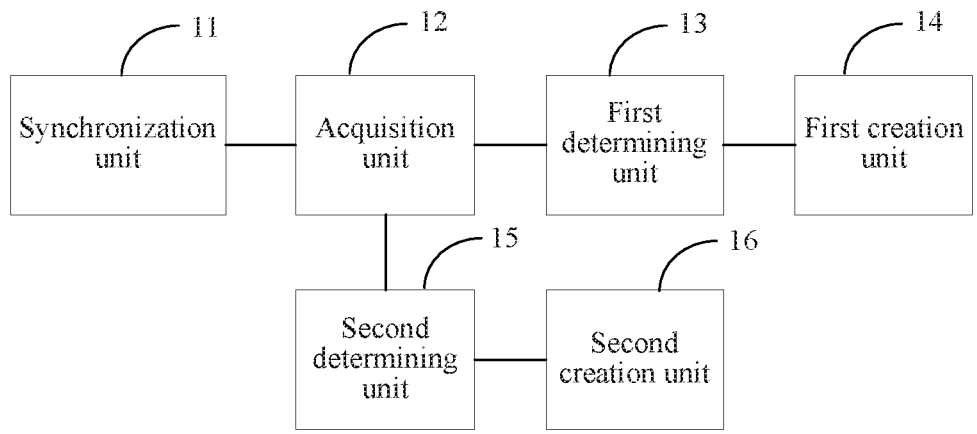
FIG. 21 is a schematic structural diagram of an information configuration apparatus according to an embodiment of the present disclosure.

FIG. 21 is a schematic structural diagram of an information configuration apparatus according to an embodiment of the present disclosure. The apparatus may include: a synchronization unit 11, an acquisition unit 12, a first determining unit 13, a first creation unit 14, a second determining unit 15, and a second creation unit 16.

The synchronization unit 11 is configured to synchronize network planning information and subnet planning information of a hybrid cloud platform, where the network planning information is used to indicate network planning of the hybrid cloud platform, the subnet planning information is used to indicate subnet planning of the hybrid cloud platform, and the hybrid cloud platform is constructed over at least one underlying cloud platform.

The network planning information and the subnet planning information of the hybrid cloud platform are synchronized so that network information in the hybrid cloud platform is consistent with network information of the hybrid cloud platform that is stored in a management center platform, subnet information in the hybrid cloud platform is consistent with subnet information of the hybrid cloud platform that is managed by the management center platform, and a network and a subnet that correspond to each underlying cloud platform constructing the hybrid cloud platform are consistent with a network and a subnet that are planned by the management center platform for the underlying cloud platform.

The acquisition unit 12 is configured to acquire network information corresponding to the underlying cloud platform from the network planning information, and acquire subnet information corresponding to the underlying cloud platform from the subnet planning information.

The first determining unit 13 is configured to determine, based on the network information corresponding to the underlying cloud platform, whether a network is created for the underlying cloud platform, to obtain a first determining result. In some embodiments of the present disclosure, a manner for the first determining unit 13 to determine whether a network is created includes: converting network identification information in the network information corresponding to the underlying cloud platform into target network identification information that can be identified by the underlying cloud platform; determining whether the target network identification information is stored in description information of the underlying cloud platform; and obtaining, when the target network identification information is not stored in the description information of the underlying cloud platform, the first determining result indicating that no network is created for the underlying cloud platform.

The description information of the underlying cloud platform records various information related to the underlying cloud platform, for example, stores at least a technology type corresponding to the platform, identification information of the platform, network identification information corresponding to the platform, and subnet identification information corresponding to the platform. If a network is created for the underlying cloud platform, the network identification information corresponding to the platform is identification information of the created network. If no network is created for the underlying cloud platform, the network identification information corresponding to the platform is empty. Therefore, whether a network is created for the underlying cloud platform may be determined by determining whether the target network identification information is stored in the description information of the underlying cloud platform.

Because the management center platform performs centralized management on network information and subnet information of all the hybrid cloud platforms, the management center platform presets a format of information stored in the management center platform, and the underlying cloud platform cannot identify the format set by the management center platform, the network identification information in the network information corresponding to the underlying cloud platform needs to be converted into the target network identification information that can be identified by the underlying cloud platform.

The first creation unit 14 is configured to create, when the first determining result indicates that no network is created for the underlying cloud platform, a network for the underlying cloud platform based on the network information corresponding to the underlying cloud platform. In some embodiments of the present disclosure, a feasible manner for the first creation unit 14 to create a network for the underlying cloud platform includes: determining a technology type corresponding to the underlying cloud platform based on the network information corresponding to the underlying cloud platform; obtaining a network invocation instance corresponding to the underlying cloud platform based on the technology type corresponding to the underlying cloud platform; acquiring a network creation method corresponding to the network invocation instance corresponding to the underlying cloud platform; and running the network creation method to create a network for the underlying cloud platform. For a specific process, refer to the related description in the method embodiment, which is not further described in this embodiment of the present disclosure.

The second determining unit 15 is configured to determine, based on the subnet information corresponding to the underlying cloud platform, whether a network is created for the underlying cloud platform and whether a subnet is created for the underlying cloud platform, to obtain a second determining result. In some embodiments of the present disclosure, a feasible manner for the second determining unit 15 to determine whether a network is created and whether a subnet is created includes as follows: Network identification information and subnet identification information in the subnet information corresponding to the underlying cloud platform are respectively converted into target network identification information and target subnet identification information that can be identified by the underlying cloud platform. When it is determined that the target network identification information that can be identified is stored in description information of the underlying cloud platform but the target subnet identification information that can be identified is not stored in the description information of the underlying cloud platform, it indicates that no subnet is created for the underlying cloud platform.

The second creation unit 16 is configured to create, when the second determining result indicates that a network is created for the underlying cloud platform but no subnet is created for the underlying cloud platform, a subnet for the underlying cloud platform based on the subnet information corresponding to the underlying cloud platform. In some embodiments of the present disclosure, a feasible manner for the second creation unit 16 to create a subnet for the underlying cloud platform includes: determining a technology type corresponding to the underlying cloud platform based on the subnet information corresponding to the underlying cloud platform; obtaining a subnet invocation instance corresponding to the underlying cloud platform based on the technology type corresponding to the underlying cloud platform; acquiring a subnet creation method corresponding to the subnet invocation instance corresponding to the underlying cloud platform; and running the subnet creation method to create a subnet for the underlying cloud platform. For a specific process, refer to the related description in the method embodiment, which is not further described in this embodiment of the present disclosure.

Based on the foregoing technical solution, in the information configuration apparatus provided in this embodiment of the present disclosure, after network planning information and subnet planning information of a hybrid cloud platform are synchronized, network information corresponding to an underlying cloud platform may be acquired from the network planning information, and when it is determined based on the network information that no network is created for the underlying cloud platform, a network is created for the underlying cloud platform. Moreover, subnet information corresponding to the underlying cloud platform may be further acquired from the subnet planning information, and when it is determined based on the subnet information that a network is created for the underlying cloud platform but no subnet is created for the underlying cloud platform, a subnet is created for the underlying cloud platform. In this way, after the network planning information and the subnet planning information of the hybrid cloud platform are planned, an underlying cloud platform for which no network is created and no subnet is created can be accurately determined, and a network and a subnet can be automatically created for the underlying cloud platform, thereby automatically and accurately creating a network and a subnet for an underlying cloud platform.

Figure 22:
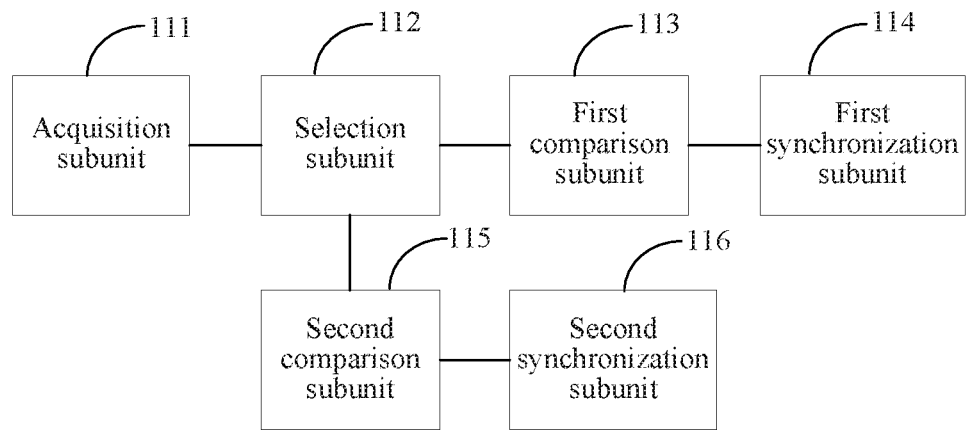
FIG. 22 is a schematic structural diagram of a synchronization unit in an information configuration apparatus according to an embodiment of the present disclosure.

FIG. 22 is a schematic structural diagram of a synchronization unit in an information configuration apparatus according to an embodiment of the present disclosure. The synchronization unit may include: an acquisition subunit 111, a selection subunit 112, a first comparison subunit 113, a first synchronization subunit 114, a second comparison subunit 115, and a second synchronization subunit 116.

The acquisition subunit 111 is configured to acquire all network planning information and all subnet planning information that are stored on a management center platform. In some embodiments of the present disclosure, a feasible manner for acquiring all network planning information and all subnet planning information includes as follows: The management center platform actively pushes all the network planning information and all the subnet planning information to each hybrid cloud platform, or all the network planning information and all the subnet planning information are periodically acquired from the management center platform.

The selection subunit 112 is configured to select the network information and the subnet information that correspond to each underlying cloud platform from all the network planning information and all the subnet planning information. Specifically, the network information and the subnet information that correspond to each underlying cloud platform are selected based on a mapping relationship between the underlying cloud platform and a network and a mapping relationship between the underlying cloud platform and a subnet.

The first comparing subunit 113 is configured to compare the selected network information with network information stored in the local database, to obtain network information stored only in the local database and network information that is not stored in the local database.

The first synchronization subunit 114 is configured to synchronize network planning information of a hybrid cloud platform based on the network information stored only in the local database and the network information that is not stored in the local database. In some embodiments of the present disclosure, a manner for synchronizing network planning information of a hybrid cloud platform includes: deleting the network information stored only in the local database, and deleting a network corresponding to the network information stored only in the local database; and adding the network information that is not stored to the local database, to synchronize the network planning information of the hybrid cloud platform, so that the network information in the hybrid cloud platform is consistent with the network information of the hybrid cloud platform that is managed by the management center platform.

The second comparison subunit 115 is configured to compare the selected subnet information with subnet information stored in the local database, to obtain subnet information stored only in the local database and subnet information that is not stored in the local database.

The second synchronization subunit 116 is configured to synchronize subnet planning information of the hybrid cloud platform based on the subnet information stored only in the local database and the subnet information that is not stored in the local database. In some embodiments of the present disclosure, a manner for synchronizing subnet planning information of the hybrid cloud platform includes: deleting the subnet information stored only in the local database, and deleting a subnet corresponding to the subnet information stored only in the local database; and adding the subnet information that is not stored to the local database, to synchronize the subnet planning information of the hybrid cloud platform, so that the subnet information in the hybrid cloud platform is consistent with the subnet information of the hybrid cloud platform that is managed by the management center platform.

Through the foregoing technical solution, subnet information and network information that are stored only in a local database are deleted, and subnet information and network information that are not stored in the local database are added to the local database, so that network information and subnet information in the local database are consistent with network information and subnet information of a corresponding hybrid cloud platform that are managed by a management center platform. Moreover, when the subnet information and the network information that are stored only in the local database are deleted, a network corresponding to the network information that is stored only in the local database and a subnet corresponding to the subnet information that is stored only in the local database are deleted, so that a network architecture of each underlying cloud platform constructing the hybrid cloud platform is consistent with a network architecture planned on the management center platform for the underlying cloud platform, thereby improving network construction accuracy.

In addition, an embodiment of the present disclosure further provides an information configuration system, including: a management center platform and a hybrid cloud platform. The hybrid cloud platform is constructed over at least one underlying cloud platform. Optional structures of the hybrid cloud platform and the management center platform are shown in FIG. 10, and the synchronization and distribution device may implement the information configuration method provided in the foregoing embodiment of the present disclosure by using the information configuration apparatus shown in FIG. 21.

Figure 23:
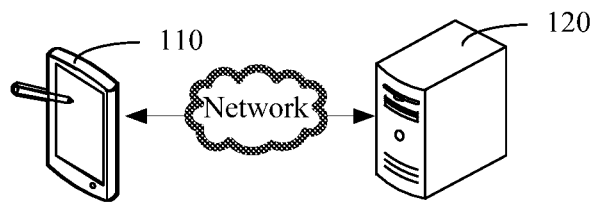
FIG. 23 is a schematic diagram of an application environment of a method for centralized management for a hybrid cloud in an embodiment.

FIG. 23 is a schematic diagram of an application environment of a method for centralized management for a hybrid cloud in an embodiment. As shown in FIG. 23, the application environment includes a terminal 110 and a server 120. An application program and an authentication client are deployed on the terminal 110. An authentication service end is deployed on the server 120. The application program may be a browser or an application (App) or the like. The terminal 110 communicates with the server 120. The authentication client on the terminal 110 may receive an access request that is initiated by a user for a resource in a hybrid cloud by using the application program, detect whether the access request is verified, and send the access request to the authentication service end of the server 120 if the access request is not verified. The authentication service end performs identity authentication on the user of the access request, generates token information after authentication succeeds, and sends the token information to the authentication client. Then the authentication service end receives the access request and the token information that are sent by the authentication client, decrypts and verifies the token information, and sends a user identifier of the user sending the access request to the authentication client after verification succeeds. The authentication client receives corresponding response information based on the user identifier, and sends the response information to the application program.

Figure 24A:
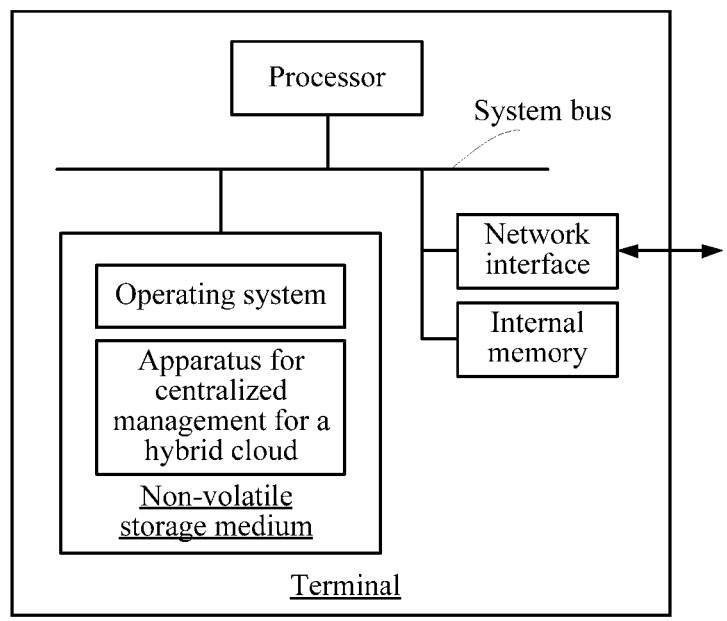
FIG. 24A is a schematic diagram of an internal structure of a terminal in an embodiment.

FIG. 24A is a schematic diagram of an internal structure of a terminal in an embodiment. As shown in FIG. 24A, the terminal includes a processor, a non-volatile storage medium, an internal memory, and a network interface that are connected by using a system bus. The non-volatile storage medium of the terminal stores an operating system, and further includes an apparatus for centralized management for a hybrid cloud. The apparatus for centralized management for a hybrid cloud is configured to implement a method for centralized management for a hybrid cloud. The processor is configured to provide computing and control capabilities, to support running of the entire terminal. The internal memory in the terminal provides a running environment for the apparatus for centralized management for a hybrid cloud in the non-volatile storage medium. The internal memory may store computer-readable instructions. When the computer-readable instructions are executed by the processor, the processor can perform a method for centralized management for a hybrid cloud. The network interface is configured to perform network communication with the server, for example, send an access request to the server, and receive an identity, returned by the server, of an initiator of the access request for authentication. The terminal may be a mobile phone, a tablet computer, a personal digital assistant, a wearable device, or the like. Persons skilled in the art may understand that the structure shown in FIG. 24A is merely a block diagram of a structure part related to a solution of this application, and does not constitute a limitation on a terminal to which the solution of this application is applied. A specific terminal may include more or fewer parts than those shown in the figure, or some parts may be combined, or a different part deployment may be used.

Figure 24B:
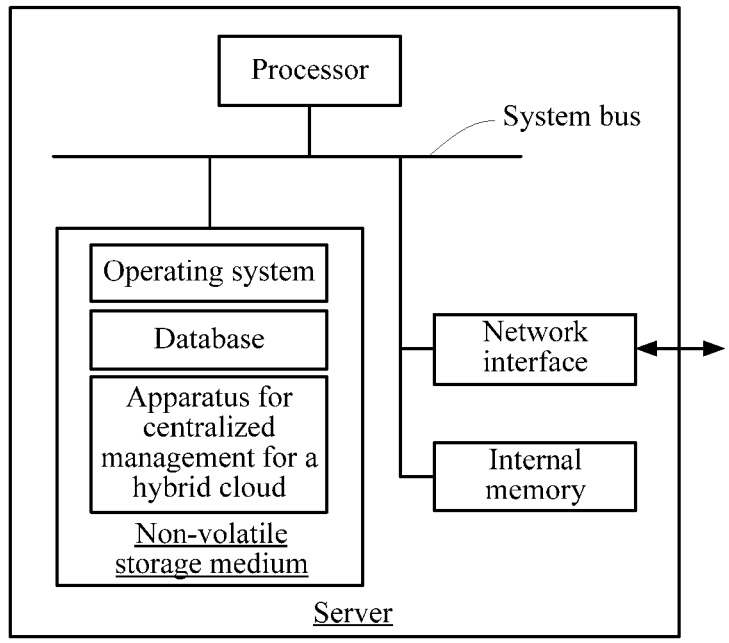
FIG. 24B is a schematic diagram of an internal structure of a server in an embodiment.

FIG. 24B is a schematic diagram of an internal structure of a server in an embodiment. As shown in FIG. 24B, the server includes a processor, a non-volatile storage medium, an internal memory, and a network interface that are connected by using a system bus. The non-volatile storage medium of the server stores an operating system, a database, and an apparatus for centralized management for a hybrid cloud. The database stores token information. The apparatus for centralized management for a hybrid cloud is configured to implement a method for centralized management for a hybrid cloud that is applicable to the server. The processor of the server is configured to provide computing and control capabilities, to support running of the entire server. The internal memory in the server provides a running environment for the apparatus for centralized management for a hybrid cloud in the non-volatile storage medium. The internal memory may store computer-readable instructions. When the computer-readable instructions are executed by the processor, the processor can perform a method for centralized management for a hybrid cloud. The network interface of the server is configured to communicate with an external terminal through a network connection, for example, receive an access request sent by an authentication client on the terminal, and return valid token information or a user identifier to the terminal. The server may be implemented by using a separate server or a server cluster including multiple servers. Persons skilled in the art may understand that the structure shown in FIG. 24B is merely a block diagram of a structure part related to a solution of this application, and does not constitute a limitation on a server to which the solution of this application is applied. A specific server may include more or fewer parts than those shown in the figure, or some parts may be combined, or a different part deployment may be used.

Figure 25:
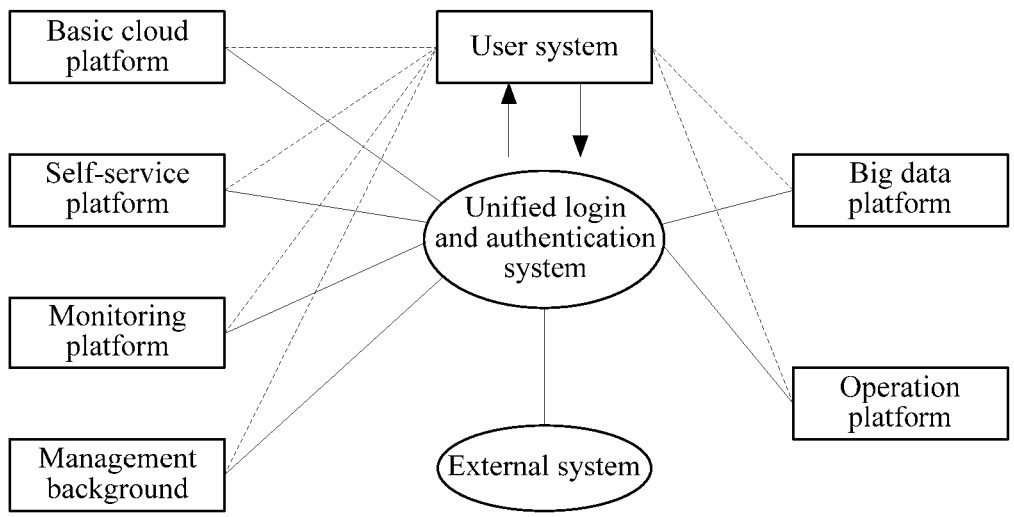
FIG. 25 is a schematic diagram of components of a system for centralized management for a hybrid cloud in an embodiment.

FIG. 25 is a schematic diagram of components of a system for centralized management for a hybrid cloud in an embodiment. As shown in FIG. 25, the system for centralized management for a hybrid cloud includes associated subsystems in a hybrid cloud, a unified login and authentication system, and a user system. The associated subsystems in the hybrid cloud include four subsystems: a basic cloud platform, a self-service platform, a monitoring platform, and a management background. The basic cloud platform is a cloud computing management platform. The self-service platform is a management platform providing a self-service cloud service for users. The monitoring platform monitors a health condition of the entire cloud platform. The management background is a management platform provided to management and maintenance personnel for use. The user system performs centralized management on the users. Data of the user system is synchronized to the basic cloud platform in real time. A user identity of each internal service in the basic cloud platform is kept consistent with that in the user system, to implement user identity consistency in the entire hybrid cloud. The unified login and authentication system may be configured to provide uniform authentication and authorization services, to implement centralized user identity management on the self-service platform, the monitoring platform, and the management background. The unified login and authentication system introduces a single sign-on (SSO) system with a security mechanism to perform centralized authorization processing for the subsystems of the hybrid cloud. Resources of all the subsystems connected to a unified login platform can be accessed through login once. In addition, the hybrid cloud also provides an interface for a cooperation platform. The cooperation platform may be a big data platform, an operation platform, or the like, which enriches existing functions of the hybrid cloud, and provides support for big data suites and operation management. The unified login and user management system has strong expandability, and a provided interface ensures that an external system can smoothly access the cloud.

It should be noted that centralized management for the hybrid cloud uses SSO login. SSO is a solution for enterprise service integration. A general SSO system mainly has three role forms: (multiple) users, (multiple) Web Apps, and (one) SSO authentication center. All authentication and login are performed in the SSO authentication center. The SSO authentication center notifies a Web App of whether a current user is an authenticated user. All the Web Apps trust the SSO authentication center. Main implementations are: cookies (browser cache)-shared, Broker-based (based on a broker, which has a server for centralized authentication and user account management), Agent-based (based on an agent, which has an agent program for authenticating user identities for different application programs, Token-based (based on a token), gateway-based, Security Assertion Markup Language (SAML)-based implementations, and the like.

Figure 26:
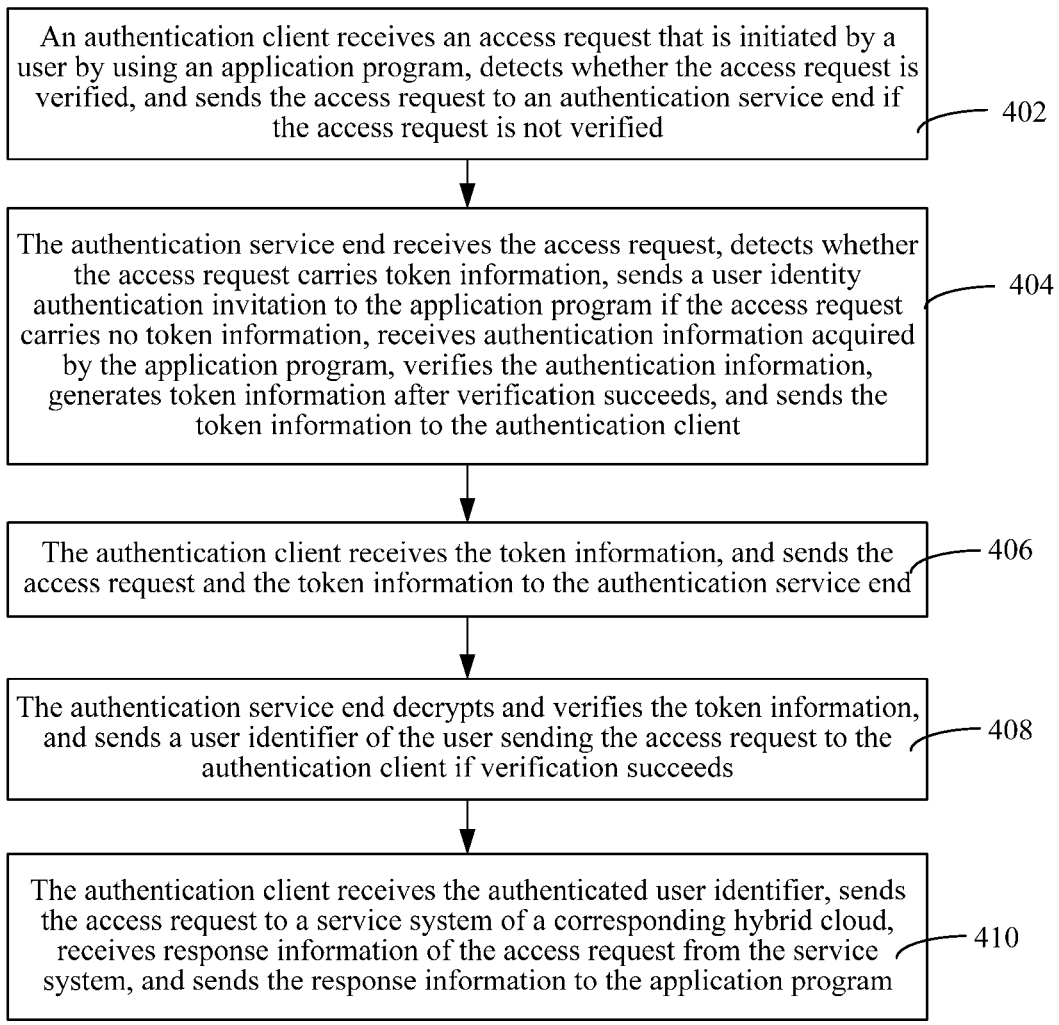
FIG. 26 is a schematic flowchart of a method for centralized management for a hybrid cloud in an embodiment.

FIG. 26 is a schematic flowchart of a method for centralized management for a hybrid cloud in an embodiment. As shown in FIG. 26, a method for centralized management for a hybrid cloud includes step 402 to step 410.

Step 402: An authentication client receives an access request that is initiated by a user by using an application program, detects whether the access request is verified, and sends the access request to an authentication service end if the access request is not verified.

In this embodiment, first, the user registers an account number and a password that are applied to all subsystems in a hybrid cloud.

The authentication client and the application program may be deployed on a same terminal. The application program may be a browser or an App or the like. The application program is a protected application program, that is, an authenticated application program.

If the application program is a browser, the user enters a network address of a service system of the hybrid cloud by using the browser, to initiate an access request to the service system of the hybrid cloud. The authentication client receives the access request, and detects whether the access request is verified. The "verified" means that when the authentication service end decrypts and verifies token information, the authentication service end puts a session-level token-solved tag in the local browser after verification succeeds, and if the initiated access request includes the tag, it indicates that the access request is verified. If the tag is not detected, it indicates that the access request is not verified, and the access request is sent to the authentication service end. If the tag is detected, it indicates that the access request is verified, the access request is sent to the service system of the hybrid cloud, response information of the access request is received from the service system, and the response information is sent to the application program.

If the application program is an App, the App may be used as an application program client of the hybrid cloud, and the user logs in to the App to initiate an access request to the service system of the hybrid cloud. The authentication client receives the access request, and detects whether the access request is verified. If the tag is not detected, it indicates that the access request is not verified, and the access request is sent to the authentication service end. If the tag is detected, it indicates that the access request is verified, the access request is sent to the service system of the hybrid cloud, response information of the access request is received from the service system, and the response information is sent to the application program.

Communication and transmission are performed between the authentication client and the authentication service end by using a secure encryption protocol (for example, Secure Sockets Layer (SSL)). The secure encryption protocol can ensure security of access.

Step 404: The authentication service end receives the access request, detects whether the access request carries token information, sends a user identity authentication invitation to the application program if the access request carries no token information, receives authentication information acquired by the application program, verifies the authentication information, generates token information after verification succeeds, and sends the token information to the authentication client.

In this embodiment, after receiving the access request, the authentication service end detects whether the access request carries token information. The token information is used to uniquely identify the access request. Each access request corresponds to different token information. If no token information is carried, the authentication service end sends a user identity authentication invitation to the application program, and an authentication interface is displayed on the application program. The authentication interface of the application program acquires authentication information entered by the user, and sends the authentication information to the authentication service end. The authentication service end verifies the received authentication information, that is, compares the received authentication information with authentication information stored on the authentication service end. If they are the same, verification succeeds. If they are different, verification fails. The authentication information may include a user identifier and a password. The user identifier is used to uniquely indicate a user identity. The user identifier may be a user account number registered with the hybrid cloud, an instant messaging account number, an email account number, an ID card number, a mobile directory identifier, or the like. The authentication service end generates token information corresponding to the access request after verification on the authentication information succeeds, and sends the generated token information to the authentication client.

Step 406: The authentication client receives the token information, and sends the access request and the token information to the authentication service end.

In this embodiment, after receiving the token information, the authentication client redirects and sends the access request and the token information to the authentication service end.

Step 408: The authentication service end decrypts and verifies the token information, and sends a user identifier of the user sending the access request to the authentication client if verification succeeds.

In this embodiment, the authentication service end decrypts the token information corresponding to the access request, and determines whether the decrypted token information is the same as token information that corresponds to the access request and that is recorded on the authentication service end. If yes, verification succeeds, and the user identifier of the user sending the access request is sent to the authentication client. If no, verification fails, a verification failure result is sent to the authentication client, and random token information is further generated. The token information is sent to the authentication client. Then the authentication client sends the access request and the corresponding token information to the authentication service end, and the authentication service end decrypts and verifies the token information.

Step 410: The authentication client receives the authenticated user identifier, sends the access request to a service system of a corresponding hybrid cloud, receives response information of the access request from the service system, and sends the response information to the application program.

In this embodiment, the authenticated user identifier means that the user identifier is a user identifier of an authorized user of the hybrid cloud.

In the method for centralized management for a hybrid cloud provided in this embodiment, an authentication client detects an access request, and sends the access request to an authentication service end if the access request is not verified. The authentication service end detects whether the access request carries token information, receives authentication information acquired by an application program if the access request carries no token information, verifies the authentication information, generates token information after verification succeeds, and sends the token information to the authentication client. Then the authentication client sends the access request and the corresponding token information to the authentication service end. The authentication service end decrypts and verifies the token information, and sends a user identifier to the authentication client after verification succeeds. The authentication client sends the access request to a service system of a hybrid cloud, receives response information of the access request from the service system, and sends the response information to the application program. In this way, centralized authentication management is implemented for a hybrid cloud user, multiple service systems interwork through login once, and lots of time is saved for the user, as the user does not need to perform login authentication and secure logout operations multiple times. Token information decryption can prevent a token of the user from being stolen, and prevent an unauthorized user from masquerading as the user of the hybrid cloud by adding the stolen token information to an access request to perform unauthorized resource access.

In an embodiment, the method for centralized management for a hybrid cloud further includes: sending, by the authentication client, the access request to the service system of the corresponding hybrid cloud if the access request is verified, receiving the response information of the access request from the service system, and sending the response information to the application program. If detecting that the access request is verified, the authentication client directly sends the access request to the service system of the corresponding hybrid cloud for resource access.

In an embodiment, the method for centralized management for a hybrid cloud further includes: detecting, by the authentication service end, that the access request carries token information, decrypting and verifying the token information, and if verification succeeds, sending the user identifier of the user sending the access request to the authentication client, or if verification fails, sending a user identity authentication invitation to the application program, receiving authentication information acquired by the application program, verifying the authentication information, generating token information after verification succeeds, and sending the token information to the authentication client.

Figure 27:
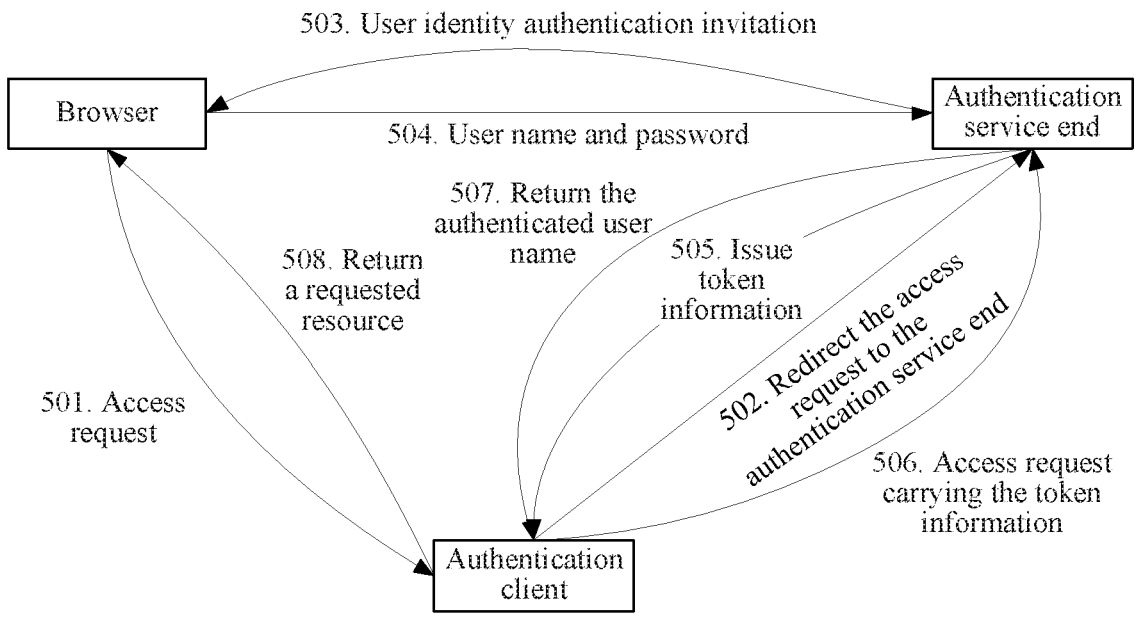
FIG. 27 is a flowchart of centralized login management based on central authentication service (CAS) server authentication in an embodiment.

FIG. 27 is a flowchart of centralized login management based on CAS server authentication in an embodiment. CAS is an enterprise-level open-source project initiated by Yale University. It aims to provide a reliable SSO solution for Web App systems (belonging to Web SSO). As shown in FIG. 27, a process of centralized login management based on a CAS server includes:

501. A browser acquires an access request input by a user, requests a resource from a service system of a hybrid cloud based on the access request, and sends the access request to an authentication client.

502. The authentication client redirects the access request to an authentication service end if detecting that the access request is not verified, or directly skips to 508 if detecting that the access request is verified.

503. The authentication service end detects whether the access request carries token information, and sends a user identity authentication invitation to the browser if the access request carries no token information.

504. The browser acquires a user name and a password that are entered by the user, and sends the user name and the password to the authentication service end.

505. The authentication service end verifies the user name and the password, generates token information corresponding to the access request after verification succeeds, and sends the generated token information to the authentication client.

506. The authentication client adds the token information to the access request, and sends the access request carrying the token information to the authentication service end.

507. The authentication service end decrypts and verifies the token information in the access request, and sends the user name of the user sending the access request to the authentication client after verification succeeds.

508. The authentication client receives the authenticated user name, sends the access request initiated by using the user name to the service system of the hybrid cloud, receives a resource returned by the service system, and returns the resource to the browser.

In an embodiment, the authentication client receives the authenticated user identifier, acquires a role and rights that correspond to the user identifier from a user role and rights management system based on the authenticated user identifier, receives response information corresponding to the rights corresponding to the user identifier, and sends the response information to the application program.

In this embodiment, the user role and rights management system assigns different roles to different users, and assigns corresponding rights to corresponding roles. That is, a correspondence between a user and a role and a correspondence between the role and rights are established. The user role and rights management system may apply RBAC. Different from mandatory access control and discretionary control that directly give a user rights, in the RBAC, rights are associated with a role, and a user, as a member of a proper role, obtains rights of the corresponding role, which greatly simplifies rights management, and makes access control more flexible. A unified user management system based on the RBAC can flexibly manage rights of roles while performing centralized management on platform users and roles, thereby implementing centralized access control of a target platform. With the role-based access control system, a user is not directly associated with operation rights, and instead, a role assignment manner is used, where different organizational structure users are given different roles and identities, making user management more efficient.

Figure 28:
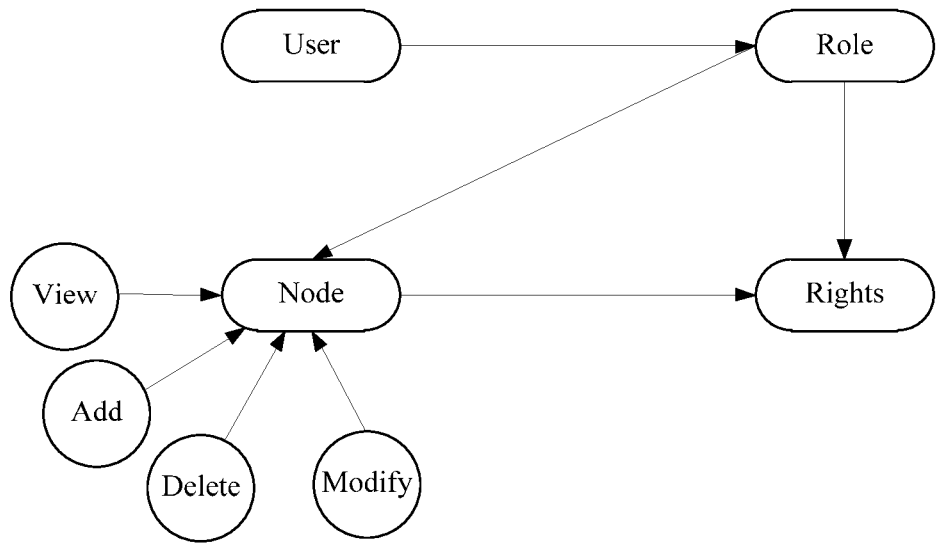
FIG. 28 is a schematic structural diagram of a role-based access control (RBAC) user management module.

FIG. 28 is a schematic structural diagram of an RBAC user management module. As shown in FIG. 28, a many-to-many relationship exists between users and roles. One user may have multiple roles such as a system manager, a resource manager, and a common user. Each role may correspond to multiple users. A role is assigned fixed rights, and a specified role has specified operation rights. Operation rights include view, add, delete, modify, and the like.

A user management mechanism and a unified login and authentication mechanism of a hybrid cloud include two different modes: internal subsystem access and external system access. After data synchronization and platform delivery operations, users of internal platforms have a unified user registration module and role binding mechanism, and user data between subsystems is aligned. When an external system needs to connect to a unified authentication platform of the hybrid cloud for an authentication operation, because the hybrid cloud does not have user data of the external system, additional operations are required.

In an embodiment, the method for centralized management for a hybrid cloud further includes: connecting an external system to the hybrid cloud, and synchronizing user data in the external system to the hybrid cloud; and configuring a corresponding role and rights for the synchronized user data by using the user role and rights management system.

In this embodiment, the external system is connected to the unified authentication platform of the hybrid cloud, the user data in the external system is synchronized to the unified authentication platform, and a corresponding role and rights are configured for the synchronized user data by using the user role and rights management system. When the user data in the external system is synchronized to the unified authentication platform, the user data may be imported to the unified authentication platform of the hybrid cloud in bulk. The external system is another system outside the hybrid cloud. A user of the external system may be registered with the hybrid cloud. In addition, users in the external system may be allocated a role on a per group basis. That is, multiple users form one group, and the group of users are all allocated one or more roles.

Further, in the hybrid cloud, a data interface is abstractly encapsulated, the internal subsystems are provided with a stable and fixed interface, and the unified authentication platform is connected to an account system of the external system.

Figure 29:
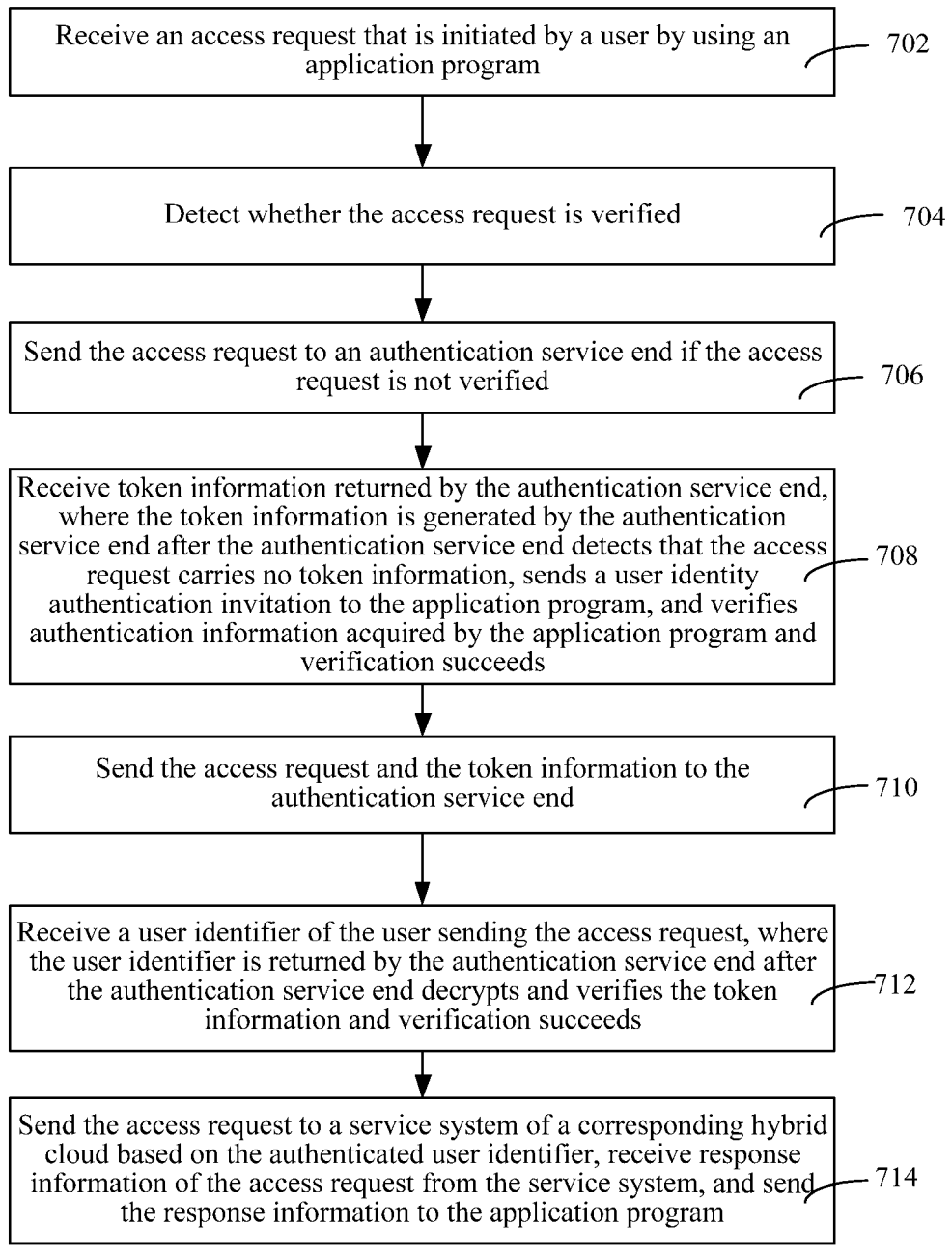
FIG. 29 is a flowchart of a method for centralized management for a hybrid cloud in an embodiment.

FIG. 29 is a flowchart of a method for centralized management for a hybrid cloud in an embodiment. As shown in FIG. 29, a method for centralized management for a hybrid cloud runs on the terminal in FIG. 23 and FIG. 24A, and includes the following steps as described from the perspective of an authentication client:

Step 702: Receive an access request that is initiated by a user by using an application program.

In this embodiment, the application program may be a browser or an App or the like.

Step 704: Detect whether the access request is verified.

In this embodiment, the "verified" means that when an authentication service end decrypts and verifies token information, the authentication service end puts a session-level token-solved tag in the local browser after verification succeeds, and if the initiated access request includes the tag, it indicates that the access request is verified. If the tag is not detected, it indicates that the access request is not verified, and the access request is sent to the authentication service end. If the tag is detected, it indicates that the access request is verified, the access request is sent to the service system of the hybrid cloud, response information of the access request is received from the service system, and the response information is sent to the application program.

Step 706: Send the access request to an authentication service end if the access request is not verified.

Step 708: Receive token information returned by the authentication service end, where the token information is generated by the authentication service end after the authentication service end detects that the access request carries no token information, sends a user identity authentication invitation to the application program, and verifies authentication information acquired by the application program and verification succeeds.

In this embodiment, the token information is used to uniquely identify the access request. The authentication information may include a user identifier and a password. The user identifier may be a user account number registered with a hybrid cloud, an instant messaging account number, an email account number, an ID card number, a mobile directory identifier, or the like.

Step 710: Send the access request and the token information to the authentication service end.

Step 712: Receive a user identifier of the user sending the access request, where the user identifier is returned by the authentication service end after the authentication service end decrypts and verifies the token information and verification succeeds.

Step 714: Send the access request to a service system of a corresponding hybrid cloud based on the authenticated user identifier, receive response information of the access request from the service system, and send the response information to the application program.

In the method for centralized management for a hybrid cloud in this embodiment, an authentication client detects an access request, and sends the access request to an authentication service end if the access request is not verified. The authentication service end detects whether the access request carries token information, receives authentication information acquired by an application program if the access request carries no token information, verifies the authentication information, generates token information after verification succeeds, and sends the token information to the authentication client. Then the authentication client sends the access request and the corresponding token information to the authentication service end. The authentication service end decrypts and verifies the token information, and sends a user identifier to the authentication client after verification succeeds. The authentication client sends the access request to a service system of a hybrid cloud, receives response information of the access request from the service system, and sends the response information to the application program. In this way, centralized authentication management is implemented for a hybrid cloud user, multiple service systems interwork through login once, and lots of time is saved for the user, as the user does not need to perform login authentication and secure logout operations multiple times.

In an embodiment, the method for centralized management for a hybrid cloud further includes: sending the access request to the service system of the corresponding hybrid cloud if the access request is verified, receiving the response information of the access request from the service system, and sending the response information to the application program.

In an embodiment, the method for centralized management for a hybrid cloud further includes: receiving a user identifier of the user sending the access request, where the user identifier is returned by the authentication service end after the authentication service end detects that the access request carries token information and verifies the token information and verification succeeds, sending the access request to the service system of the corresponding hybrid cloud, receiving the response information of the access request from the service system, and sending the response information to the application program.

In an embodiment, the method for centralized management for a hybrid cloud further includes: acquiring a role and rights that correspond to the user identifier from a user role and rights management system based on the authenticated user identifier, receiving response information corresponding to the rights corresponding to the user identifier, and sending the response information to the application program.

Figure 30:
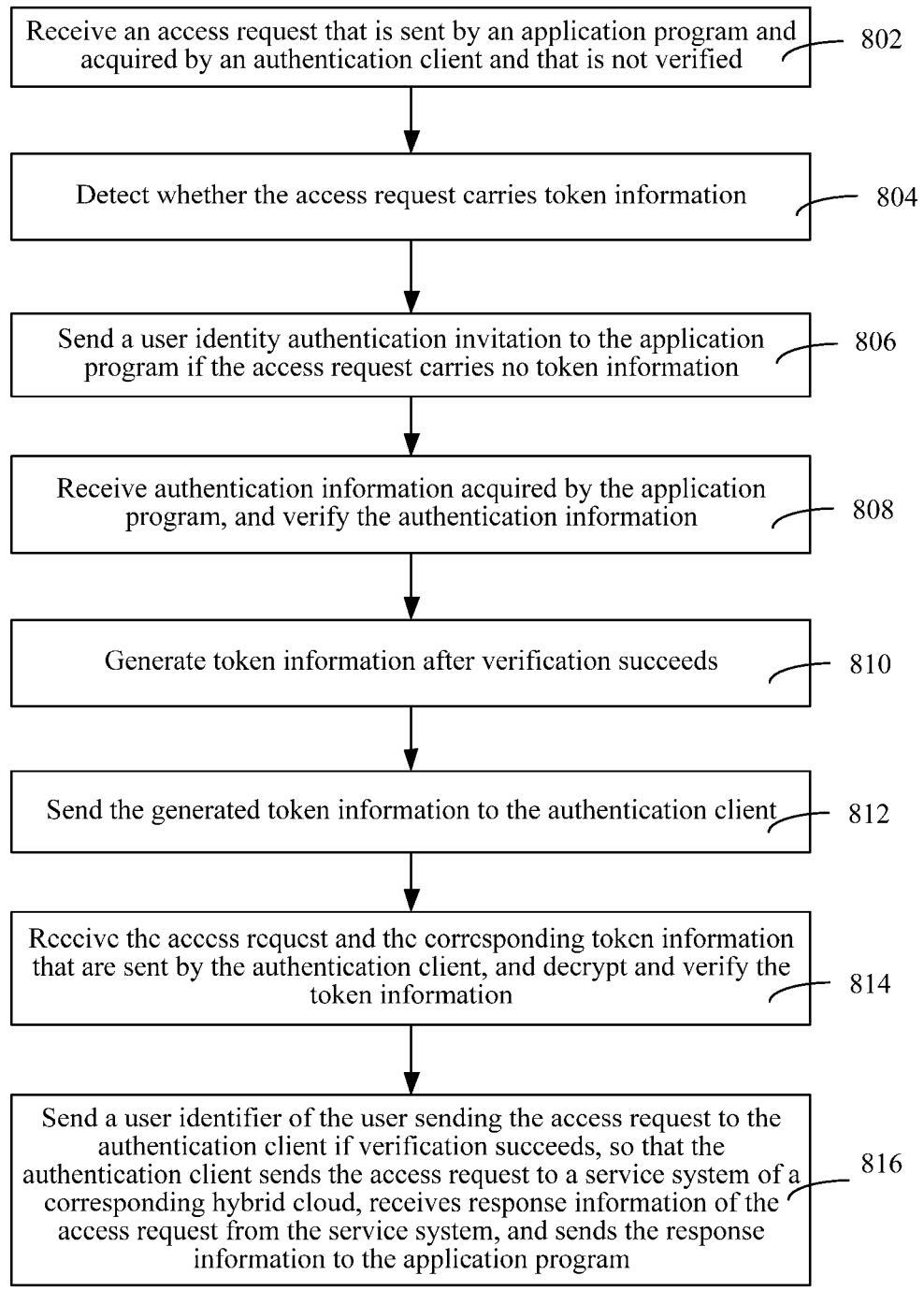
FIG. 30 is a flowchart of a method for centralized management for a hybrid cloud in another embodiment.

FIG. 30 is a flowchart of a method for centralized management for a hybrid cloud in another embodiment. As shown in FIG. 30, a method for centralized management for a hybrid cloud runs on the server in FIG. 23 and FIG. 24B, and includes the following steps as described from the perspective of an authentication service end:

Step 802: Receive an access request that is sent by an application program and acquired by an authentication client and that is not verified.

Step 804: Detect whether the access request carries token information.

Step 806: Send a user identity authentication invitation to the application program if the access request carries no token information.

Step 808: Receive authentication information acquired by the application program, and verify the authentication information.

Step 810: Generate token information after verification succeeds.

Step 812: Send the generated token information to the authentication client.

Step 814: Receive the access request and the corresponding token information that are sent by the authentication client, and decrypt and verify the token information.

Step 816: Send a user identifier of the user sending the access request to the authentication client if verification succeeds, so that the authentication client sends the access request to a service system of a corresponding hybrid cloud, receives response information of the access request from the service system, and sends the response information to the application program.

In the method for centralized management for a hybrid cloud in this embodiment, an authentication client detects an access request, and sends the access request to an authentication service end if the access request is not verified. The authentication service end detects whether the access request carries token information, receives authentication information acquired by an application program if the access request carries no token information, verifies the authentication information, generates token information after verification succeeds, and sends the token information to the authentication client. Then the authentication client sends the access request and the corresponding token information to the authentication service end. The authentication service end decrypts and verifies the token information, and sends a user identifier to the authentication client after verification succeeds. The authentication client sends the access request to a service system of a hybrid cloud, receives response information of the access request from the service system, and sends the response information to the application program. In this way, centralized authentication management is implemented for a hybrid cloud user, multiple service systems interwork through login once, and lots of time is saved for the user, as the user does not need to perform login authentication and secure logout operations multiple times.

In an embodiment, the method for centralized management for a hybrid cloud further includes: if detecting that the access request carries token information, decrypting and verifying the token information, and if verification succeeds, sending the user identifier of the user sending the access request to the authentication client, or if verification fails, sending a user identity authentication invitation to the application program, receiving authentication information acquired by the application program, verifying the authentication information, generating token information after verification succeeds, and sending the token information to the authentication client.

Figure 31:
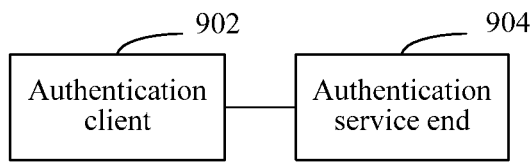
FIG. 31 is a structural block diagram of a system for centralized management for a hybrid cloud in an embodiment.

FIG. 31 is a structural block diagram of a system for centralized management for a hybrid cloud in an embodiment. As shown in FIG. 31, a system for centralized management for a hybrid cloud includes an authentication client 902 and an authentication service end 904.

The authentication client 902 is configured to receive an access request that is initiated by a user by using an application program, detect whether the access request is verified, and send the access request to the authentication service end 904 if the access request is not verified.

The authentication service end 904 is configured to receive the access request, detect whether the access request carries token information, send a user identity authentication invitation to the application program if the access request carries no token information, receive authentication information acquired by the application program, verify the authentication information, generate token information after verification succeeds, and send the token information to the authentication client 902.

The authentication client 902 is further configured to receive the token information, and send the access request and the token information to the authentication service end 904.

The authentication service end 904 is further configured to decrypt and verify the token information, and send a user identifier of the user sending the access request to the authentication client 902 if verification succeeds.

The authentication client 902 is further configured to receive the authenticated user identifier, send the access request to a service system of a corresponding hybrid cloud, receive response information of the access request from the service system, and send the response information to the application program.

In the system for centralized management for a hybrid cloud in this embodiment, an authentication client detects an access request, and sends the access request to an authentication service end if the access request is not verified. The authentication service end detects whether the access request carries token information, receives authentication information acquired by an application program if the access request carries no token information, verifies the authentication information, generates token information after verification succeeds, and sends the token information to the authentication client. Then the authentication client sends the access request and the corresponding token information to the authentication service end. The authentication service end decrypts and verifies the token information, and sends a user identifier to the authentication client after verification succeeds. The authentication client sends the access request to a service system of a hybrid cloud, receives response information of the access request from the service system, and sends the response information to the application program. In this way, centralized authentication management is implemented for a hybrid cloud user, multiple service systems interwork through login once, and lots of time is saved for the user, as the user does not need to perform login authentication and secure logout operations multiple times.

In an embodiment, the authentication client 902 is further configured to receive the authenticated user identifier, acquire a role and rights that correspond to the user identifier from a user role and rights management system based on the authenticated user identifier, receive response information corresponding to the rights corresponding to the user identifier, and send the response information to the application program.

In an embodiment, the authentication client 902 sends the access request to the service system of the corresponding hybrid cloud if the access request is verified, receives the response information of the access request from the service system, and sends the response information to the application program.

In an embodiment, the authentication service end 904 is further configured to detect that the access request carries token information, decrypt and verify the token information, and if verification succeeds, send the user identifier of the user sending the access request to the authentication client 902, or if verification fails, send a user identity authentication invitation to the application program, receive authentication information acquired by the application program, verify the authentication information, generate token information after verification succeeds, and send the token information to the authentication client.

Communication and transmission are performed between the authentication client 902 and the authentication service end 904 by using a secure encryption protocol.

In an embodiment, the system for centralized management for a hybrid cloud further includes a user role and rights management system; an external system is connected to the hybrid cloud, and user data in the external system is synchronized to the hybrid cloud; and the user role and rights management system configures a corresponding role and rights for the synchronized user data.

Figure 32:
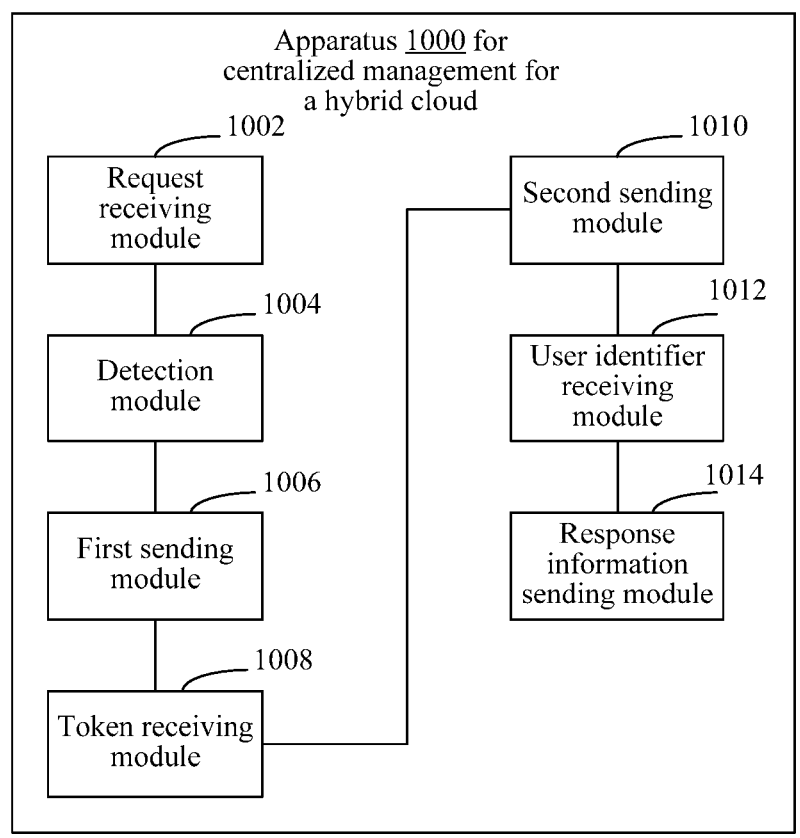
FIG. 32 is a structural block diagram of an apparatus for centralized management for a hybrid cloud in an embodiment.

FIG. 32 is a structural block diagram of an apparatus for centralized management for a hybrid cloud in an embodiment. As shown in FIG. 32, an apparatus 1000 for centralized management for a hybrid cloud includes a request receiving module 1002, a detection module 1004, a first sending module 1006, a token receiving module 1008, a second sending module 1010, a user identifier receiving module 1012, and a response information sending module 1014.

The request receiving module 1002 is configured to receive an access request that is initiated by a user by using an application program.

The detection module 1004 is configured to detect whether the access request is verified.

The first sending module 1006 is configured to send the access request to an authentication service end if the access request is not verified.

The token receiving module 1008 is configured to receive token information returned by the authentication service end, where the token information is generated by the authentication service end after the authentication service end detects that the access request carries no token information, sends a user identity authentication invitation to the application program, and verifies authentication information acquired by the application program and verification succeeds.

The second sending module 1010 is configured to send the access request and the token information to the authentication service end.

The user identifier receiving module 1012 is configured to receive a user identifier of the user sending the access request, where the user identifier is returned by the authentication service end after the authentication service end decrypts and verifies the token information and verification succeeds.

The response information sending module 1014 is configured to send the access request to a service system of a corresponding hybrid cloud based on the authenticated user identifier, receive response information of the access request from the service system, and send the response information to the application program.

In the apparatus for centralized management for a hybrid cloud in this embodiment, an authentication client detects an access request, and sends the access request to an authentication service end if the access request is not verified. The authentication service end detects whether the access request carries token information, receives authentication information acquired by an application program if the access request carries no token information, verifies the authentication information, generates token information after verification succeeds, and sends the token information to the authentication client. Then the authentication client sends the access request and the corresponding token information to the authentication service end. The authentication service end decrypts and verifies the token information, and sends a user identifier to the authentication client after verification succeeds. The authentication client sends the access request to a service system of a hybrid cloud, receives response information of the access request from the service system, and sends the response information to the application program. In this way, centralized authentication management is implemented for a hybrid cloud user, multiple service systems interwork through login once, and lots of time is saved for the user, as the user does not need to perform login authentication and secure logout operations multiple times.

In an embodiment, the apparatus for centralized management for a hybrid cloud further includes rights acquisition module, configured to acquire a role and rights that correspond to the user identifier from a user role and rights management system based on the authenticated user identifier; and the response information sending module 1014 is further configured to receive response information corresponding to the rights corresponding to the user identifier, and send the response information to the application program.

In an embodiment, the response information sending module 1014 is further configured to send the access request to the service system of the corresponding hybrid cloud if the access request is verified, receive the response information of the access request from the service system, and send the response information to the application program.

In an embodiment, the user identifier receiving module 1012 is further configured to receive a user identifier of the user sending the access request, where the user identifier is returned by the authentication service end after the authentication service end detects that the access request carries token information and verifies the token information and verification succeeds. The response information sending module 1014 is further configured to send the access request to the service system of the corresponding hybrid cloud, receive the response information of the access request from the service system, and send the response information to the application program.

Figure 33:
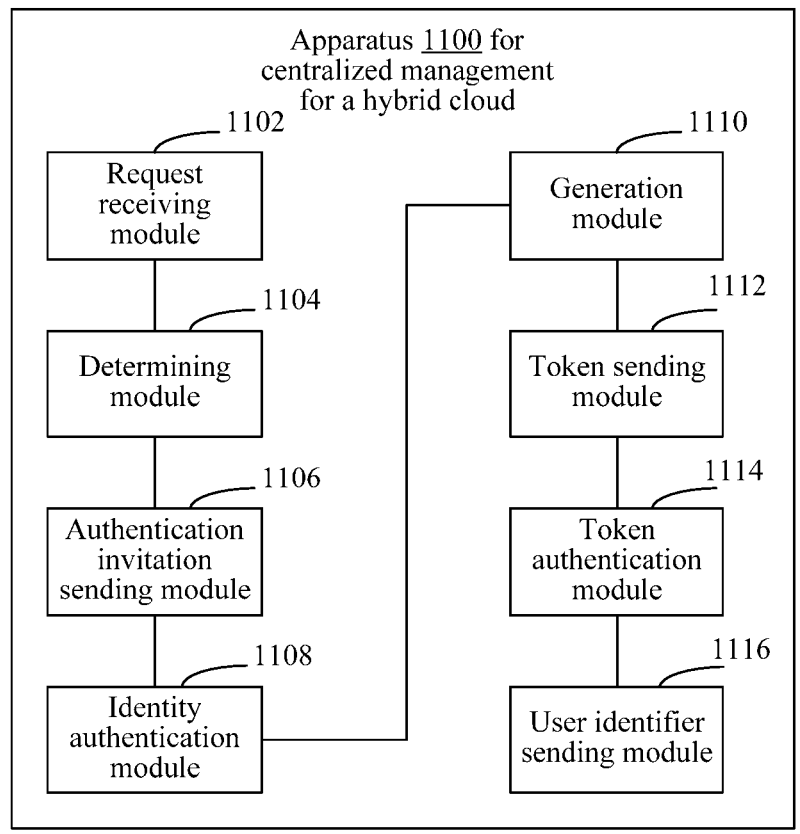
FIG. 33 is a structural block diagram of an apparatus for centralized management for a hybrid cloud in another embodiment.

FIG. 33 is a structural block diagram of an apparatus for centralized management for a hybrid cloud in another embodiment. As shown in FIG. 33, an apparatus for centralized management for a hybrid cloud includes a request receiving module 1102, a determining module 1104, an authentication invitation sending module 1106, an identity authentication module 1108, a generation module 1110, a token sending module 1112, a token verification module 1114, and a user identifier sending module 1116.

The request receiving module 1102 is configured to receive an access request that is sent by an application program and acquired by an authentication client and that is not verified.

The determining module 1104 is configured to detect whether the access request carries token information.

The authentication invitation sending module 1106 is configured to send a user identity authentication invitation to the application program if the access request carries no token information.

The identity authentication module 1108 is configured to receive authentication information acquired by the application program, and verify the authentication information.

The generation module 1110 is configured to generate token information after verification succeeds.

The token sending module 1112 is configured to send the token information to the authentication client.

The token verification module 1114 is configured to receive the access request and the corresponding token information that are sent by the authentication client, and decrypt and verify the token information.

The user identifier sending module 1116 is configured to send a user identifier of the user sending the access request to the authentication client if verification succeeds, so that the authentication client sends the access request to a service system of a corresponding hybrid cloud, receives response information of the access request from the service system, and sends the response information to the application program.

In the apparatus for centralized management for a hybrid cloud in this embodiment, an authentication client detects an access request, and sends the access request to an authentication service end if the access request is not verified. The authentication service end detects whether the access request carries token information, receives authentication information acquired by an application program if the access request carries no token information, verifies the authentication information, generates token information after verification succeeds, and sends the token information to the authentication client. Then the authentication client sends the access request and the corresponding token information to the authentication service end. The authentication service end decrypts and verifies the token information, and sends a user identifier to the authentication client after verification succeeds. The authentication client sends the access request to a service system of a hybrid cloud, receives response information of the access request from the service system, and sends the response information to the application program. In this way, centralized authentication management is implemented for a hybrid cloud user, multiple service systems interwork through login once, and lots of time is saved for the user, as the user does not need to perform login authentication and secure logout operations multiple times.

The token verification module 1114 is further configured to: if it is detected that the access request carries token information, decrypt and verify the token information. If verification succeeds, the user identifier sending module 1116 is configured to send the user identifier of the user sending the access request to the authentication client. If verification fails, the authentication invitation sending module 1108 is further configured to send a user identity authentication invitation to the application program, the identity authentication module 1108 receives authentication information acquired by the application program, and verifies the authentication information, and the generation module 1110 is further configured to generate token information after verification succeeds, and send the token information to the authentication client.

Figure 34:
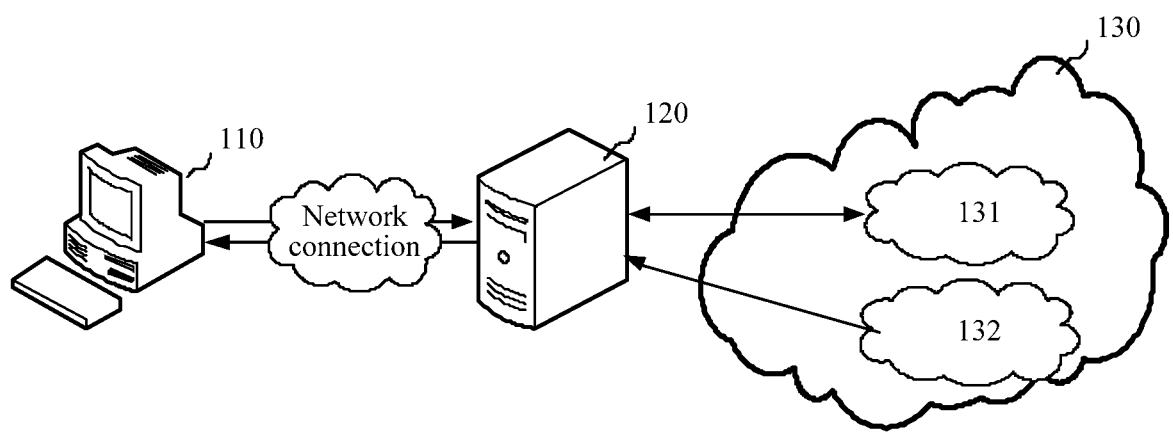
FIG. 34 is a diagram of an application environment of a cloud end mirroring operation method in an embodiment.

FIG. 34 is a diagram of an application environment of a cloud end mirroring operation method in an embodiment. As shown in FIG. 34, a cloud end mirroring operation system includes a terminal 110, a server 120, and a cloud end 130. The cloud end 130 may be a hybrid cloud end, and includes a private cloud end 131 and a public cloud end 132. The terminal 110 may communicate with the server 120 over a network. The server 120 may communicate with the cloud end 130 over a network. The server 120 is configured to implement a cloud end mirroring operation method. It may be understood that the server 120 may alternatively be a part of the cloud end 130.

In an embodiment, the terminal 110 is configured to send a cloud end mirroring operation request to the server 120. The server 120 is configured to receive the cloud end mirroring operation request sent by the terminal 110; associatively store a request identifier corresponding to the cloud end mirroring operation request and a request parameter carried in the cloud end mirroring operation request; add the request identifier corresponding to the cloud end mirroring operation request to a request receiving queue; asynchronously execute a first scheduled task of periodically fetching a request identifier from the request receiving queue and a second scheduled task of periodically fetching a request identifier from an abnormal request queue; invoke a mirroring operation interface provided by the cloud end 130, and perform a cloud end mirroring operation based on a request parameter associated with the fetched request identifier; and add the fetched request identifier to the abnormal request queue when the cloud end mirroring operation fails.

Figure 35:
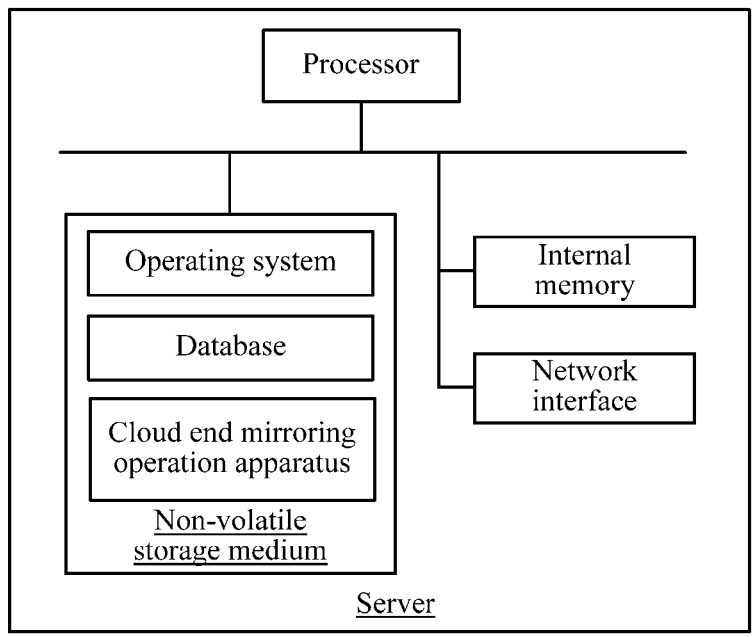
FIG. 35 is a schematic diagram of an internal structure of a server for implementing a cloud end mirroring operation method in an embodiment.

FIG. 35 is a schematic diagram of an internal structure of a server for implementing a cloud end mirroring operation method in an embodiment. As shown in FIG. 35, the server includes a processor, a non-volatile storage medium, an internal memory, and a network interface that are connected by using a system bus. The non-volatile storage medium of the server stores an operating system, a database, and a cloud end mirroring operation apparatus. The cloud end mirroring operation apparatus is configured to implement a cloud end mirroring operation method. The database may be configured to associatively store a request identifier corresponding to a cloud end mirroring operation request and a request parameter carried in the cloud end mirroring operation request. The processor of the server is configured to provide computing and control capabilities, to support running of the entire server. The internal memory may store computer-readable instructions. When the computer-readable instructions are executed by the processor, the processor can perform a cloud end mirroring operation method. The network interface of the server is configured to perform network communication, for example, receive the cloud end mirroring operation request. The server may be implemented by using a separate server or a server cluster including multiple servers. Persons skilled in the art may understand that the structure shown in FIG. 35 is merely a block diagram of a structure part related to a solution of this application, and does not constitute a limitation on a server to which the solution of this application is applied. A specific server may include more or fewer parts than those shown in the figure, or some parts may be combined, or a different part deployment may be used.

Figure 36:
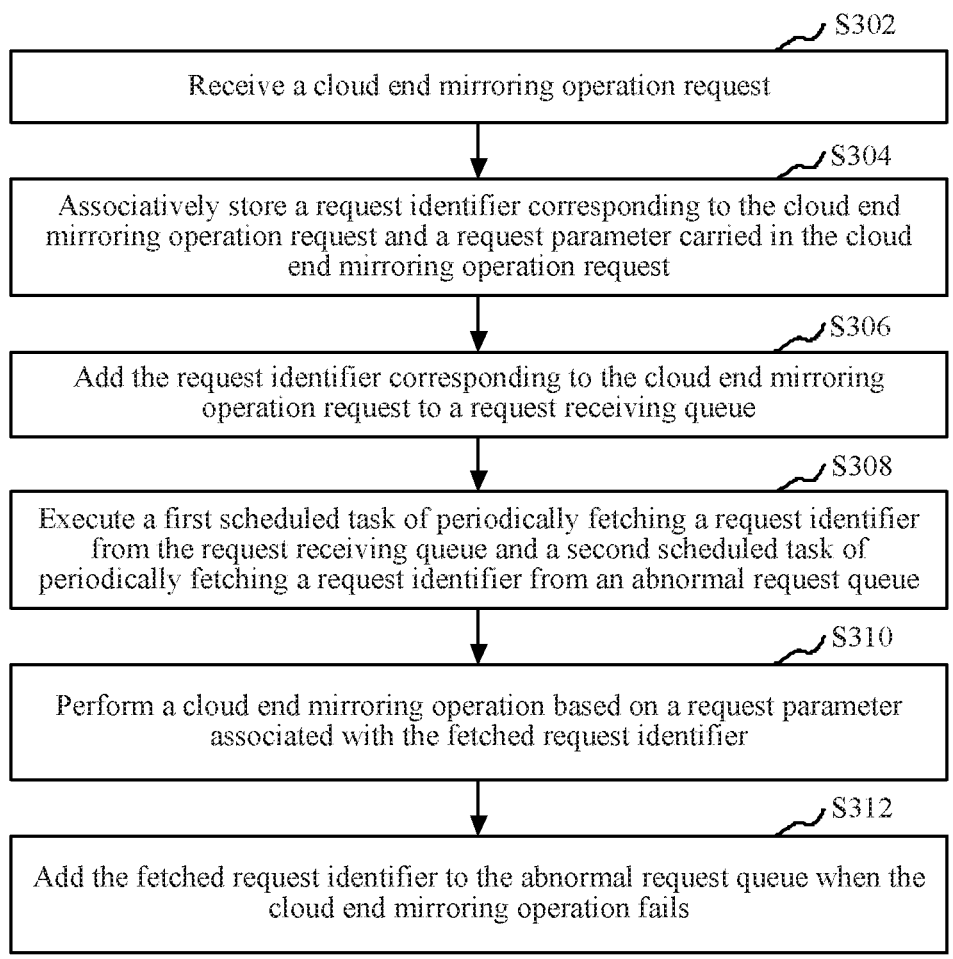
FIG. 36 is a schematic flowchart of a cloud end mirroring operation method in an embodiment.

FIG. 36 is a schematic flowchart of a cloud end mirroring operation method in an embodiment. This embodiment is mainly described by using an example in which the method is applied to the server 120 in FIG. 34 and FIG. 35. Referring to FIG. 36, the method specifically includes the following steps:

S302: Receive a cloud end mirroring operation request.

The cloud end mirroring operation request is a network request for requesting to perform a mirroring operation on a cloud end. The cloud end may be a private cloud end, a public cloud end, or a hybrid cloud end including a private cloud end and a public cloud end. The mirroring operation is a mirror-related operation such as creating a mirror, copying a mirror, or deleting a mirror. The mirror may be a mirror of an operating system, a station, a service program, or the like.

Specifically, the server may provide a cloud end management page to a terminal. The cloud end management page includes a mirroring operation configuration item. The terminal may receive a user instruction, configure the mirroring operation configuration item based on the user instruction, generate a request parameter based on the configured mirroring operation configuration item to trigger a cloud end mirroring operation request carrying the request parameter, and sends the cloud end mirroring operation request to the server. The server receives the cloud end mirroring operation request.

S304: Associatively store a request identifier corresponding to the cloud end mirroring operation request and a request parameter carried in the cloud end mirroring operation request.

Each cloud end mirroring operation request corresponds to a unique request identifier. The request identifier is used to uniquely identify the corresponding cloud end mirroring operation request. The request identifier may be carried in the cloud end mirroring operation request, or may be allocated by the server after the server receives the cloud end mirroring operation request. The request identifier and the request parameter are associatively stored. An associated request parameter can be obtained through query using a request identifier.

The request parameter is a parameter required for requesting to perform the mirroring operation on the cloud end. The request parameter is, for example, a mirroring operation type or a target identifier of a target to which the mirroring operation is directed. The mirroring operation type is, for example, a mirror creation type, a mirror copying type, or a mirror deletion type. The request parameter in the cloud end mirroring operation request can be used to enable the server to perform, on the cloud end based on the request parameter, a mirroring operation corresponding to a mirroring operation type in the request parameter on a target identified by a target identifier in the request parameter.

Specifically, after receiving the cloud end mirroring operation request, the server acquires the request identifier corresponding to the cloud end mirroring operation request, extracts the request parameter carried in the cloud end mirroring operation request, and correspondingly stores the request identifier and the request parameter, which may be specifically stored in a database, a file, or a buffer.

S306: Add the request identifier corresponding to the cloud end mirroring operation request to a request receiving queue.

The request receiving queue is used to buffer request identifiers corresponding to cloud end mirroring operation requests in a receiving sequence, to temporarily store the received cloud end mirroring operation requests. Each request identifier in the request receiving queue represents one cloud end mirroring operation request. In an embodiment, step S304 and step S306 may be asynchronously performed.

In an embodiment, a capacity of the request receiving queue may be dynamically adjusted depending on a quantity of request identifiers in the request receiving queue. The capacity of the request receiving queue refers to a maximum quantity of request identifiers that can be stored in the request receiving queue.

In an embodiment, the method further includes: when a proportion, in a capacity at a current level, of a quantity of request identifiers in the request receiving queue reaches a first proportion corresponding to the current capacity level, upgrading the current capacity level by one capacity level; and when a proportion, in a capacity at a current level, of a quantity of request identifiers in the request receiving queue is less than or equal to a second proportion corresponding to the current capacity level, degrading the current capacity level by one capacity level, where the first proportion corresponding to the capacity at the current level is greater than the second proportion corresponding to the capacity at the current level. Capacity levels may be limited. The first proportion and/or the second proportion may increase as the capacity level is upgraded, and decrease as the capacity level degraded.

S308: Execute a first scheduled task of periodically fetching a request identifier from the request receiving queue and a second scheduled task of periodically fetching a request identifier from an abnormal request queue.

The first scheduled task and the second scheduled task are both scheduled tasks, and the terms "first" and "second" are used to distinguish different scheduled tasks. The scheduled task may be a task executed at a preset interval or executed every time a preset time point is reached. The preset interval is, for example, 10 ms (milliseconds).

The first scheduled task is used to fetch a request identifier from the request receiving queue during scheduled execution, and perform subsequent step 310 based on the fetched request identifier. The second scheduled task is used to fetch a request identifier from the abnormal request queue during scheduled execution, and perform subsequent step 310 based on the fetched request identifier. Different from the request receiving queue, the abnormal request queue is used to buffer a request identifier corresponding to a cloud end mirroring operation request whose cloud end mirroring operation fails.

In an embodiment, the first scheduled task and the second scheduled task may be asynchronously executed. When the first scheduled task and the second scheduled task are asynchronously executed, the first scheduled task and the second scheduled task are not necessarily executed in a particular order. In another embodiment, the first scheduled task and the second scheduled task may be alternately executed.

S310: Perform a cloud end mirroring operation based on a request parameter associated with the fetched request identifier.

The fetched request identifier may be fetched from the request receiving queue, or may be fetched from the abnormal request queue. Specifically, the server may read a request parameter associated with the fetched request identifier in storage, to invoke a mirroring operation interface provided by the cloud end and perform a cloud end mirroring operation based on the read request parameter. Further, the server may invoke the mirroring operation interface provided by the cloud end and input the request parameter, so that the cloud end determines, based on the request parameter, a mirroring operation type and a target to which the mirroring operation is directed, to perform a mirroring operation corresponding to the determined mirroring operation type on the target on the cloud end.

S312: Add the fetched request identifier to the abnormal request queue when the cloud end mirroring operation fails.

Specifically, after performing the cloud end mirroring operation, the server may determine whether the cloud end mirroring operation succeeds or fails. Specifically, the server may determine whether the cloud end mirroring operation succeeds or fails based on a returned value of the cloud end mirroring operation. When determining that the cloud end mirroring operation fails, the server adds the fetched request identifier to the abnormal request queue. Subsequently, when asynchronously executing the first scheduled task and the second scheduled task, the server may fetch the request identifier to try the corresponding cloud end mirroring operation request. When determining that the cloud end mirroring operation succeeds, the server may record an operation success result corresponding to the request identifier, which may be specifically stored in a database, a file, or a buffer. The server may further feed back the operation success result to the terminal. When the operation success result is recorded in the database, the operation success result corresponding to the request identifier may be written back to a data table in which the request parameter corresponding to the request identifier is located.

In the cloud end mirroring operation method, a request receiving queue and an abnormal request queue are added. The request receiving queue is used to record a received cloud end mirroring operation request, and the abnormal request queue is used to record a cloud end mirroring operation request whose cloud end mirroring operation fails. Through a first scheduled task and a second scheduled task that are executed, a newly received cloud end mirroring operation request can be processed in time, and a failed cloud end mirroring operation can be retried in time, which does not affect processing on the received cloud end mirroring operation request and can increase a mirroring operation success rate. Moreover, through the queues and the scheduled tasks, a cloud end mirroring operation request quantity can be controlled, a cloud end is prevented from being overloaded by a sudden increase in the request quantity, and a cloud end mirroring operation is highly usable. In addition, the receiving queue and the abnormal request queue decouple cloud end mirroring operation processes, facilitating subsequent expansion and optimization.

Figure 37:
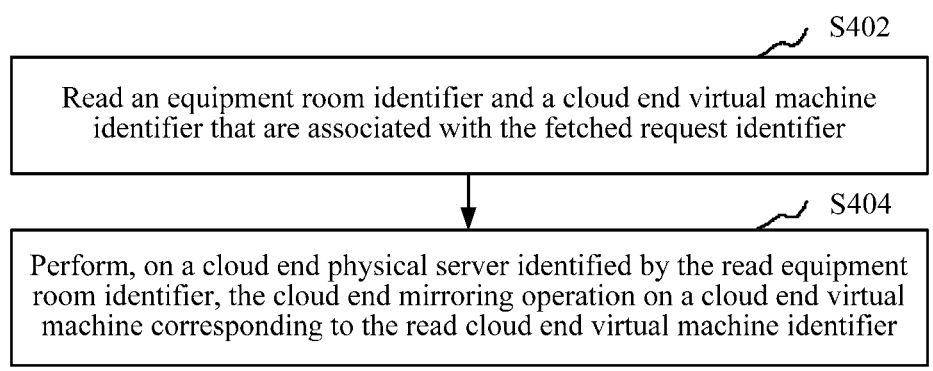
FIG. 37 is a schematic flowchart of a step of performing a cloud end mirroring operation based on a request parameter associated with a fetched request identifier in an embodiment.

In an embodiment, the request parameter includes an equipment room identifier and a cloud end virtual machine identifier. Referring to FIG. 37, step 310 in this embodiment specifically includes the following steps:

S402: Read an equipment room identifier and a cloud end virtual machine identifier that are associated with the fetched request identifier.

The equipment room identifier and the cloud end virtual machine identifier are used to identify the target to which the cloud end mirroring operation is directed. The equipment room identifier is used to identify a cloud end physical server, and the cloud end virtual machine identifier is used to identify a cloud end virtual machine set up on the cloud end server. Each cloud end virtual machine may be configured to provide one or more cloud services. Specifically, the server may read, from the database, the file, or the buffer, the equipment room identifier and the cloud end virtual machine identifier that are associated with the fetched request identifier.

S404: Perform, on a cloud end physical server identified by the read equipment room identifier, the cloud end mirroring operation on a cloud end virtual machine corresponding to the read cloud end virtual machine identifier.

Specifically, the server may determine the cloud end physical server identified by the read equipment room identifier, and determine, on the cloud end physical server, the cloud end virtual machine corresponding to the read cloud end virtual machine identifier, and then perform the cloud end mirroring operation on the determined cloud end virtual machine.

In this embodiment, because the cloud end physical server has excellent performance, and a virtual machine is set up on the cloud end physical server depending on a need to implement a cloud service, resources can be properly utilized, and cloud end resource wastes are avoided.

Figure 38:
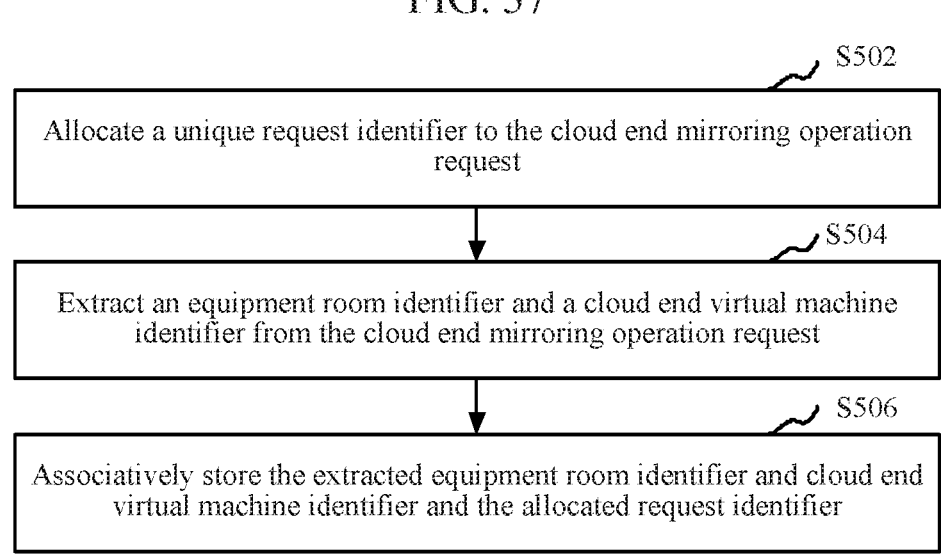
FIG. 38 is a schematic flowchart of a step of associatively storing a request identifier corresponding to a cloud end mirroring operation request and a request parameter carried in the cloud end mirroring operation request in an embodiment.

As shown in FIG. 38, in an embodiment, step S304 specifically includes the following steps:

S502: Allocate a unique request identifier to the cloud end mirroring operation request.

The unique request identifier means that the request identifier is unique in an environment to which the cloud end mirroring operation method in this embodiment is applied.

Specifically, the server may increasingly generate a unique sequence number, and allocate the sequence number as a request identifier to a received cloud end mirroring operation request. For example, after receiving a cloud end mirroring operation request, the server allocates a request identifier 00001 thereto; after receiving a next cloud end mirroring operation request, the server automatically increases 00001 by 1, and allocates a request identifier 00002 to the cloud end mirroring operation request.

In an embodiment, the server may alternatively use a time stamp as a request identifier. In an embodiment, the server may alternatively use a combination of a terminal identifier or a user identifier of a terminal or a user initiating a cloud end mirroring operation request and a time stamp as a request identifier.

S504: Extract an equipment room identifier and a cloud end virtual machine identifier from the cloud end mirroring operation request.

The equipment room identifier is an identifier of an equipment room in which a cloud end physical server is located, and may be used to identify the cloud end physical server. The cloud end virtual machine identifier is an identifier used to identify a cloud end virtual machine set up on the cloud end server. The equipment room identifier may be one or a combination of a number, a letter, a symbol, and a Chinese character. The cloud end virtual machine identifier may also be one or a combination of a number, a letter, a symbol, and a Chinese character. Step 502 and step S504 may be asynchronously performed.

S506: Associatively store the extracted equipment room identifier and cloud end virtual machine identifier and the allocated request identifier.

Specifically, the server may associate the extracted equipment room identifier and cloud end virtual machine identifier with the allocated request identifier, and store the association relationship. The server may specifically store the association relationship in a database, a file, or a buffer.

In this embodiment, a cloud end mirroring operation request is allocated a unique request identifier, so that uniqueness of the request identifier can be ensured, the request receiving queue and the abnormal request queue need to record only the request identifier, and an associated equipment room identifier and cloud end virtual machine identifier are read based on the request identifier when a mirroring operation is required. A data processing process is simple and efficient, and efficiency of a cloud end mirroring operation is improved.

In an embodiment, step S312 specifically includes: recording an operation failure result corresponding to the fetched request identifier when the cloud end mirroring operation fails and operation failure and retry times corresponding to the fetched request identifier reaches preset times; or adding the fetched request identifier to the abnormal request queue when the cloud end mirroring operation fails and operation failure and retry times corresponding to the fetched request identifier does not reach the preset times.

Specifically, after performing the cloud end mirroring operation, the server may determine whether the cloud end mirroring operation succeeds or fails. Specifically, the server may determine whether the cloud end mirroring operation succeeds or fails based on a returned value of the cloud end mirroring operation. When determining that the cloud end mirroring operation fails, the server may continue to determine whether the operation failure and retry times corresponding to the request identifier reaches the preset times, that is, determine whether the operation failure and retry times corresponding to the request identifier is greater than or equal to the preset times.

Further, when determining that the operation failure and retry times corresponding to the fetched request identifier is greater than or equal to the preset times, the server records an operation failure result corresponding to the fetched request identifier, which may be specifically recorded in a database, a file, or a buffer. The operation failure result corresponding to the fetched request identifier indicates that the mirroring operation requested in the cloud end mirroring operation request identified by the fetched request identifier fails. The server may further feed back the operation failure result to the terminal.

When determining that the operation failure and retry times corresponding to the fetched request identifier is less than the preset times, the server adds the fetched request identifier to the abnormal request queue. Subsequently, when asynchronously executing the first scheduled task and the second scheduled task, the server may fetch the request identifier to try the corresponding cloud end mirroring operation request.

In an embodiment, after fetching a request identifier from the abnormal request queue, the server may determine whether the fetched request identifier has corresponding operation failure and retry times. If no, the server generates operation failure and retry times with a value of 1 corresponding to the fetched request identifier. If yes, the server automatically increases the operation failure and retry times corresponding to the fetched request identifier by 1.

In this embodiment, a cloud end mirroring operation request has maximum operation failure and retry times, that is, the preset times, so that a cloud end mirroring operation failure caused by an accidental factor can be avoided, and cloud end resource wastes caused because the cloud end mirroring operation request is continually retried due to an obstacle that cannot be overcome in a short time can also be avoided.

In an embodiment, the cloud end mirroring operation method further includes: starting, if at least one of the request receiving queue, the abnormal request queue, the first scheduled task, and the second scheduled task is interrupted, corresponding at least one of a distributedly deployed request receiving queue, abnormal request queue, first scheduled task, and second scheduled task, to continue running.

Request receiving queues, abnormal request queues, first scheduled tasks, and second scheduled tasks are distributedly deployed. Those distributedly deployed objects may be deployed in different threads or processes on a same physical server, or may be deployed on different virtual machines on a same physical server, or may be deployed on different physical servers. Data is synchronized between the distributedly deployed objects. Interruption is caused by, for example, a fault.

Specifically, when the server executes the first scheduled task and the second scheduled task, if the request receiving queue is interrupted, a distributedly deployed request receiving queue is started to continue the first scheduled task; if the first scheduled task is interrupted, a distributedly deployed first scheduled task is started to continue running; if the abnormal request queue is interrupted, a distributedly deployed abnormal request queue is started to continue the second scheduled task; and if the second scheduled task is interrupted, a distributedly deployed second scheduled task is started to continue running.

In this embodiment, request receiving queues, abnormal request queues, first scheduled tasks, and second scheduled tasks are distributedly deployed, and when at least one of them is interrupted, a distributedly deployed one is started to continue running, so that a cloud end mirroring operation has strong robustness and strong disaster tolerance.

In an embodiment, step S310 includes: invoking, when a cloud end mirroring operation request corresponding to the fetched request identifier requests a mirroring operation on a private cloud end, a mirroring operation interface provided by the private cloud end, and performing the mirroring operation on the private cloud end based on the request parameter associated with the fetched request identifier.

In an embodiment, step S310 includes: invoking, when the cloud end mirroring operation request corresponding to the fetched request identifier requests a mirroring operation on a public cloud end, a mirroring operation interface provided by the public cloud end, and performing the mirroring operation on the public cloud end based on the request parameter associated with the fetched request identifier.

Specifically, the cloud end mirroring operation method in this embodiment is applied to a hybrid cloud end including a private cloud end and a public cloud end. The private cloud end is deployed in a private network environment. For example, an enterprise, a government, or another organization establishes a cloud end in its equipment room, which is physically isolated to ensure security. The public cloud end is deployed in an Internet environment, and has a strong computing capability. A mirroring operation on the private cloud end or the public cloud end may be included in a request parameter.

When the cloud end mirroring operation request requests a mirroring operation on the private cloud end, the server invokes a mirroring operation interface provided by the private cloud end, and provides, to the private cloud end through the mirroring operation interface, the request parameter associated with the fetched request identifier, so that the private cloud end performs the mirroring operation on the private cloud end based on the request parameter associated with the fetched request identifier.

When the cloud end mirroring operation request requests a mirroring operation on the public cloud end, the server invokes a mirroring operation interface provided by the public cloud end, and provides, to the public cloud end through the mirroring operation interface, the request parameter associated with the fetched request identifier, so that the public cloud end performs the mirroring operation on the public cloud end based on the request parameter associated with the fetched request identifier.

In this embodiment, the cloud end mirroring operation method is applied to a hybrid cloud end including a private cloud end and a public cloud end, performance advantages of the private cloud end and the public cloud end are combined, and a cloud end mirroring operation is highly usable in a hybrid cloud end environment.

Figure 39:
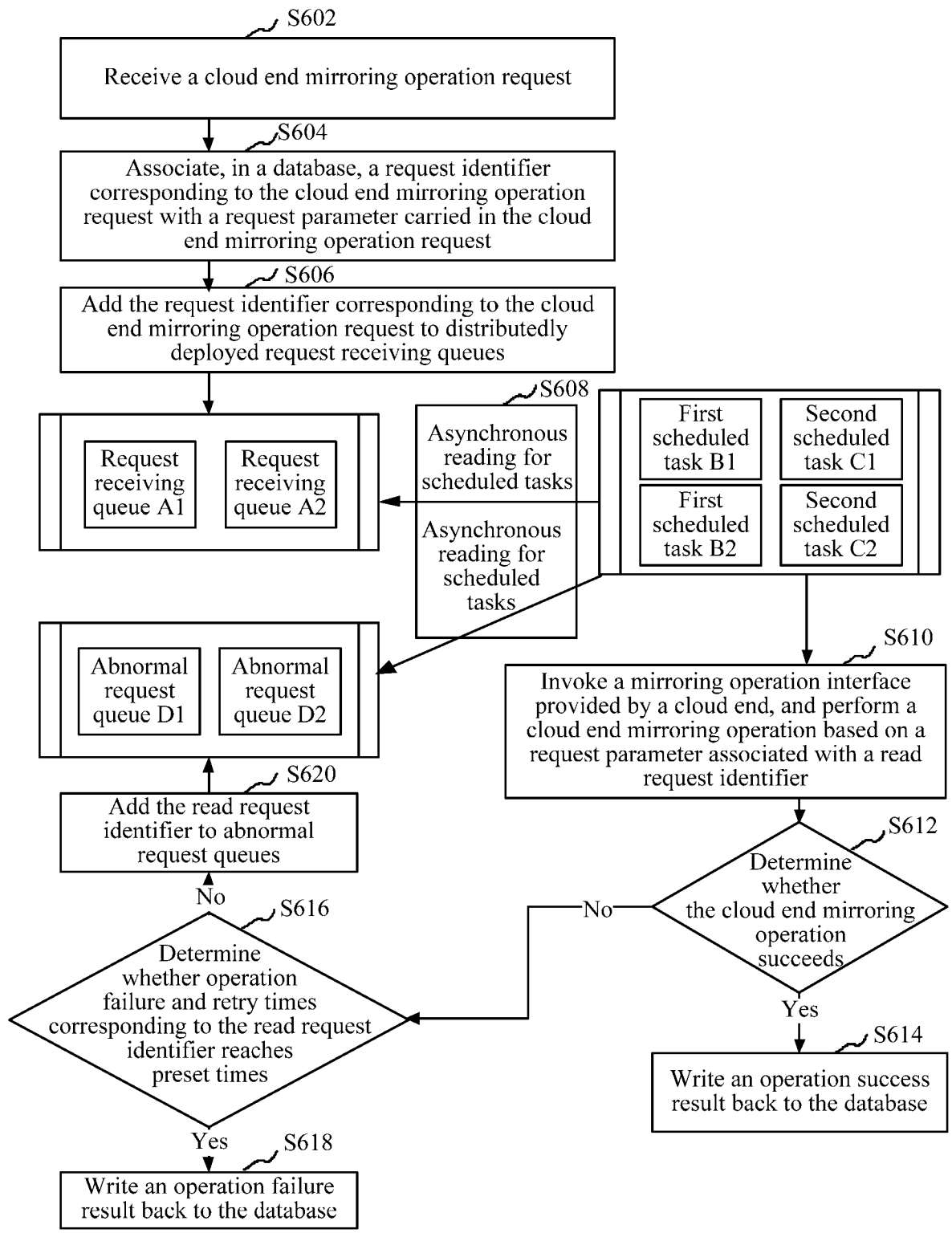
FIG. 39 is a schematic flowchart of a cloud end mirroring operation method in another embodiment.

As shown in FIG. 39, in an embodiment, a cloud end mirroring operation method specifically includes the following steps:

S602: Receive a cloud end mirroring operation request.

S604: Associate, in a database, a request identifier corresponding to the cloud end mirroring operation request with a request parameter carried in the cloud end mirroring operation request.

S606: Add the request identifier corresponding to the cloud end mirroring operation request to distributedly deployed request receiving queues.

S608: Asynchronously execute distributedly deployed first scheduled tasks and second scheduled tasks, read a request identifier from a request receiving queue when executing a first scheduled task, and read a request identifier from an abnormal request queue when executing a second scheduled task.

S610: Invoke a mirroring operation interface provided by a cloud end, and perform a cloud end mirroring operation based on a request parameter associated with the read request identifier.

S612: Determine whether the cloud end mirroring operation succeeds. If the cloud end mirroring operation succeeds, step S614 is performed. If the cloud end mirroring operation fails, step S616 is performed.

S614: Write an operation success result back to the database.

S616: Determine whether operation failure and retry times corresponding to the read request identifier reaches preset times. If the preset times is reached, step S618 is performed. If the preset times is not reached, step S620 is performed.

S618: Write an operation failure result back to the database.

S620: Add the read request identifier to abnormal request queues.

In this embodiment, a request receiving queue and an abnormal request queue are added. The request receiving queue is used to record a received cloud end mirroring operation request, and the abnormal request queue is used to record a cloud end mirroring operation request whose cloud end mirroring operation fails. Through a first scheduled task and a second scheduled task that are executed, a newly received cloud end mirroring operation request can be processed in time, and a failed cloud end mirroring operation can be retried in time, which does not affect processing on the received cloud end mirroring operation request and can increase a mirroring operation success rate. Moreover, through the queues and the scheduled tasks, a cloud end mirroring operation request quantity can be controlled, a cloud end is prevented from being overloaded by a sudden increase in the request quantity, and a cloud end mirroring operation is highly usable. In addition, the receiving queue and the abnormal request queue decouple cloud end mirroring operation processes, facilitating subsequent expansion and optimization.

Figure 40:
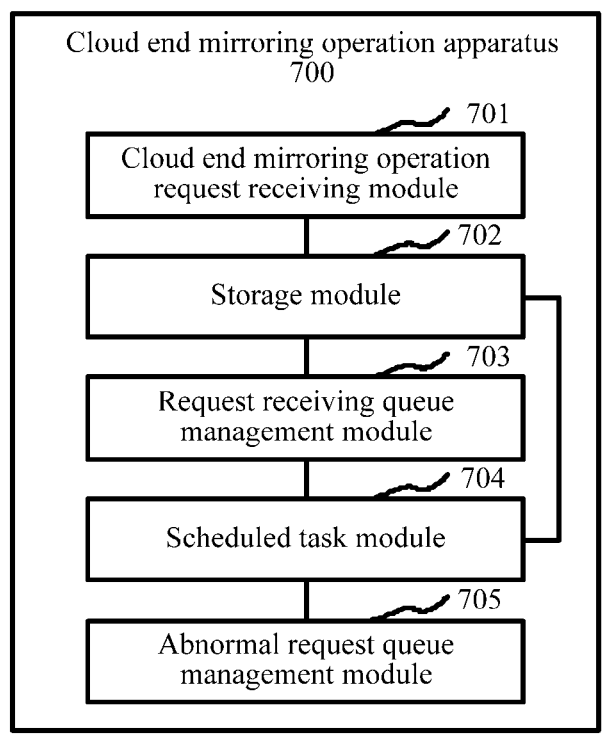
FIG. 40 is a structural block diagram of a cloud end mirroring operation apparatus in an embodiment.

As shown in FIG. 40, an embodiment provides a cloud end mirroring operation apparatus 700, including: a cloud end mirroring operation request receiving module 701, a storage module 702, a request receiving queue management module 703, a scheduled task module 704, and an abnormal request queue management module 705.

The cloud end mirroring operation request receiving module 701 is configured to receive a cloud end mirroring operation request.

The storage module 702 is configured to associatively store a request identifier corresponding to the cloud end mirroring operation request and a request parameter carried in the cloud end mirroring operation request.

The request receiving queue management module 703 is configured to add the request identifier corresponding to the cloud end mirroring operation request to a request receiving queue.

The scheduled task module 704 is configured to execute a first scheduled task of periodically fetching a request identifier from the request receiving queue and execute a second scheduled task of periodically fetching a request identifier from an abnormal request queue; and perform a cloud end mirroring operation based on a request parameter associated with the fetched request identifier.

The abnormal request queue management module 705 is configured to add the fetched request identifier to the abnormal request queue when the cloud end mirroring operation fails.

In the cloud end mirroring operation apparatus 700, a request receiving queue and an abnormal request queue are added. The request receiving queue is used to record a received cloud end mirroring operation request, and the abnormal request queue is used to record a cloud end mirroring operation request whose cloud end mirroring operation fails. Through a first scheduled task and a second scheduled task that are executed, a newly received cloud end mirroring operation request can be processed in time, and a failed cloud end mirroring operation can be retried in time, which does not affect processing on the received cloud end mirroring operation request and can increase a mirroring operation success rate. Moreover, through the queues and the scheduled tasks, a cloud end mirroring operation request quantity can be controlled, a cloud end is prevented from being overloaded by a sudden increase in the request quantity, and a cloud end mirroring operation is highly usable. In addition, the receiving queue and the abnormal request queue decouple cloud end mirroring operation processes, facilitating subsequent expansion and optimization.

In an embodiment, the request parameter includes an equipment room identifier and a cloud end virtual machine identifier; and the scheduled task module 704 is further configured to read an equipment room identifier and a cloud end virtual machine identifier that are associated with the fetched request identifier; and perform, on a cloud end physical server identified by the read equipment room identifier, the cloud end mirroring operation on a cloud end virtual machine corresponding to the read cloud end virtual machine identifier.

In this embodiment, because the cloud end physical server has excellent performance, and a virtual machine is set up on the cloud end physical server depending on a need to implement a cloud service, resources can be properly utilized, and cloud end resource wastes are avoided.

In an embodiment, the storage module 702 is further configured to allocate a unique request identifier to the cloud end mirroring operation request; extract an equipment room identifier and a cloud end virtual machine identifier from the cloud end mirroring operation request; and associatively store the extracted equipment room identifier and cloud end virtual machine identifier and the allocated request identifier.

In this embodiment, a cloud end mirroring operation request is allocated a unique request identifier, so that uniqueness of the request identifier can be ensured, the request receiving queue and the abnormal request queue need to record only the request identifier, and an associated equipment room identifier and cloud end virtual machine identifier are read based on the request identifier when a mirroring operation is required. A data processing process is simple and efficient, and efficiency of a cloud end mirroring operation is improved.

In an embodiment, the abnormal request queue management module 705 is further configured to record an operation failure result corresponding to the fetched request identifier when the cloud end mirroring operation fails and operation failure and retry times corresponding to the fetched request identifier reaches preset times; and add the fetched request identifier to the abnormal request queue when the cloud end mirroring operation fails and operation failure and retry times corresponding to the fetched request identifier does not reach the preset times.

In this embodiment, a cloud end mirroring operation request has maximum operation failure and retry times, that is, the preset times, so that a cloud end mirroring operation failure caused by an accidental factor can be avoided, and cloud end resource wastes caused because the cloud end mirroring operation request is continually retried due to an obstacle that cannot be overcome in a short time can also be avoided.

In an embodiment, the scheduled task module 704 is further configured to start, if at least one of the request receiving queue, the abnormal request queue, the first scheduled task, and the second scheduled task is interrupted, corresponding at least one of a distributedly deployed request receiving queue, abnormal request queue, first scheduled task, and second scheduled task, to continue running.

In this embodiment, request receiving queues, abnormal request queues, first scheduled tasks, and second scheduled tasks are distributedly deployed, and when at least one of them is interrupted, a distributedly deployed one is started to continue running, so that a cloud end mirroring operation has strong robustness and strong disaster tolerance.

In an embodiment, the scheduled task module 704 is further configured to invoke, when a cloud end mirroring operation request corresponding to the fetched request identifier requests a mirroring operation on a private cloud end, a mirroring operation interface provided by the private cloud end, and perform the mirroring operation on the private cloud end based on the request parameter associated with the fetched request identifier; and invoke, when the cloud end mirroring operation request corresponding to the fetched request identifier requests a mirroring operation on a public cloud end, a mirroring operation interface provided by the public cloud end, and perform the mirroring operation on the public cloud end based on the request parameter associated with the fetched request identifier.

In this embodiment, the cloud end mirroring operation method is applied to a hybrid cloud end including a private cloud end and a public cloud end, performance advantages of the private cloud end and the public cloud end are combined, and a cloud end mirroring operation is highly usable in a hybrid cloud end environment.

Persons of ordinary skill in the art may understand that the systems described herein may include a processor may in communication with memory. Examples of the processor may include a general processor, a central processing unit, a microcontroller, a server, an application specific integrated circuit (ASIC), a digital signal processor, a field programmable gate array (FPGA), and/or a digital circuit, analog circuit, or some combination thereof. The processor may be one or more devices operable to execute logic. The logic may include computer executable instructions or computer code stored in the memory or in other memory that when executed by the processor, cause the processor to perform the features implemented by the logic of units, subunits, and/or modules described herein. The computer code may include instructions executable with the processor.

The memory may be any device for storing and retrieving data or any combination thereof. The memory may include non-volatile and/or volatile memory, such as a random access memory (RAM), a read-only memory (ROM), an erasable programmable read-only memory (EPROM), or flash memory. Alternatively or in addition, the memory may include an optical, magnetic (hard-drive) or any other form of data storage device.

In some examples, the memory may include at least one the units, subunits, or modules described herein. In addition, the memory may include any other component previously discussed and/or other components described herein.

In some examples, each unit, subunit, and/or module of the system may include a logical component. Each logical component may be hardware or a combination of hardware and software. For example, each logical component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each logical component may include memory hardware, such as a portion of the memory, for example, that comprises instructions executable with the processor or other processors to implement one or more of the features of the logical components. When any one of the logical components includes the portion of the memory that comprises instructions executable with the processor, the logical component may or may not include the processor. In some examples, each logical components may just be the portion of the memory or other physical memory that comprises instructions executable with the processor or other processor to implement the features of the corresponding logical component without the logical component including any other hardware. Because each logical component includes at least some hardware even when the included hardware comprises software, each logical component may be interchangeably referred to as a hardware logical component.

The technical features of the embodiments may be combined arbitrarily. For brief description, possible combinations of the technical features in the embodiments are not all described. However, all combinations of these technical features should be considered as falling within the scope described in this specification, as long as there is no contradiction in the combinations.

The foregoing embodiments are merely some embodiments of the present disclosure, which are specifically and detailedly described. However, it should not be understood as a limitation to the patent scope of the present disclosure. It should be noted that persons of ordinary skill in the art may further make some variations and improvements without departing from the concept of the present disclosure, and the variations and improvements all belong to the protection scope of the present disclosure. Therefore, the patent protection scope of the present disclosure shall be subject to the appended claims.

The subject-matter of the disclosure may also relate, among others, to the following aspects:

1. A configuration system, comprising:

a configuration acquisition unit, configured to acquire configuration information of each underlying cloud platform affiliated to a hybrid cloud platform, the hybrid cloud platform being constructed over at least one underlying cloud platform, and the configuration information comprising network planning information and subnet planning information of the hybrid cloud platform;

an incremental data storage unit, configured to store incremental data corresponding to each underlying cloud platform that is not stored in a local database in the corresponding underlying cloud platform based on the configuration information of each underlying cloud platform;

a network planning unit, configured to determine, based on network planning information of each underlying cloud platform, whether to create a network for the corresponding underlying cloud platform, and determine, based on subnet planning information of each underlying cloud platform, whether to create a subnet for the corresponding underlying cloud platform; and a request responding unit, configured to respond to an access request that is forwarded by an authentication service end from an authentication client and send generated response information to the authentication service end after the network and the subnet are created.

2. The configuration system according to aspect 1, wherein the incremental data storage unit comprises:

a comparison unit, configured to compare the configuration information of each underlying cloud platform with configuration information of each underlying cloud platform that is stored in the local database, to obtain the incremental data corresponding to each underlying cloud platform that is not stored in the local database; and a sending unit, configured to send the incremental data corresponding to each underlying cloud platform that is not stored in the local database to the corresponding underlying cloud platform.

3. The configuration system according to aspect 2, wherein the acquisition unit is further configured to acquire, from the configuration information of the underlying cloud platform, a mapping relationship between a subnet and a service domain and a mapping relationship between the subnet and an Internet protocol (IP) resource; and the apparatus further comprises: an obtaining unit, configured to obtain a mapping relationship between the subnet and the IP resource based on the mapping relationship between the subnet and the service domain and the mapping relationship between the subnet and the IP resource.

4. The configuration system according to aspect 2, further comprising:

a receiving unit, configured to receive feedback information sent by the underlying cloud platform; and a writing unit, configured to write, when the feedback information indicates that the incremental data is unsuccessfully sent, the unsuccessfully sent incremental data to an error queue, and trigger the sending unit to resend the unsuccessfully sent incremental data.

5. The configuration system according to aspect 4, further comprising:

a determining unit, configured to determine whether the unsuccessfully sent incremental data is successfully sent within a preset time, and trigger the sending unit to send notification information if determining that the unsuccessfully sent incremental data is not successfully sent within the preset time.

6. The configuration system according to aspect 1, wherein the configuration acquisition unit comprises:

a synchronization unit, configured to synchronize the network planning information and the subnet planning information of the hybrid cloud platform, wherein the network planning information is used to indicate network planning of the hybrid cloud platform, the subnet planning information is used to indicate subnet planning of the hybrid cloud platform, and the hybrid cloud platform is constructed over the at least one underlying cloud platform; and an acquisition unit, configured to acquire network information corresponding to the underlying cloud platform from the network planning information, and acquire subnet information corresponding to the underlying cloud platform from the subnet planning information.

7. The configuration system according to aspect 1, wherein the network planning unit comprises:

a first determining unit, configured to determine, based on the network information corresponding to the underlying cloud platform, whether a network is created for the underlying cloud platform, to obtain a first determining result; and a first creation unit, configured to create, when the first determining result indicates that no network is created for the underlying cloud platform, a network for the underlying cloud platform based on the network information corresponding to the underlying cloud platform.

8. The configuration system according to aspect 7, wherein the network planning unit further comprises:

a second determining unit, configured to determine, based on the subnet information corresponding to the underlying cloud platform, whether a network is created for the underlying cloud platform and whether a subnet is created for the underlying cloud platform, to obtain a second determining result; and a second creation unit, configured to create, when the second determining result indicates that a network is created for the underlying cloud platform but no subnet is created for the underlying cloud platform, a subnet for the underlying cloud platform based on the subnet information corresponding to the underlying cloud platform.

9. The configuration system according to aspect 7, wherein the first creation unit being configured to create a network for the underlying cloud platform based on the network information corresponding to the underlying cloud platform specifically comprises:

determining a technology type corresponding to the underlying cloud platform based on the network information corresponding to the underlying cloud platform;

obtaining a network invocation instance corresponding to the underlying cloud platform based on the technology type corresponding to the underlying cloud platform;

acquiring a network creation apparatus corresponding to the network invocation instance corresponding to the underlying cloud platform; and running the network creation apparatus to create a network for the underlying cloud platform 10. The configuration system according to aspect 7, wherein the first determining unit being configured to determine, based on the network information corresponding to the underlying cloud platform, whether a network is created for the underlying cloud platform, to obtain a first determining result specifically comprises:

converting network identification information in the network information corresponding to the underlying cloud platform into target network identification information that can be identified by the underlying cloud platform;

determining whether the target network identification information is stored in description information of the underlying cloud platform; and obtaining, when the target network identification information is not stored in the description information of the underlying cloud platform, the first determining result indicating that no network is created for the underlying cloud platform.

11. The configuration system according to aspect 8, wherein the second creation unit being configured to create a subnet for the underlying cloud platform based on the subnet information corresponding to the underlying cloud platform specifically comprises:

determining a technology type corresponding to the underlying cloud platform based on the subnet information corresponding to the underlying cloud platform;

obtaining a subnet invocation instance corresponding to the underlying cloud platform based on the technology type corresponding to the underlying cloud platform;

acquiring a subnet creation apparatus corresponding to the subnet invocation instance corresponding to the underlying cloud platform; and running the subnet creation apparatus to create a subnet for the underlying cloud platform.

12. The configuration system according to aspect 8, wherein the second determining unit being configured to determine, based on the subnet information corresponding to the underlying cloud platform, whether a network is created for the underlying cloud platform and whether a subnet is created for the underlying cloud platform, to obtain a second determining result specifically comprises:

converting network identification information in the subnet information corresponding to the underlying cloud platform into target network identification information that can be identified by the underlying cloud platform, and converting subnet identification information in the subnet information corresponding to the underlying cloud platform into target subnet identification information that can be identified by the underlying cloud platform;

determining whether the target network identification information and the target subnet identification information are stored in description information of the underlying cloud platform; and obtaining, when the target network identification information is stored in the description information of the underlying cloud platform but the target subnet identification information is not stored in the description information of the underlying cloud platform, the second determining result indicating that a network is created for the underlying cloud platform but no subnet is created for the underlying cloud platform.

13. The configuration system according to aspect 6, wherein the synchronization unit comprises:

an acquisition subunit, configured to acquire all network planning information and all subnet planning information that are stored on a management center platform;

a selection subunit, configured to select the network information and the subnet information that correspond to each underlying cloud platform from all the network planning information and all the subnet planning information;

a first comparison subunit, configured to compare the selected network information with network information stored in the local database, to obtain network information stored only in the local database and network information that is not stored in the local database;

a first synchronization subunit, configured to synchronize the network planning information of the hybrid cloud platform based on the network information stored only in the local database and the network information that is not stored in the local database;

a second comparison subunit, configured to compare the selected subnet information with subnet information stored in the local database, to obtain subnet information stored only in the local database and subnet information that is not stored in the local database; and a second synchronization subunit, configured to synchronize the subnet planning information of the hybrid cloud platform based on the subnet information stored only in the local database and the subnet information that is not stored in the local database.

14. The configuration system according to aspect 13, wherein the first synchronization subunit being configured to synchronize the network planning information of the hybrid cloud platform based on the network information stored only in the local database and the network information that is not stored in the local database specifically comprises:

deleting the network information stored only in the local database, and deleting a network corresponding to the network information stored only in the local database; and adding the network information that is not stored to the local database, to synchronize the network planning information of the hybrid cloud platform.

15. The configuration system according to aspect 13, wherein the first synchronization subunit being configured to synchronize the subnet planning information of the hybrid cloud platform based on the subnet information stored only in the local database and the subnet information that is not stored in the local database specifically comprises:

deleting the subnet information stored only in the local database, and deleting a subnet corresponding to the subnet information stored only in the local database; and adding the subnet information that is not stored to the local database, to synchronize the subnet planning information of the hybrid cloud platform.

16. The configuration system according to aspect 1, further comprising: the authentication client and the authentication service end, wherein the authentication client is configured to receive an access request that is initiated by a user by using an application program, detect whether the access request is verified, and send the access request to the authentication service end if the access request is not verified;

the authentication service end is configured to receive the access request, detect whether the access request carries token information, send a user identity authentication invitation to the application program if the access request carries no token information, receive authentication information acquired by the application program, verify the authentication information, generate token information after verification succeeds, and send the token information to the authentication client;

the authentication client is further configured to receive the token information, and send the access request and the token information to the authentication service end;

the authentication service end is further configured to decrypt and verify the token information, and send a user identifier of the user sending the access request to the authentication client if verification succeeds; and the authentication client is further configured to receive the authenticated user identifier, send the access request to a service system of a corresponding hybrid cloud, receive response information of the access request from the service system, and send the response information to the application program.

17. The configuration system according to aspect 16, wherein the authentication client is further configured to receive the authenticated user identifier, acquire a role and rights that correspond to the user identifier from a user role and rights management system based on the authenticated user identifier, receive response information corresponding to the rights corresponding to the user identifier, and send the response information to the application program.

18. The configuration system according to aspect 16, wherein the authentication client sends the access request to the service system of the corresponding hybrid cloud if the access request is verified, receives the response information of the access request from the service system, and sends the response information to the application program.

19. The configuration system according to aspect 16, wherein the authentication service end is further configured to detect that the access request carries token information, decrypt and verify the token information, and if verification succeeds, send the user identifier of the user sending the access request to the authentication client, or if verification fails, send a user identity authentication invitation to the application program, receive authentication information acquired by the application program, verify the authentication information, generate token information after verification succeeds, and send the token information to the authentication client.

20. The configuration system according to any one of aspects 16 to 19, wherein communication and transmission are performed between the authentication client and the authentication service end by using a secure encryption protocol.

21. The configuration system according to any one of aspects 16 to 19, wherein the apparatus further comprises a user role and rights management system; an external system is connected to the hybrid cloud, and user data in the external system is synchronized to the hybrid cloud; and the user role and rights management system configures a corresponding role and rights for the synchronized user data.

22. The configuration system according to aspect 1, further comprising:

a cloud end mirroring operation request receiving module, configured to receive a cloud end mirroring operation request for the hybrid cloud platform from a terminal;

a storage module, configured to associatively store a request identifier corresponding to the cloud end mirroring operation request and a request parameter carried in the cloud end mirroring operation request;

a request receiving queue management module, configured to add the request identifier corresponding to the cloud end mirroring operation request to a request receiving queue;

a scheduled task module, configured to execute a first scheduled task of periodically fetching a request identifier from the request receiving queue and execute a second scheduled task of periodically fetching a request identifier from an abnormal request queue; and perform a cloud end mirroring operation based on a request parameter associated with the fetched request identifier; and an abnormal request queue management module, configured to add the fetched request identifier to the abnormal request queue when the cloud end mirroring operation fails.

23. The configuration system according to aspect 22, wherein the request parameter comprises an equipment room identifier and a cloud end virtual machine identifier;

and the scheduled task module is further configured to read an equipment room identifier and a cloud end virtual machine identifier that are associated with the fetched request identifier; and perform, on a cloud end physical server identified by the read equipment room identifier, the cloud end mirroring operation on a cloud end virtual machine corresponding to the read cloud end virtual machine identifier.

24. The configuration system according to aspect 22, wherein the storage module is further configured to allocate a unique request identifier to the cloud end mirroring operation request; extract an equipment room identifier and a cloud end virtual machine identifier from the cloud end mirroring operation request; and associatively store the extracted equipment room identifier and cloud end virtual machine identifier and the allocated request identifier.

25. The configuration system according to aspect 22, wherein the abnormal request queue management module is further configured to record an operation failure result corresponding to the fetched request identifier when the cloud end mirroring operation fails and operation failure and retry times corresponding to the fetched request identifier reaches preset times; and add the fetched request identifier to the abnormal request queue when the cloud end mirroring operation fails and operation failure and retry times corresponding to the fetched request identifier does not reach the preset times.

26. The configuration system according to aspect 22, wherein the scheduled task module is further configured to start, if at least one of the request receiving queue, the abnormal request queue, the first scheduled task, and the second scheduled task is interrupted, corresponding at least one of a distributedly deployed request receiving queue, abnormal request queue, first scheduled task, and second scheduled task, to continue running.

27. The configuration system according to aspect 22, wherein the scheduled task module is further configured to invoke, when a cloud end mirroring operation request corresponding to the fetched request identifier requests a mirroring operation on a private cloud end, a mirroring operation interface provided by the private cloud end, and perform the mirroring operation on the private cloud end based on the request parameter associated with the fetched request identifier; and invoke, when the cloud end mirroring operation request corresponding to the fetched request identifier requests a mirroring operation on a public cloud end, a mirroring operation interface provided by the public cloud end, and perform the mirroring operation on the public cloud end based on the request parameter associated with the fetched request identifier.

28. A system, comprising: a management center platform and a hybrid cloud platform, the hybrid cloud platform being constructed over at least one underlying cloud platform; and the hybrid cloud platform comprising the configuration management apparatus according to any one of aspects 1 to 27;

the management center platform comprising a central device and a database, and the database being configured to store respective configuration information of underlying cloud platforms affiliated to the hybrid cloud platform; and the central device being configured to perform centralized management on the respective configuration information of the underlying cloud platforms affiliated to the hybrid cloud platform.

29. The system according to aspect 28, wherein the central device is further configured to perform subnet division, allocate a corresponding service domain and a corresponding Internet Protocol (IP) resource to a divided subnet, to obtain a mapping relationship between the subnet and the service domain and a mapping relationship between the subnet and the IP resource, and obtain a mapping relationship between the subnet and the IP resource based on the mapping relationship between the subnet and the service domain and the mapping relationship between the subnet and the IP resource.

30. The system according to aspect 28, wherein the central device is further configured to divide at least one virtual private cloud (VPC) from an underlying cloud platform, and allocate a respective corresponding resource to each VPC.

What is claimed is:

1. A method, comprising:
acquiring, by a hardware processor of a hybrid cloud platform, updated configuration information corresponding to an underlying cloud platform affiliated with a hybrid cloud platform, the hybrid cloud platform being in communication with the underlying cloud platform, the updated configuration information comprising network planning information and subnet planning information of the hybrid cloud platform, wherein acquiring the updated configuration information corresponding to the underlying cloud platform affiliated with the hybrid cloud platform comprises acquiring network information corresponding to the underlying cloud platform from the network planning information;
updating, by the hardware processor, in a local database configured on the hybrid cloud platform, previous configuration information corresponding to the underlying cloud platform with incremental data included in the updated configuration information, wherein the incremental data is not included in the previous configuration information;
provisioning, by the hardware processor, based on the network planning information, a network for the underlying cloud platform by:
determining, based on the network information, that the network based on the network information is not created for the underlying cloud platform;
in response to determination that the network is not created for the underlying cloud platform:
determining a technology type corresponding to the underlying cloud platform based on the network information;
obtaining a network invocation instance corresponding to the underlying cloud platform based on the technology type;
acquiring a network creation instruction corresponding to the network invocation instance; and
creating, by execution of the network creation instruction, the network for the underlying cloud platform;
provisioning, by the hardware processor, based on the subnet planning information, a subnet for the underlying cloud platform; and
responding, by the hardware processor, to an access request that is forwarded by an authentication service end from an authentication client and sending generated response information to the authentication service end after the network and the subnet are provisioned.

2. The method according to claim 1, further comprising:
identifying, by the hardware processor, the incremental data based on a comparison of the updated configuration information and the previous configuration information that is stored in the local database; and
sending, by the hardware processor, the incremental data to the underlying cloud platform.

3. The method according to claim 2, further comprising:
receiving, by the hardware processor, feedback information from the underlying cloud platform; and
writing, by the hardware processor, in response to the feedback information being indicative of the incremental data being unsuccessfully sent, the incremental data to an error queue;
resending, by the hardware processor, the incremental data;
determining, by the hardware processor, the incremental data is unsuccessfully resent before a preset time; and
sending, by the hardware processor, notification information in response to determination that the incremental data is unsuccessfully resent before the preset time.

4. The method according to claim 1, further comprising:
acquiring, by the hardware processor, from the updated configuration information, a mapping relationship between a subnet and a service domain and a mapping relationship between the subnet and an Internet protocol (IP) resource, wherein the service domain is used to indicate a service identifier; and
obtaining, by the hardware processor, a mapping relationship between the subnet and the IP resource based on the mapping relationship between the subnet and the service domain and the mapping relationship between the subnet and the IP resource.

5. The method according to claim 1,
wherein acquiring, by the hardware processor, the updated configuration information corresponding to the underlying cloud platform affiliated with the hybrid cloud platform further comprises:
synchronizing the network planning information and the subnet planning information of the hybrid cloud platform, wherein the network planning information is indicative of network planning of the hybrid cloud platform, the subnet planning information is indicative of subnet planning of the hybrid cloud platform; and
acquiring subnet information corresponding to the underlying cloud platform from the subnet planning information,
wherein provisioning, by the hardware processor, based on subnet planning information, a subnet for the underlying cloud platform further comprises:
determining, based on the subnet information, the subnet is not created for the underlying cloud platform; and
creating, in response to determination that the network is created for the underlying cloud platform and determination that the subnet is not created for the underlying cloud platform, the subnet for the underlying cloud platform based on the subnet information.

6. The method according to claim 5,
wherein the creating, by the hardware processor, in response to determination that the network is created for the underlying cloud platform and determination that the subnet is not created for the underlying cloud platform, the subnet for the underlying cloud platform based on the subnet information further comprises:
obtaining a subnet invocation instance corresponding to the underlying cloud platform based on the technology type;
acquiring a subnet creation instruction corresponding to the subnet invocation instance; and
creating, by execution of the subnet creation instruction, the subnet for the underlying cloud platform.

7. The method according to claim 5,
wherein the determining, by the hardware processor, based on the network information, that the network is not created for the underlying cloud platform further comprises:
converting network identification information included in the network information into target network identification information that is compliant with the technology type of the underlying cloud platform;
determining the target network identification information is not included in description information of the underlying cloud platform; and
obtaining, in response to the target network identification information not being included in the description information of the underlying cloud platform, a first determining result indicative of the network not being created for the underlying cloud platform,
wherein the determining, by the hardware processor, based on the subnet information, that a subnet is not created for the underlying cloud platform further comprises:
converting subnet identification information in the subnet information corresponding to the underlying cloud platform into target subnet identification information that is compliant with the technology type of the underlying cloud platform;
determining that the target network identification information is included in the description information of the underlying cloud platform and that the target subnet identification information is not included in the description information of the underlying cloud platform; and
obtaining, in response to determination that the target network identification information is included in the description information of the underlying cloud platform and that the target subnet identification information is not included in the description information of the underlying cloud platform, a second determining result indicative of the network being created for the underlying cloud platform and the subnet not being created for the underlying cloud platform.

8. The method according to claim 5, wherein the synchronizing, by the hardware processor, the network planning information and the subnet planning information of the hybrid cloud platform comprises:
acquiring network planning information sets and subnet planning information sets that are stored on a management center platform, the network planning information sets and the subnet planning information sets corresponding to a plurality of underlying cloud platforms;
selecting a network information set and a subnet information set that correspond to the underlying cloud platform from the network planning information sets and subnet planning information sets;
comparing the selected network information with previous network information stored in the local database;
generating, based on a comparison of the selected network information with the previous network information stored in the local database, updated network information that is not stored in the local database;
synchronizing the network planning information of the hybrid cloud platform based on the updated network information;
comparing the selected subnet information with previous subnet information stored in the local database;

generating, based on the comparison of the selected subnet information with the previous subnet information, updated subnet information that is not stored in the local database; and synchronizing the subnet planning information of the hybrid cloud platform based on the updated subnet information.

9. The method according to claim 8,
wherein synchronizing, by the hardware processor, the network planning information of the hybrid cloud platform based on the updated network information further comprises:
   deleting the previous network information stored in the local database;
   deleting a previous network corresponding to the previous network information; and
   adding the updated network information to the local database, to synchronize
the network planning information of the hybrid cloud platform,
wherein synchronizing, by the hardware processor, the subnet planning information of the hybrid cloud platform based on the subnet information stored only in the local database and the subnet information that is not stored in the local database comprises:
   deleting the previous subnet information stored in the local database;
   deleting a previous subnet corresponding to the previous subnet information; and
   adding the updated subnet information to the local database, to synchronize the subnet planning information of the hybrid cloud platform.

10. The method according to claim 1, wherein before the responding to an access request that is forwarded by an authentication service end from an authentication client, the method further comprises:
   receiving, by the authentication client, an access request that is initiated by an remote terminal;
   detecting, by the authentication client, whether the access request is verified;
   sending, by the authentication client, the access request to the authentication service end if the access request is not verified;
   receiving, by the authentication service end, the access request;
   detecting, by the authentication service end, whether the access request carries token information;
   sending, by the authentication service end, a user identity authentication invitation to the remote terminal in response to the access request not including the token information;
   receiving, by the authentication service end, authentication information acquired by the remote terminal;
   verifying, by the authentication service end, the authentication information;
   generating, by the authentication service end, token information after verification succeeds;
   sending, by the authentication service end, the token information to the authentication client;
   receiving, by the authentication client, the token information;
   sending, by the authentication client, the access request and the token information to the authentication service end;
   decrypting, by the authentication service end, the token information;
   verifying, by the authentication service end, the token information;
   sending, by the authentication service end, a user identifier associated with the remote terminal in response to successful verification of the token information;
   receiving, by the authentication client, by the authentication client, an authenticated user identifier; and
   sending, by the authentication client, the access request to a service system of a corresponding hybrid cloud.

11. The method according to claim 10, wherein after responding to an access request that is forwarded by an authentication service end from an authentication client, the method further comprises:
   receiving, by the authentication service end, response information of the access request from the service system; and
   sending, by the authentication service end, the response information to the authentication client; and
   sending, by the authentication client, the response information to the remote terminal.

12. The method according to claim 10, further comprising:
   receiving, by the authentication client, the authenticated user identifier;
   acquiring, by the authentication client, a role and rights that correspond to the user identifier from a user role and rights management system based on the authenticated user identifier;
   receiving, by the authentication client, response information corresponding to the rights corresponding to the user identifier; and
   sending, by the authentication client, the response information to the remote terminal.

13. The method according to claim 10, further comprising:
   sending, by the authentication client, the access request to the service system of the hybrid cloud platform in response to the access request being verified;
   receiving, by the authentication client, the response information of the access request from the service system;
   sending, by the authentication client, the response information to the remote terminal.

14. The method according to claim 10, further comprising:
   detecting, by the authentication service end, that the access request carries token information;
   decrypting, by the authentication service end, and the token information;
   verifying, by the authentication service end, the token information;
   in response to successful verification of the token information, sending the user identifier associated with the remote terminal to the authentication client;
   in response to unsuccessful verification of the token information:
      sending, by the authentication service end, a user identity authentication invitation to the remote terminal,
      receiving, by the authentication service end, authentication information acquired by the remote terminal,
      verifying, by the authentication service end, the authentication information,
      generating, by the authentication service end, token information after verification succeeds, and
      sending, by the authentication service end, the token information to the authentication client.

15. The method according to claim 10, further comprising:
 performing, by the hardware processor, communication and transmission between the authentication client and the authentication service end by using a secure encryption protocol;
 connecting, by the hardware processor, an external system to the hybrid cloud platform;
 synchronizing, by the hardware processor, user data in the external system to the hybrid cloud platform; and
 configuring, by the hardware processor, a corresponding role and rights for the synchronized user data provided by a user role and rights management system.

16. The method according to claim 1, further comprising:
 receiving, by the hardware processor, a cloud end mirroring operation request for the hybrid cloud platform from a terminal;
 associatively, by the hardware processor, storing a request identifier corresponding to the cloud end mirroring operation request and a request parameter carried in the cloud end mirroring operation request;
 adding, by the hardware processor, the request identifier corresponding to the cloud end mirroring operation request to a request receiving queue;
 executing, by the hardware processor, a first scheduled task of periodically fetching a request identifier from the request receiving queue and executing a second scheduled task of periodically fetching a request identifier from an abnormal request queue;
 performing, by the hardware processor, a cloud end mirroring operation based on a request parameter associated with the fetched request identifier; and
 adding, by the hardware processor, the fetched request identifier to the abnormal request queue when the cloud end mirroring operation fails.

17. The method according to claim 16,
 wherein the request parameter comprises an equipment room identifier and a cloud end virtual machine identifier, and performing the cloud end mirroring operation based on the request parameter associated with the fetched request identifier further comprises:
  reading, by the hardware processor, an equipment room identifier and a cloud end virtual machine identifier that are associated with the fetched request identifier; and
  cause, by the hardware processor, a cloud end physical server identified by the read equipment room identifier to perform the cloud end mirroring operation on a cloud end virtual machine corresponding to the cloud end virtual machine identifier,
 wherein the associatively storing a request identifier corresponding to the cloud end mirroring operation request and a request parameter carried in the cloud end mirroring operation request comprises:
  allocating, by the hardware processor, a unique request identifier to the cloud end mirroring operation request;
  extracting, by the hardware processor, an equipment room identifier and the cloud end virtual machine identifier from the cloud end mirroring operation request; and
  associatively, by the hardware processor, storing the extracted equipment room identifier and the cloud end virtual machine identifier and the allocated request identifier,
 wherein the performing a cloud end mirroring operation based on the request parameter associated with the fetched request identifier comprises:
  invoking, by the hardware processor, when the cloud end mirroring operation request corresponding to the fetched request identifier requests a first mirroring operation on a private cloud end, a first mirroring operation interface provided by the private cloud end, and performing first the mirroring operation on the private cloud end based on the request parameter associated with the fetched request identifier; and
  invoking, by the hardware processor, when the cloud end mirroring operation request corresponding to the fetched request identifier requests a second mirroring operation on a public cloud end, a second mirroring operation interface provided by the public cloud end, and performing the second mirroring operation on the public cloud end based on the request parameter associated with the fetched request identifier,
 wherein the adding, by the hardware processor, the fetched request identifier to the abnormal request queue when the cloud end mirroring operation fails comprises recording, by the hardware processor, an operation failure result corresponding to the fetched request identifier when the cloud end mirroring operation fails and a number retry times corresponding to the fetched request identifier exceeds a preset threshold.

18. A system, comprising: a management center platform and a hybrid cloud platform, the hybrid cloud platform being configured to communicate with an underlying cloud platform, the hybrid cloud platform further comprising a processor configured to:
 acquire updated configuration information corresponding to the underlying cloud platform affiliated with the hybrid cloud platform, the updated configuration information comprising network planning information and subnet planning information of the hybrid cloud platform, wherein to acquire the updated configuration information, the processor is configured to acquire subnet information corresponding to the underlying cloud platform from the subnet planning information;
 update, in a local database configured on the hybrid cloud platform, previous configuration information corresponding to the underlying cloud platform with incremental data included in the updated configuration information, wherein the incremental data is not included in the previous configuration information,
 provision, based on the network planning information, a network for the underlying cloud platform,
 provision, based on the subnet planning information, a subnet for the underlying cloud platform, wherein in order to provision, based on the subnet planning information, the subnet for the underlying cloud platform, the processor is configured to:
  determine, based on the subnet information, the subnet is not created for the underlying cloud platform; and
  in response to determination that the network is created for the underlying cloud platform and determination that the subnet is not created for the underlying cloud platform:
   obtain a subnet invocation instance corresponding to the underlying cloud platform based on a technology type corresponding to the underlying cloud platform;
   acquire a subnet creation instruction corresponding to the subnet invocation instance; and create, by execution of the subnet creation instruction, the subnet for the underlying cloud platform;

respond to an access request that is forwarded by an authentication service end from an authentication client and send generated response information to the authentication service end after the network and the subnet are provisioned; and wherein the management center platform comprises a central device and a database, and the database being configured to store respective configuration information of underlying cloud platforms affiliated with the hybrid cloud platform, the central device being configured to perform centralized management of the respective configuration information of the underlying cloud platforms affiliated with the hybrid cloud platform.

19. The system according to claim 18, wherein the central device is further configured to perform subnet division, allocate a corresponding service domain and a corresponding Internet Protocol (IP) resource to a divided subnet, to obtain a mapping relationship between the subnet and the service domain and a mapping relationship between the subnet and the IP resource, and obtain a mapping relationship between the subnet and the IP resource based on the mapping relationship between the subnet and the service domain and the mapping relationship between the subnet and the IP resource.

20. The system according to claim 18, wherein the central device is further configured to divide at least one virtual private cloud (VPC) from an underlying cloud platform, and allocate a respective corresponding resource to each VPC.

* * * * *